(12) United States Patent
Kondo

(10) Patent No.: US 7,508,446 B2
(45) Date of Patent: Mar. 24, 2009

(54) APPARATUS, METHOD AND PROGRAM FOR GENERATING COEFFICIENT TYPE DATA OR COEFFICIENT DATA USED IN IMAGE DISPLAY APPARATUS, COMPUTER-READABLE MEDIUM CONTAINING THE PROGRAM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 611 days.

(21) Appl. No.: 10/473,522

(22) PCT Filed: Jan. 30, 2003

(86) PCT No.: PCT/JP03/00885

§ 371 (c)(1),
(2), (4) Date: Sep. 29, 2003

(87) PCT Pub. No.: WO03/065712

PCT Pub. Date: Aug. 7, 2003

(65) Prior Publication Data

US 2004/0233331 A1    Nov. 25, 2004

(30) Foreign Application Priority Data

Jan. 30, 2002  (JP)  ............................. 2002-022407
Jan. 30, 2002  (JP)  ............................. 2002-022408
Jan. 30, 2002  (JP)  ............................. 2002-022409

(51) Int. Cl.
*H04N 7/01*    (2006.01)
(52) U.S. Cl. .................................................. 348/441
(58) Field of Classification Search ................. 348/441, 348/448, 458, 445, 453, 446, 452, 700, 459
See application file for complete search history.

(56) References Cited

U.S. PATENT DOCUMENTS 4,004,079 A * 1/1977 Boston ....................... 358/2.1

(Continued)

FOREIGN PATENT DOCUMENTS

CN          1324181          11/2001

(Continued)

OTHER PUBLICATIONS

Patent Abstracts of Japan, Publication No. 2003-224830, Publication Date Aug. 8, 2003.

(Continued)

*Primary Examiner*—Paulos M Natnael
(74) *Attorney, Agent, or Firm*—Frommer Lawrence & Haug LLP; William S. Frommer; Thomas F. Presson

(57) ABSTRACT

A data processing apparatus and method for various processing according to a preference of user. A controller collects parameters, s, z, for adjusting a picture quality inputted by user's operation and stores history information on them in the history information storage section. A memory bank stores coefficient seed data for producing coefficient data Wi. The coefficient seed data is updated on the basis of the history information stored in the history information storage unit, for example, at a version upgrade of a television receiver. A calculation circuit obtains pixel data of objective pixel in HD signal based on the estimation equation using data xi of a prediction tap selectively extracted from SD signal and the coefficient data Wi.

31 Claims, 44 Drawing Sheets

U.S. PATENT DOCUMENTS

| | | | |
|---|---|---|---|
| 5,519,865 A * | 5/1996 | Kondo et al. | 707/1 |
| 5,946,044 A * | 8/1999 | Kondo et al. | 348/458 |
| 6,034,734 A * | 3/2000 | De Haan et al. | 348/458 |
| 6,057,885 A * | 5/2000 | Horishi et al. | 348/450 |
| 6,323,934 B1 * | 11/2001 | Enomoto | 355/40 |
| 6,342,925 B1 | 1/2002 | Akhavan et al. | |
| 6,483,609 B1 * | 11/2002 | Ueno et al. | 358/434 |
| 6,493,023 B1 * | 12/2002 | Watson | 348/180 |
| 6,509,930 B1 * | 1/2003 | Hirano et al. | 348/452 |
| 6,539,120 B1 * | 3/2003 | Sita et al. | 382/233 |
| 6,791,620 B1 * | 9/2004 | Elswick et al. | 348/441 |
| 7,061,539 B2 * | 6/2006 | Kondo et al. | 348/458 |
| 7,151,572 B2 * | 12/2006 | Shirahama et al. | 348/554 |
| 2002/0135594 A1 | 9/2002 | Kondo et al. | |

FOREIGN PATENT DOCUMENTS

| | | |
|---|---|---|
| EP | 0 989 748 | 3/2000 |
| JP | 7 222078 | 8/1995 |
| JP | 8-123385 | 5/1996 |
| JP | 8 298627 | 11/1996 |
| JP | 9 37174 | 2/1997 |
| JP | 9-261549 | 10/1997 |
| JP | 11-232726 | 8/1999 |
| JP | 11-345446 | 12/1999 |
| JP | 2000-69435 | 3/2000 |
| JP | 2000-83224 | 3/2000 |
| JP | 2000-196970 | 7/2000 |
| JP | 2001-103406 | 4/2001 |
| JP | 2001-309314 | 11/2001 |
| JP | 2001-318745 | 11/2001 |
| JP | 2002-159077 | 5/2002 |
| JP | 2002-185912 | 6/2002 |
| JP | 2003 196970 | 7/2003 |
| WO | WO 01 17250 | 3/2001 |
| WO | WO 01 63921 | 8/2001 |
| WO | WO 02 03682 | 1/2002 |

OTHER PUBLICATIONS

Patent Abstracts of Japan, Publication No. 2003-339063, Publication Date Nov. 28, 2003.

Patent Abstracts of Japan, Publication No. 2004-040498, Publication Date Feb. 5, 2004.

Patent Abstracts of Japan, Publication No. 056630, Publication Date Feb. 19, 2004.

Patent Abstracts of Japan, Publication No. 2003-224797, Publication Date Aug. 8, 2003.

Patent Abstracts of Japan, Publication No. 2003-224798, Publication Date Aug. 8, 2003.

* cited by examiner

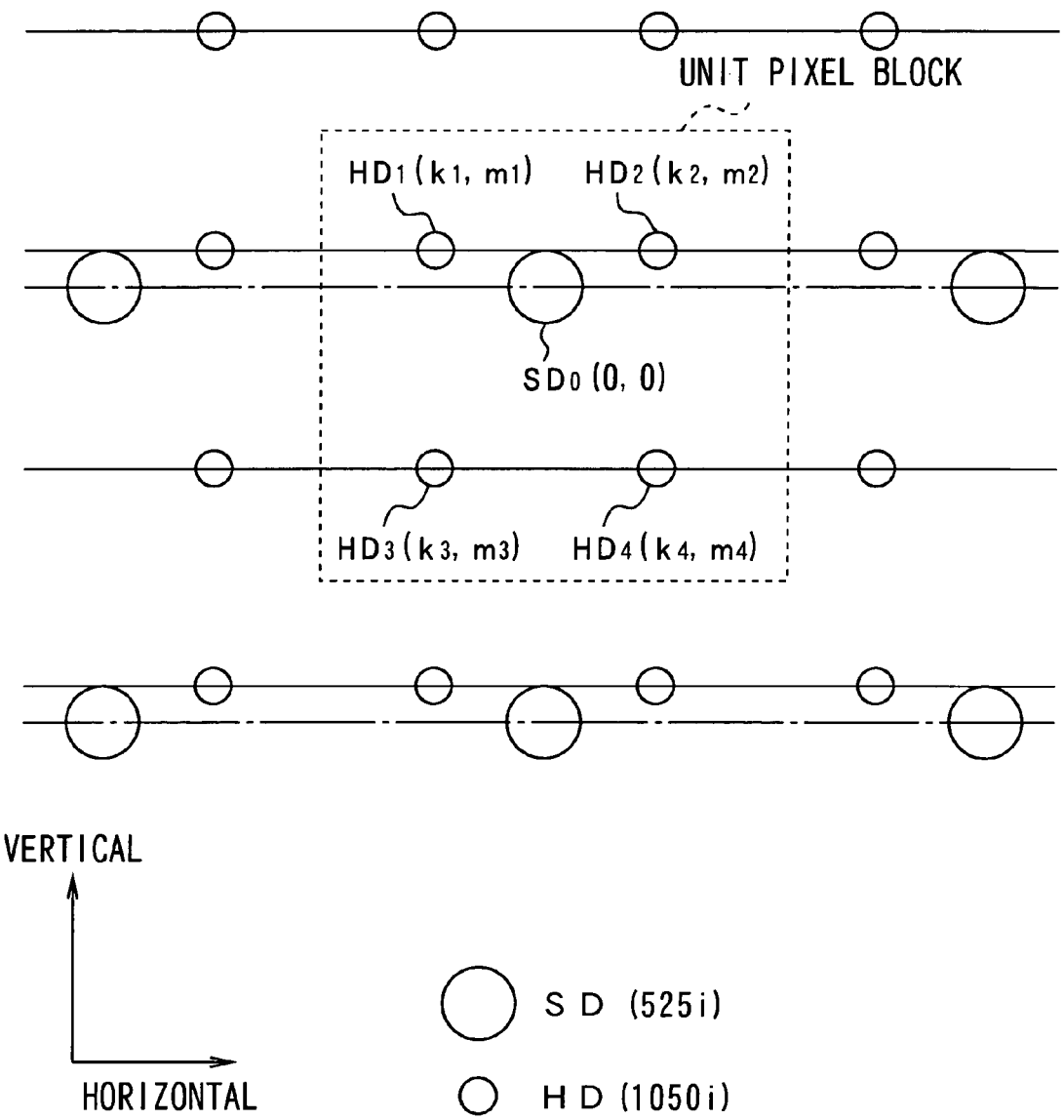
F I G. 5

FIG. 6
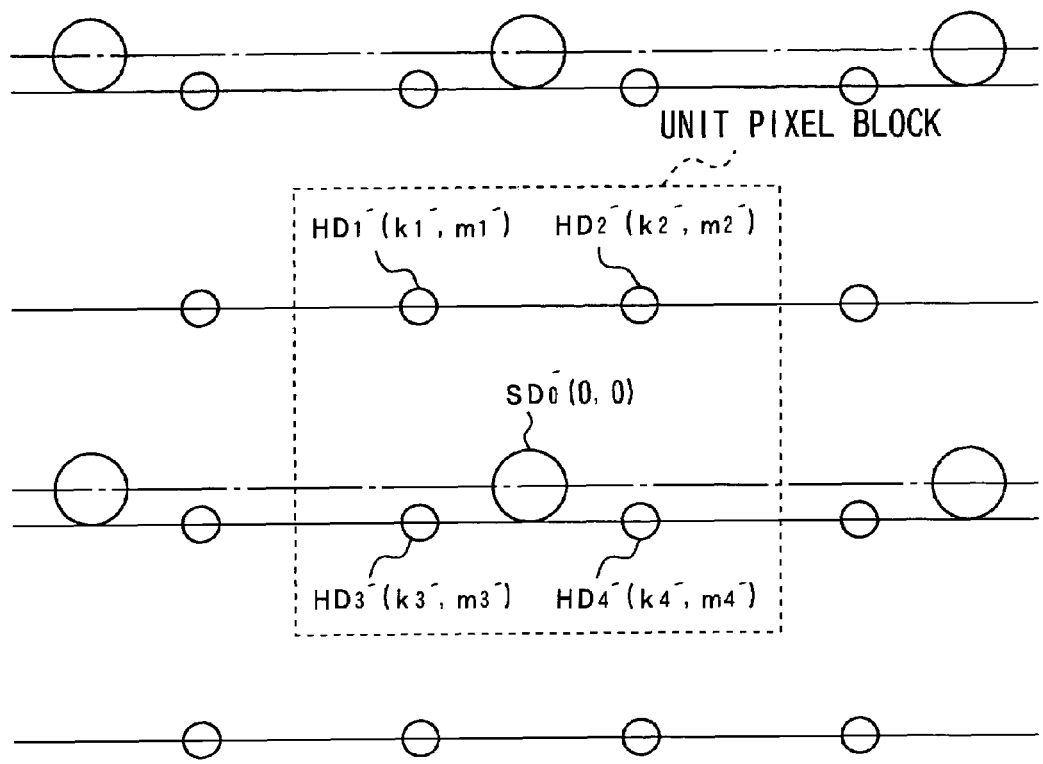
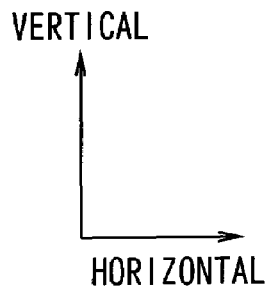

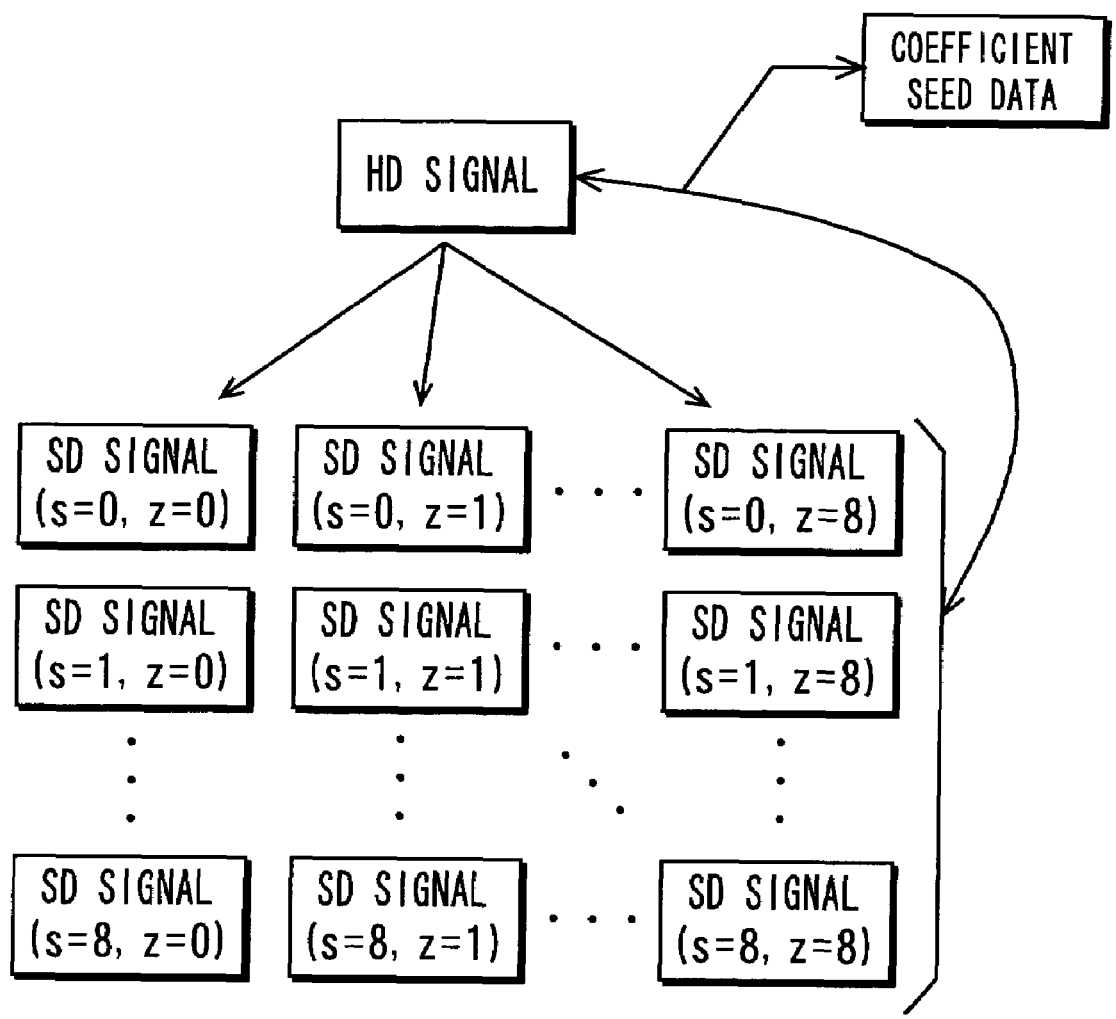
F I G. 8

FIG. 39

| GENRE | FREQ | PERFORMER | FREQ | TITLE | FREQ |
|---|---|---|---|---|---|
| ROMANCE | 1 | UTADA ZZ | 5 | NEWS AA | 5 |
| MUSIC | 7 | HAMAZAKI ZY | 1 | NEWS BB | 1 |
| SF | 3 | SUZUKI YY | 1 | C IITOMO | 1 |
| HISTORY | 1 | NISHIDA ZZ | 2 | D MUSIC | 6 |
| NEWS | 6 | TANGE YZ | 3 | E SCREEN | 2 |
| VARIETY | 2 | YUKAWA RR | 2 | AB STAGE | 2 |
| COMEDY | 1 | SASAKI XZ | 1 | MUSIC F | 1 |
| ACTION | 1 | KONDO ZZ | 4 | XY STORY | 4 |
|  |  | OHE YZ | 2 |  |  |

FIG. 40

| TITLE | GENRE | PERFORMER | BROADCAST | CHANNEL |
|---|---|---|---|---|
| S MUSIC | MUSIC | UTADA ZZ<br>HAMAZAKI ZY | 4/12<br>21:00~22:00 | M |

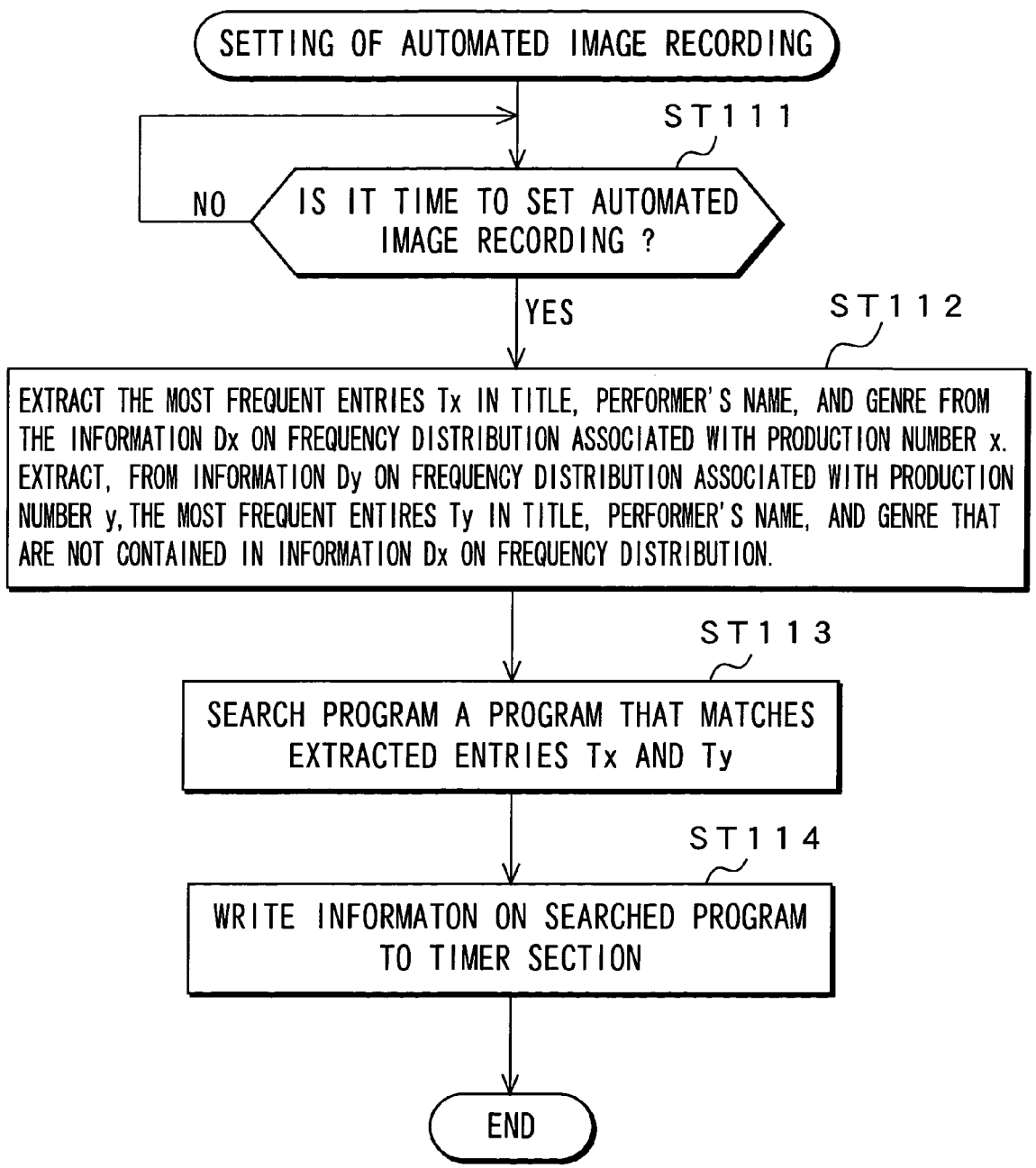

APPARATUS, METHOD AND PROGRAM FOR GENERATING COEFFICIENT TYPE DATA OR COEFFICIENT DATA USED IN IMAGE DISPLAY APPARATUS, COMPUTER-READABLE MEDIUM CONTAINING THE PROGRAM

TECHNICAL FIELD

The invention relates to a data processing apparatus, a data processing method, an image display apparatus, a coefficient seed data production device and a method for producing the coefficient seed data, a coefficient data production device and a method for producing the coefficient data, each being used for the image display apparatus, a program for carrying out the methods, and a computer-readable medium for storing the program, which are well suitable for use in a receiver or the like.

BACKGROUND ART

A recent increase in audio-visual oriented applications has led to a desire for the development of a TV receiver that can obtain higher resolution images. In order to satisfy the desire in turn, a Hi-vision TV receiver has been developed. The Hi-vision TV receiver uses 1125 scanning lines, which are at least twice the number of the scanning lines used in an NTSC-system receiver of 525. Also, the Hi-vision receiver has an aspect ratio of 9:16 as compared to the NTSC-system receiver's aspect ratio of 3:4. As such, the Hi-vision receiver can display an image with a higher resolution and realism than the NTSC-system one.

Although the Hi-vision system has these excellent features, the Hi-vision receiver cannot display a Hi-vision image when an NTSC-system video signal is supplied as it is. This is because, as mentioned above, the NTSC system and the Hi-vision system have different standards.

To display the Hi-vision image corresponding to the NTSC-system video signal, the applicant of this application has previously disclosed a converter for converting the NTSC-system video signal into the Hi-vision video signal (see Japanese Patent Publication No. Hei 8-51599).

This converter extracts, from an NTSC-system video signal, pixel data sets of a block (region) thereof which correspond to pixel data set of an objective position in a Hi-vision video signal, thereby deciding a class including the pixel data set of the objective position based on level distribution patterns of the pixel data sets in this block and then producing the pixel data set of the objective position corresponding to this class.

In a conventional system, pre-selected recording of broadcast programs through a recorder such as VTR is carried out by user of the recorder, who has found preferred programs with referring to a program schedule table in the newspaper or an EPG (electronic program guide) and pre-selects the corresponding preferred programs through the recorder.

In the converter mentioned above, the resolution of a picture generated by video signal of Hi-vision system is fixed, so that a desired resolution according to his preference for the content of the picture or the like cannot be obtained as he wishes unlike conventional contrast and sharpness adjustments.

Thus, the applicant of this application has also proposed (see Japanese Patent Publications Nos. 2001-238185 and 2000-348730) wherein when converting the NTSC-system video signal into the Hi-vision video signal, the corresponding Hi-vision video signal is generated in accordance with the values of inputted parameters and the user can freely regulate the resolution of the picture generated by the Hi-vision system video signal.

In this scheme, although the user can freely regulate the resolution of a picture, the allowable adjustment range of resolution is fixed. For example, a satisfactory adjustable range is not always available for a user who has adjusted the resolution with particular emphasis on that of one limit in the allowable adjustment range. Thus, there is a need for a scheme in which a user can adjust the resolution according to his preference.

In the conventionally pre-selected recording as mentioned above, no programs that the user avoids pre-selecting will be recorded. As a consequence, when, even if a user has a favorite program, he or she could not find it in a program table, he or she fails to pre-select the recording of the favorite program. In such occasion as mentioned above, it would be convenient for the user if a favorite program is automatically pre-selected to record it as scheduled. Alternatively, when the user has a favorite program, it would be also convenient for the user if he or she could obtain a suggestion or recommendation about his favorite program.

DISCLOSURE OF THE INVENTION

It is an object of the invention to provide a data processing apparatus and the like that allows the data processing to be carried out in accordance with the user's preferences.

A data processing apparatus in accordance with the invention comprises data processing means for processing data, additional information collecting means for collecting additional information for controlling the data processing means, storage means for storing information relevant to the additional information collected by the additional information collecting means, and control means for controlling the data processing means based on the information relevant to the additional information stored in the storing means.

A data processing method in accordance with the invention comprises data processing step of processing data, additional information collecting step of collecting additional information for controlling processing of the data processing step, storage step of storing information in storage device, the information being relevant to the additional information collected in the additional information collecting step, and control step of controlling processing of the data processing step based on the information stored in the storage device, the information being relevant to the additional information.

A data processing apparatus in accordance with the invention comprises data processing means for processing data, adjustment information collecting means for collecting adjustment information to adjust the data processing means, history storage means for storing history relevant to the adjustment information collected by the adjustment information collecting means, and control means for controlling the data processing means based on the history related to the adjustment information.

A data processing method in accordance with the invention comprises data processing step of processing data, adjustment information collecting step of collecting adjustment information to adjust processing of the data processing step, history storage step of storing history in history storage device, the history being relevant to the adjustment information collected in the adjustment information collecting step, and control step of controlling processing of the data processing step based on the history relevant to the adjustment information.

A contents-data-processing apparatus in accordance with the invention comprises processing means for processing inputted contents-data, collecting means for collecting history of additional information for controlling the processing means, history storage means for storing the history information of the additional information collected by the collecting means, and control means for controlling the processing means based on control information generated on the basis of the history of the additional information.

A contents-data-processing method in accordance with the invention comprises processing step of processing inputted contents-data, collecting step of collecting history of additional information for controlling processing of the processing step, history storage step of storing in history storage device the history of the additional information collected in the collecting step, and control step of controlling processing of the processing step based on control information generated on the basis of the history of the additional information.

A computer-readable medium in accordance with the invention records a program for allowing a computer to execute the above data processing method and the above contents-data-processing method. Further, a program in accordance with the invention allows a computer to execute the above methods.

In this invention, data processing is performed. For example, an item of contents-data is selectively extracted from multiple items of the broadcast contents-data contained in a broadcast signal received, which contents-data is then stored in a recorder such as VTR and HDD (Hard Disk Drive), or a picture of the contents are displayed on a display device. For example, a first informational signal as data is converted into a second informational signal in accordance with the values of inputted parameters. For example, when the informational signal is an image signal (pixel data), the inputted parameter can be a parameter for adjusting picture quality.

Further, information for controlling or adjusting the data processing is collected, and information on the collected information is stored in a storage device. The storage device stores the collected information or its history as it is, or alternatively, a result of the analysis after analysis of the collected information. The result of analysis includes, for example, information indicative of frequency distribution of the data.

For example, collected information concerns the data to be processed. As an example, the information includes item contents of at least the title of the contents-data, name(s) of relevant person(s), and genre of the contents-data. In a case where the processing for converting the first informational signal to the second informational signal in accordance with the values of the inputted parameters as described above is carried out, the collected information can be values of parameters inputted by a user's operation.

In this way, the data processing means is controlled based on the information relative to the information stored in the storage device. For example, when results of analyses of multiple pieces of adjustment information are stored, the processing means is controlled based on the results of analyses.

This control information is stored in, for example, control information storage means. For instance, in a system where a first informational signal is converted into a second informational signal in accordance with the values of inputted parameters, the control information is, for example, coefficient data of a estimation equation for producing informational data constituting the second informational signal or coefficient data (coefficient seed data) in a production equation to obtain the coefficient data.

According to a result of an analysis, a control is performed in such a way that any contents-data to be recorded is illustratively selected based on a broadcast schedule; reception-processing unit receives and processes the contents-data on the broadcasting hours of the contents-data as scheduled; and recording unit records the contents-data. In anther example, a control is performed based on a result of an analysis so that recommended contents-data is selected, a signal indicative of the information regarding the contents-data is generated, the signal is synthesized with the contents-data, and the information of the contents-data is displayed on a display device.

Processing means is controlled based on such a new method in accordance with the result of an analysis. For example, when the first informational signal indicative of the contents-data is converted to the second informational signal in accordance with the values of the inputted parameters, values based on the analysis is utilized as the coefficient data of the estimation equation for producing informational data constituting the second informational signal.

Thus, collecting the information for controlling and adjusting the processing means for processing data and controlling the processing means based on the information relative to the collected information allows desired processing favorable to a user to be obtained.

Note that by making removable the storage means (storage device) for storing the collected information, it becomes easy to further store information relative to additional information collected by other information collecting means in the removable storage means (storage device), and to allow other data processing devices to utilize the information relative to the additional information stored in the removable storage means (storage device).

In a still another example, when the contents of the storage means adapted to store collected information is transferred to another storage means, the control means can likewise control the data processing means thereof based on the information stored in the another storage means.

For example, the processing means may convert a first informational signal representing the contents-data into a second informational signal.

In this case, multiple items of first informational data located on a periphery of an objective position in the second informational signal are selected based on the first informational signal, and a class including the informational data of the objective position is detected based on the multiple items of the first informational data. For example, a level distribution pattern of the multiple items of first informational data is detected, and a class including the informational data of the objective position is detected based on this level distribution pattern. Here, the informational signal can be an image signal or an audio signal.

Parameter inputting means receives a value of parameter for determining quality of output obtained by the second informational signal. For example, when the informational signal is an image signal, the value of the inputted parameter is adjusted so that a picture quality of the image by the second informational signals (image signal) can be determined. When the informational signal is an audio signal, the value of the parameter inputted is adjusted so that the sound quality of the voice by the second informational signal (audio signal) can be determined.

The informational data of the objective position is generated in accordance with the class detected as described above and the value of the parameter inputted as described above. For example, the second storage means stores coefficient seed data, which is the coefficient data in a production equation for producing coefficient data used in an estimation equation, obtained for each class. Using this coefficient seed data and the adjusted values of the parameters, coefficient data for the estimation equation corresponding to the detected class and the inputted values of the parameters is generated. In addition, multiple items of second informational data located on a periphery of an objective position in the second informational signal is selected based on the first informational signal. The informational data of the objective position is then obtained according to the estimation equation using this coefficient data and the multiple items of the second informational data.

In this case, the total sum of the coefficient data of the estimation equation produced using the coefficient seed data and then, normalization is performed by dividing the informational data of the objective position obtained using the estimation equation as described above by the total sum. This normalization eliminates level fluctuations of the informational data at the objective position due to rounding errors encountered when calculating the coefficient data in the estimation equation according to the production equation using the coefficient seed data.

Further, second storage means illustratively stores coefficient data of the estimation equation previously produced for each combination of the class and the value of parameter, and then the coefficient data of the estimation equation corresponding to the detected class and the value of parameter is read out of the second storage means. Multiple items of second informational data located on a periphery of an objective position in said second informational signal are selected based on the first informational signal, and the informational data of the objective position is obtained according to the estimation equation using this coefficient data and the multiple items of second informational data.

Thus, the coefficient data of the estimation equation associated with the values of the inputted parameters is obtained, and using this coefficient data, the informational data of the objective position in the second informational signal is generated based on the estimation equation. Therefore, arbitrary adjustment of a quality of the output obtained from the second informational signal, for example, the adjustment of a picture quality, can be easily carried out.

Alternatively, the first storage means stores the history information relative to the values of the parameters inputted to the parameter inputting means as described above. For example, the first storage means stores information on a frequency distribution of the values of inputted parameters. Further, the first storage means stores newest values of a predetermined number among the inputted parameters. The history information stored in the first storage medium is utilized when the above mentioned coefficient seed data and coefficient data are generated. This permits an adjustment of picture quality in favor of the user.

An image display apparatus in accordance with the invention comprises image signal inputting means for allowing a first image signal containing multiple items of pixel data to be inputted, image signal processing means for converting the first image signal inputted to the image signal inputting means into a second image signal containing multiple items of pixel data, and outputting the second image signal, and image display means for displaying, on an image display element, an image formed by the second image signal outputted from the image signal processing means, The image signal processing means includes first data selection means for selecting multiple items of first pixel data located on a periphery of an objective position in the second image signal based on the first image signal, class detection means for detecting a class including the pixel data of the objective position based on the multiple items of the first pixel data selected by the first data selection means, parameter inputting means for allowing a value of parameter for determining quality of output obtained by the second image signal to be inputted, pixel data production means for generating pixel data of the objective position in accordance with the class detected by the class detection means and the value of the parameter inputted by the parameter inputting means, and storage means for storing the information relevant to the value of the parameter inputted to the parameter inputting means.

A coefficient seed data production device in accordance with the invention for producing coefficient seed data, the coefficient seed data being coefficient data in a production equation for producing coefficient data used in an estimation equation for converting a first informational signal containing multiple items of informational data into a second informational signal containing multiple items of informational data, comprises history information inputting means for allowing history information to be inputted, the history information being associated with a value of a parameter for determining quality of output obtained from the second informational signal, the parameter being included in the production equation, parameter inputting means for allowing a value of the parameter for determining quality of output obtained from a student signal corresponding to the first informational signal to be inputted, the value corresponding to the parameter contained in the production equation., parameter adjusting means for adjusting the value of the parameter inputted to the parameter inputting means, based on the history information inputted to the history information inputting means, first data selection means for selecting multiple items of first informational data located on a periphery of an objective position in a teacher signal corresponding to the second informational signal based on the student signal, class detection means for detecting a class including informational data of the objective position based on the multiple items of the first informational data selected by the first data selection means, second data selection means for selecting multiple items of second informational data located on a periphery of the objective position in the teacher signal based on the student signal, and calculation means for obtaining the coefficient seed data for each class using the class detected by the class detection means, the multiple items of the second informational data selected by the second data selection means, and the informational data of the objective position in the teacher signal.

A method for producing coefficient seed data in accordance with the invention, the coefficient seed data being coefficient data in a production equation for producing coefficient data used in an estimation equation for converting a first informational signal containing multiple items of informational data into a second informational signal containing multiple items of informational data, comprises a first step of obtaining history information associated with a value of a parameter for determining quality of output obtained from the second informational signal, the parameter being included in the production equation, a second step of obtaining a value of the parameter for determining quality of output obtained from a student signal corresponding to the first informational signal, the value corresponding to the parameter contained in the production equation, a third step of adjusting the value of the parameter obtained in the second step based on the history information obtained in the first step, a fourth step of selecting multiple items of first informational data located on a periphery of an objective position in a teacher signal corresponding to the second informational signal based on the student signal, a fifth step of detecting a class including informational data of the objective position based on the multiple items of the first informational data selected in the fourth step, a sixth step of selecting multiple items of second informational data located on a periphery of the objective position in the teacher signal based on the student signal, and a seventh step of obtaining the coefficient seed data for each class using the class detected in the fifth step, the multiple items of the second informational data selected in the sixth step, and the informational data of the objective position in the teacher signal.

A program in accordance with the invention allows a computer to execute the method for producing coefficient seed data as described above. A computer-readable medium in accordance with the invention stores the above program.

According to the invention, the history information associated with a value of a parameter for determining quality of output obtained from the second informational signal is inputted, and a value of the parameter for determining quality of output obtained from a student signal corresponding to the first informational signal is also inputted. The value of the inputted parameter is adjusted based on the inputted history information.

For example, the history information is information on frequency distribution of the values of the parameters and thus, the values of the inputted parameters are adjusted based on a position of the center-of-gravity of the values of parameters obtained from the information on the frequency distribution. Further, the history information relates to newest values of a predetermined number in the parameters, and the value of the inputted parameter is adjusted based on the position of the center-of-gravity obtained by weighting a newer value of a parameter with a heavier weight, using the newest values of a predetermined number in the parameters. Additionally, the history information is information on frequency distribution of the values of the parameters and the newest values of a predetermined number in the parameters, and the value of the inputted parameter is adjusted based on the position of the center-of-gravity obtained by weighting the newest values of a predetermined number in the parameters obtained by weighting a newer value of a parameter with a heavier weight, using the information of the frequency distribution.

A picture quality of the student signal is determined according to the adjusted value of the parameter. For example, when the informational signal is an image signal, the adjusted value of the parameter allows a picture quality of the image by the student signal. When the informational signal is an audio signal, the adjusted value of the parameter allows the sound quality of the voice by the student signal.

Multiple items of first informational data located on a periphery of an objective position in the teacher signal are selected based on the student signal, and a class including the informational data of the objective position is detected based on the multiple items of the selected first informational data. Further, multiple items of the second informational data located on a periphery of the objective position in the teacher signal are selected based on the student signal.

Thus, values of the inputted parameters varies in stages so that the coefficient seed data is obtained for each class using the class including the informational data of the objective position in the teacher signal, the multiple items of the selected second informational data, and the informational data of the objective position in the teacher signal.

Note that the coefficient seed data is coefficient data in a production equation, which includes the parameter, for producing coefficient data used in the estimation equation for converting a first informational signal containing multiple items of informational data into a second informational signal containing multiple items of informational data. Using the coefficient seed data allows coefficient data corresponding to the parameter arbitrarily adjusted in the production equation to be obtained. This permits the user to adjust the quality of output obtained from the second informational signal without restriction by adjusting the value of parameter when the first informational signal is converted into the second informational signal using the estimation equation.

As described above, the value of parameter inputted into the coefficient seed data production device is adjusted based on the history information. A picture quality of the student signal is determined according to the value of the adjusted parameter Obtaining coefficient data of the estimation equation using the coefficient seed data produced by the informational signal processing apparatus as described above allows the user to adjust a picture quality, for example, within a range having the position of the center-of-gravity for the past adjustment of picture quality as a center thereof. This permits an adjustment range of picture quality to automatically set in favor of the user, and thus, the user can adjust the picture quality in this range.

A coefficient data production device in accordance with the invention for producing coefficient data used in an estimation equation for converting a first informational signal containing multiple items of informational data into a second informational signal containing multiple items of informational data, comprises history information inputting means for allowing history information to be inputted, the history information being associated with a value of a parameter for determining quality of output obtained from the second informational signal, parameter inputting means for allowing a value of the parameter for determining quality of output obtained from a student signal corresponding to the first informational signal to be inputted, the value corresponding to the parameter contained in the production equation, parameter adjusting means for adjusting the value of the parameter inputted to the parameter inputting means, based on the history information inputted to the history information inputting means, first data selection means for selecting multiple items of first informational data located on a periphery of an objective position in a teacher signal corresponding to the second informational signal based on the student signal, class detection means for detecting a class including informational data of the objective position based on the multiple items of the first informational data selected by the first data selection means, second data selection means for selecting multiple items of second informational data located on a periphery of the objective position in the teacher signal based on the student signal, and calculation means for obtaining the coefficient data for each combination of the class detected by the class detection means and the values of parameters inputted to the parameter inputting means using the class detected by the class detection means, the multiple items of the second informational data selected by the second data selection means, and the informational data of the objective position in the teacher signal.

A method in accordance with the invention for producing coefficient data used in an estimation equation for converting a first informational signal containing multiple items of informational data into a second informational signal containing multiple items of informational data, comprises a first step of obtaining history information associated with a value of a parameter for determining quality of output obtained from the second informational signal, the parameter including the production equation, a second step of obtaining a value of the parameter for determining quality of output obtained from a student signal corresponding to the first informational signal, the value corresponding to the parameter contained in the production equation, a third step of adjusting the value of the parameter obtained in the second step, based on the history information obtained in the first step, a fourth step of selecting multiple items of first informational data located on a periphery of an objective position in a teacher signal corresponding to the second informational signal based on the student signal, a fifth step of detecting a class including informational data of the objective position based on the multiple items of the first informational data selected in the fourth step, a sixth step of selecting multiple items of second informational data located on a periphery of the objective position in the teacher signal based on the student signal, and a seventh step of obtaining the coefficient data for each combination of the class detected in the fifth step and the values of parameters obtained in the second step using the class detected in the fifth step, the multiple items of the second informational data selected in the sixth step, and the informational data of the objective position in the teacher signal.

A program in accordance with the invention allows a computer to execute the method for producing coefficient data as described above. A computer-readable medium in accordance with the invention stores the above program.

According to the invention, the history information associated with a value of a parameter for determining quality of output obtained from the second informational signal is inputted, and a value of the parameter for determining quality of output obtained from a student signal corresponding to the first informational signal is also inputted. The value of the inputted parameter is adjusted based on the inputted history information.

For example, the history information is information on frequency distribution of the values of the parameters and thus, the values of the inputted parameters are adjusted based on a position of the center-of-gravity of the values of parameters obtained from the information on the frequency distribution. A picture quality of the student signal is determined according to the value of the adjusted parameter.

Multiple items of first informational data located on a periphery of an objective position in the teacher signal are selected based on the student signal, and a class including the informational data of the objective position is detected based on the multiple items of the selected first informational data. Further, multiple items of the second informational data located on a periphery of the objective position in the teacher signal are selected based on the student signal.

Thus, values of the inputted parameters varies in stages so that the coefficient data is obtained for each combination of the class including the informational data of the objective position in the teacher signal and the values of inputted parameters using the class including the informational data of the objective position in the teacher signal, the multiple items of the selected second informational data, and the informational data of the objective position in the teacher signal.

According to the description above, the coefficient data used in the estimation equation for converting a first informational signal into a second informational signal is produced, but when the first informational signal is converted into the second informational signal, coefficient data corresponding to the class including the informational data of the objective position in the second informational signal and the values of adjusted parameters is selectively used, thereby calculating the informational data of the objective position using the estimation equation. This allows quality of output obtained from the second informational signal to be easily adjusted by adjusting the value of parameter when the first informational signal is converted into the second informational signal using the estimation equation.

Further, as described above, the value of the parameter inputted into the coefficient data production device is adjusted based on the history information. A picture quality of the student signal is determined according to the value of the adjusted parameter. Using the coefficient data produced by the informational signal processing apparatus as described above allows the user to adjust a picture quality, for example, within a range having the position of the center-of-gravity for the past adjustment of picture quality as a center thereof. This permits an adjustment range of picture quality to automatically set in favor of the user, and thus, the user can adjust the picture quality in this range.

A coefficient seed data production device in accordance with the invention for producing coefficient seed data, the coefficient seed data being coefficient data in a production equation for producing coefficient data used in an estimation equation for converting a first image signal containing multiple items of pixel data into a second image signal containing multiple items of pixel data, comprises history information inputting means for allowing history information to be inputted, the history information being associated with values of multiple parameters each for determining resolution in multiple directions of an image obtained from the second image signal, each of the parameters being included in the production equation, parameter inputting means for allowing values of the multiple parameters for determining resolution in multiple directions of an image obtained from a student signal corresponding to the first image signal to be inputted, each of the values corresponding to the multiple parameters contained in the production equation, first data selection means for selecting multiple items of first pixel data located on a periphery of an objective position in a teacher signal corresponding to the second image signal based on the student signal, class detection means for detecting a class including the pixel data of the objective position based on the multiple items of the first pixel data selected by the first data selection means, second data selection means for selecting multiple items of second pixel data located on a periphery of the objective position in the teacher signal based on the student signal, the second pixel data being distributed in the multiple directions, data position switching means for switching positions of the multiple items of the second pixel data selected by the second data selection means based on the history information inputted to the history information inputting means, and calculation means for obtaining the coefficient seed data for each class using the class detected by the class detection means, the multiple items of the second pixel data selected by the second data selection means, and the pixel data of the objective position in the teacher signal.

A method in accordance with the invention for producing coefficient seed data, the coefficient seed data being coefficient data in a production equation for producing coefficient data used in an estimation equation for converting a first image signal containing multiple items of pixel data into a second image signal containing multiple items of pixel data, comprises a first step of obtaining history information associated with values of multiple parameters each for determining resolution in multiple directions of an image obtained from the second image signal, each of the parameters being included in the production equation, a second step of obtaining values of the multiple parameters for determining resolution in multiple directions of an image obtained from a student signal corresponding to the first image signal, each of the values corresponding to the multiple parameters contained in the production equation, a third step of selecting multiple items of first pixel data located on a periphery of an objective position in a teacher signal corresponding to the second image signal based on the student signal, a fourth step of detecting a class including the pixel data of the objective position based on the multiple items of the first pixel data selected in the third step, a fifth step of selecting multiple items of second pixel data located on a periphery of the objective position in the teacher signal based on the student signal, the second pixel data being distributed in the multiple directions, a sixth step of switching positions of the multiple items of the second pixel data selected in the fifth step based on the history information obtained in the first step, and a seventh step of obtaining the coefficient seed data for each class using the class detected in the fourth step, the multiple items of the second pixel data selected in the fifth step, and the pixel data of the objective position in the teacher signal.

A program in accordance with the invention allows a computer to execute the method for producing the coefficient seed data as described above. A computer-readable medium in accordance with the invention stores the above program.

According to the invention, the history information associated with values of multiple parameters each for determining resolution in multiple directions of an image obtained from the second image signal is inputted, and a value of the parameter for determining quality of output obtained from the student signal corresponding to the first image signal is also inputted. The resolution in multiple directions of an image obtained from the student signal is determined according to the values of the inputted multiple parameters. For example, the multiple directions include time direction and spatial direction (vertical and horizontal directions). Further, for example, the multiple directions are horizontal direction and vertical direction. Additionally, for example, the multiple directions are horizontal direction, vertical direction, and time direction.

Multiple items of first pixel data located on a periphery of an objective position in the teacher signal are selected based on the student signal, and a class including the informational data of the objective position is detected based on the multiple items of the selected first informational data.

Further, multiple items of the second pixel data located on a periphery of the objective position in the teacher signal are selected based on the student signal.

The history information is information on frequency distribution of the values of the multiple parameters and thus, positions of the second pixel data are switched based on a position of the center-of-gravity of the values of parameters obtained from the information on the frequency distribution. Further, the history information relates to newest values of a predetermined number in the multiple parameters, and positions of the second pixel data are switched based on the position of the center-of-gravity obtained by weighting a newer value of a parameter with a heavier weight, using the newest values of a predetermined number in the multiple parameters. Additionally, the history information is information on frequency distribution of the values of the multiple parameters and the newest values of a predetermined number in the multiple parameters, and positions of the second pixel data are switched based on the position of the center-of-gravity obtained by weighting the newest values of a predetermined number in the parameters obtained by weighting a newer value of a parameter with a heavier weight, using the information on the frequency distribution.

Thus, values of the inputted parameters varies in stages so that the coefficient seed data is obtained for each class using the class including the pixel data of the objective position in the teacher signal, the multiple items of the selected second pixel data, and the pixel data of the objective position in the teacher signal.

Note that the coefficient seed data is coefficient data in a production equation, which includes the parameter, for producing coefficient data used in the estimation equation for converting a first image signal containing multiple items of pixel data into a second image signal containing multiple items of pixel data. Using the coefficient seed data allows coefficient data corresponding to the parameter arbitrarily adjusted in the production equation to be obtained. This permits the user to adjust resolution in multiple directions of an image obtained from the second image signal without restriction by adjusting the values of the multiple parameters when the first informational signal is converted into the second informational signal using the estimation equation.

Further, as described above, the positions (prediction tap position) of the multiple items of second pixel data are switched based on the history information. In this case, when it is assumed that a user has hoped to use a resolution weighting a prescribed direction according to the history information beforehand, many items of pixel data distributed in the prescribed direction as selected second pixel data are made remain, thereby obtaining the coefficient seed data in order to create the resolution in this direction precisely. Thus, using the coefficient seed data produced by the informational signal processing apparatus to obtain the coefficient data used in the estimation equation as described above allows the user to create the resolution in the prescribed direction precisely, thereby permitting the resolution to set in favor of the user.

A coefficient data production device in accordance with the invention for producing coefficient data used in an estimation equation for converting a first image signal containing multiple items of pixel data into a second image signal containing multiple items of pixel data, comprises history information inputting means for allowing history information to be inputted, the history information being associated with values of multiple parameters each for determining resolution in multiple directions of an image obtained from the second image signal, each of the parameters being included in the production equation, parameter inputting means for allowing values of the multiple parameters for determining resolution in multiple directions of an image obtained from a student signal corresponding to the first image signal to be inputted, each of the values corresponding to the multiple parameters contained in the production equation, first data selection means for selecting multiple items of first pixel data located on a periphery of an objective position in a teacher signal corresponding to the second image signal based on the student signal, class detection means for detecting a class including the pixel data of the objective position based on the multiple items of the first pixel data selected by the first data selection means, second data selection means for selecting multiple items of second pixel data located on a periphery of the objective position in the teacher signal based on the student signal, the second pixel data being distributed in the multiple directions, data position switching means for switching positions of the multiple items of the second pixel data selected by the second data selection means based on the history information inputted to the history information inputting means, and calculation means for obtaining the coefficient data for each combination of the class detected by the class detection means and the values of the multiple parameters inputted to the parameter inputting means, using the class detected by the class detection means, the multiple items of the second pixel data selected by the second data selection means, and the pixel data of the objective position in the teacher signal.

A method in accordance with the invention for producing coefficient data used in an estimation equation for converting a first image signal containing multiple items of pixel data into a second image signal containing multiple items of pixel data, comprises a first step of obtaining history information associated with values of multiple parameters each for determining resolution in multiple directions of an image obtained from the second image signal, a second step of obtaining values of the multiple parameters for determining resolution in multiple directions of an image obtained from a student signal corresponding to the first image signal, each of the values corresponding to the multiple parameters, a third step of selecting multiple items of first pixel data located on a periphery of an objective position in a teacher signal corresponding to the second image signal based on the student signal, a fourth step of detecting a class including the pixel data of the objective position based on the multiple items of the first pixel data selected in the third step, a fifth step of selecting multiple items of second pixel data located on a periphery of the objective position in the teacher signal based on the student signal, the second pixel data being distributed in the multiple directions, a sixth step of switching positions of the multiple items of the second pixel data selected in the fifth step based on the history information obtained in the first step, and a seventh step of obtaining the coefficient data for each combination of the class detected in the fourth step and the values of the multiple parameters obtained in the second step, using the class detected in the fourth step, the multiple items of the second pixel data selected in the fifth step, and the pixel data of the objective position in the teacher signal.

A program in accordance with the invention allows a computer to execute the method for producing the coefficient data as described above. A computer-readable medium in accordance with the invention stores the above program.

According to the invention, the history information associated with values of multiple parameters each for determining resolution in multiple directions of an image obtained from the second image signal is inputted, and a value of the parameter for determining quality of output obtained from the student signal corresponding to the first image signal is also inputted. The resolution in multiple directions of an image obtained from the student signal is determined according to the values of the inputted multiple parameters. For example, the multiple directions include time direction and spatial direction (vertical and horizontal directions). Further, for example, the multiple directions are horizontal direction and vertical direction. Additionally, for example, the multiple directions are horizontal direction, vertical direction, and time direction.

Multiple items of first pixel data located on a periphery of an objective position in the teacher signal are selected based on the student signal, and a class including the informational data of the objective position is detected based on the multiple items of the selected first informational data.

Further, multiple items of the second pixel data located on a periphery of the objective position in the teacher signal are selected based on the student signal. In this case, positions of multiple items of the second pixel data are switched based on the history information. For example, the history information is information on frequency distribution of the values of the multiple parameters and thus, positions of the second pixel data are switched based on a position of the center-of-gravity of the values of parameters obtained from the information on the frequency distribution.

Thus, values of the inputted parameters varies in stages so that the coefficient data is obtained for each combination of class including the pixel data of the objective position in the teacher signal and the values of the inputted parameters using the class including the pixel data of the objective position in the teacher signal, the multiple items of the selected second pixel data, and the pixel data of the objective position in the teacher signal.

According to the description above, the coefficient data used in the estimation equation for converting a first image signal into a second image signal is produced, but when the first image signal is converted into the second image signal, coefficient data corresponding to the class including the pixel data of the objective position in the second image signal and the values of the adjusted parameters is selectively used, thereby calculating the pixel data of the objective position using the estimation equation. This allows the resolution in multiple directions of an image obtained from the second image signal to be easily adjusted by adjusting the value of parameter when the first image signal is converted into the second image signal using the estimation equation.

Further, as described above, the positions (prediction tap position) of the multiple items of second pixel data are switched based on the history information. In this case, when it is assumed that a user has hoped to use a resolution weighting a prescribed direction according to the history information beforehand, many items of pixel data distributed in the prescribed direction as selected second pixel data are made remain, thereby obtaining the coefficient data in order to create the resolution in this direction precisely. Thus, using the coefficient data produced by the informational signal processing apparatus allows the user to create the resolution in the prescribed direction precisely, thereby permitting the resolution to set in favor of the user.

BRIEF DESCRIPTION OF THE DRAWINGS

FIG. 5 is an illustration explaining a phase shift (in an odd field) from a center prediction tap among four pixels within unit pixel block of HD signal (a 1050*i* signal);

FIG. 6 is an illustration explaining a phase shift (in an even field) from a center prediction tap among four pixels within unit pixel block of HD signal (a 1050*i* signal);

FIG. 8 is an illustration showing one example of a method for producing coefficient seed data;

FIG. 39 is a diagram showing example of information on a frequency distribution stored in a bay memory in the substrate;

FIG. 40 is a diagram showing example of information relative to the program found on the basis of the frequency distributions stored in the bay memory in the substrate;

FIG. 45 is a flowchart illustrating operations for setting automatic picture recording;

BEST MODE FOR CARRYING OUT THE INVENTION

Figure 1:
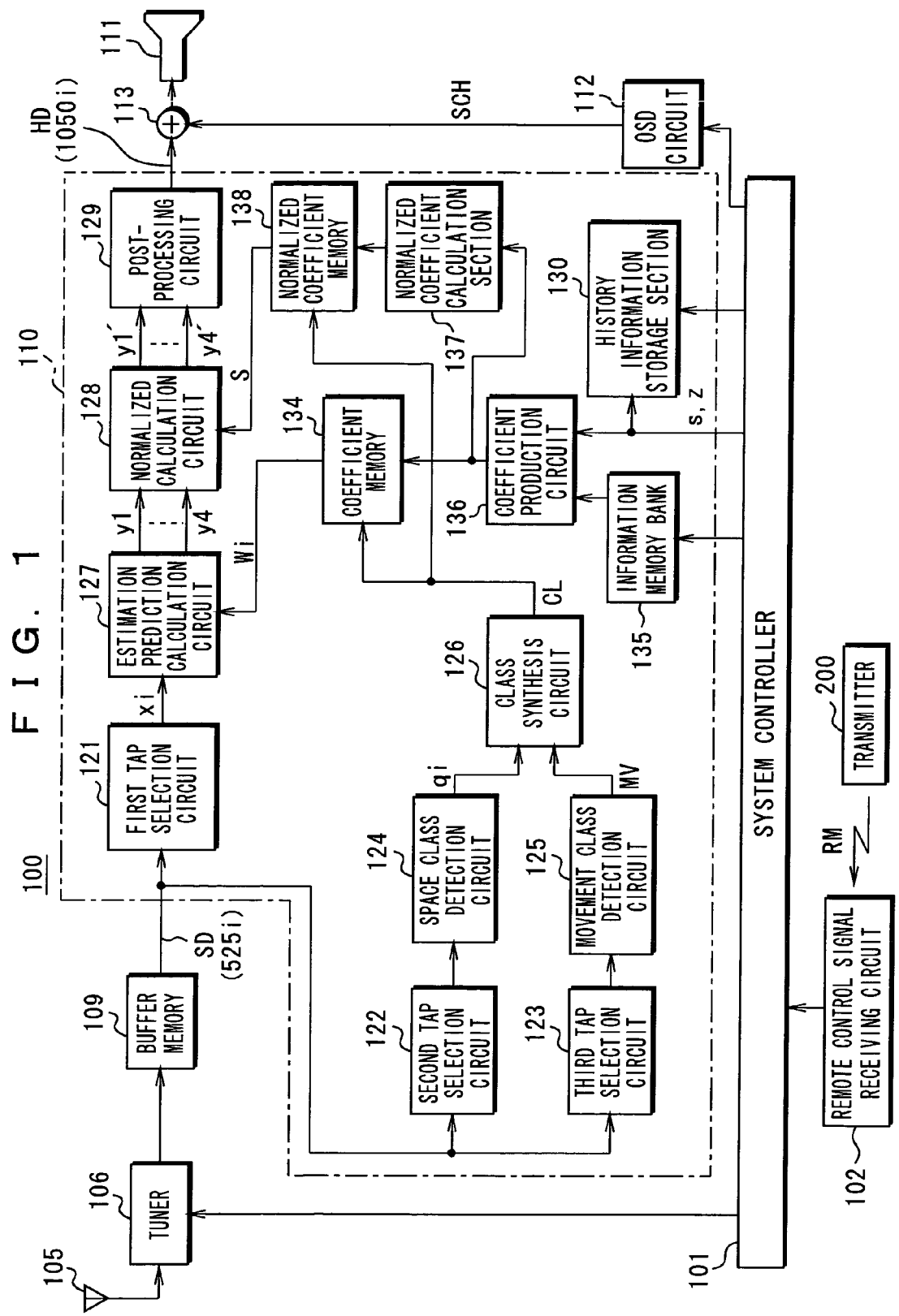
FIG. 1 is a block diagram showing a configuration of a TV receiver according to an embodiment of the invention.

The following will describe embodiments of the invention with reference to the drawings. FIG. 1 shows a configuration of a TV receiver 100 according to an embodiment of the invention. The TV receiver 100 receives a 525$i$ signal as a Standard Definition (SD) signal from a broadcast signal and then converts this 525$i$ signal into a 1050$i$ signal as a High Definition (HD) signal to display an image by means of the 1050$i$ signal. Namely, number of pixels in a displayed image is increased.

Figure 2:
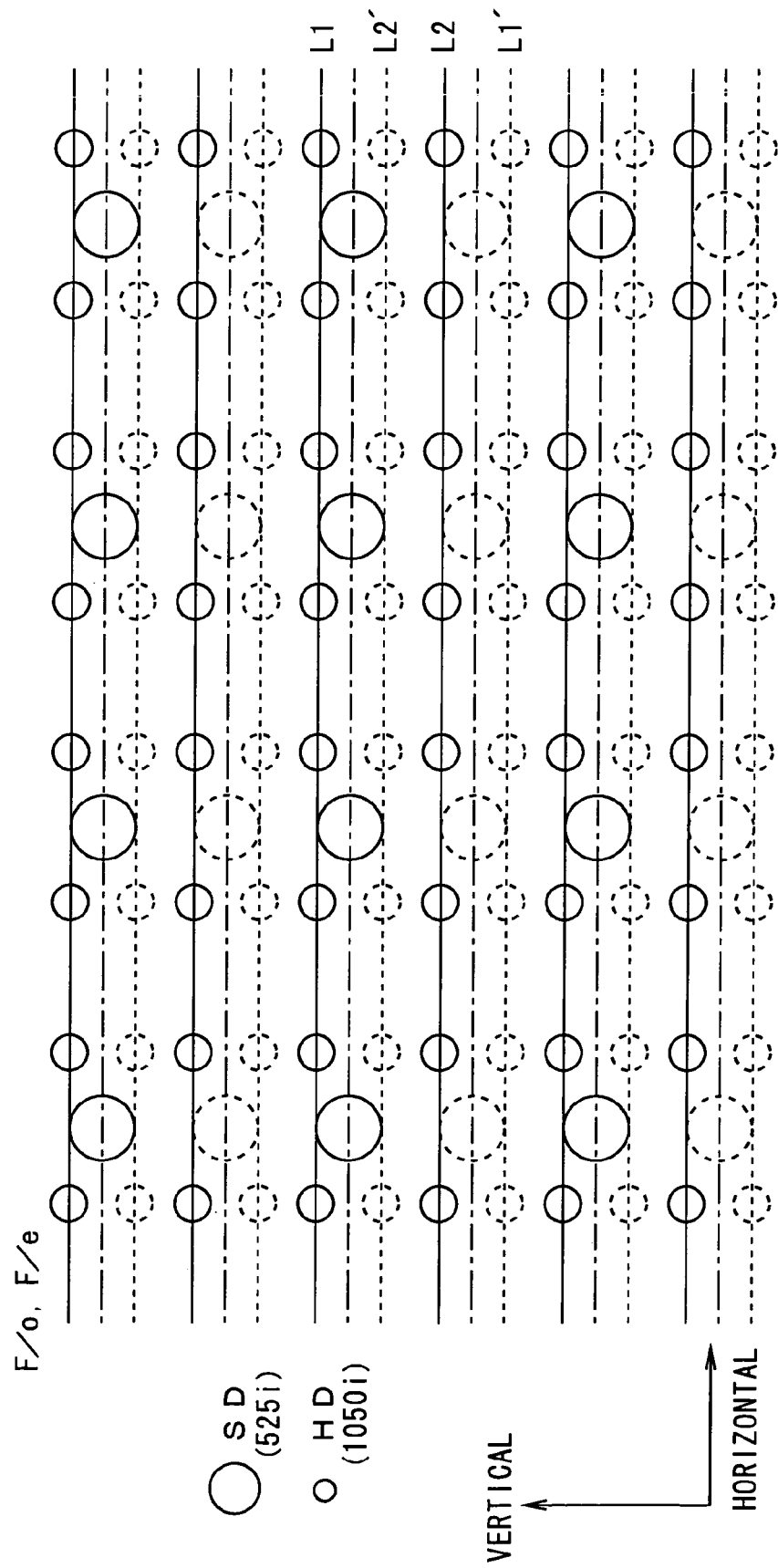
FIG. 2 is an illustration explaining a pixel position relationship between a 52*i* signal and a 1050*i* signal.

FIG. 2 shows a pixel position relationship of a certain frame (F) between the 525$i$ signal and the 1050$i$ signal, in which a pixel position of odd-number (o) fields is shown by a solid line and a pixel position of even-number (e) fields is shown by a broken line. A larger dot represents a pixel of the 525$i$ signal and a smaller dot represents a pixel of the 1050$i$ signal. As shown in FIG. 2, as the pixel data of the 1050$i$ signal are there multiple items of line data L1, L1' at the position near the line of the 525I signal and multiple items of line data L2, L2' at the position away from the line of the 525I signal.

Each of the line data L1, L1' represents line data in the odd-number field and the line data L2, L2 represents line data in the even-number field. Further, each line, of the 1050$i$ signal has pixels twice as many as those of each line of the 525$i$ signal.

Referring back to FIG. 1, the TV receiver 100 comprises a system controller 101 with a microcomputer for controlling the operations of the overall system, and a remote control signal receiving circuit 102 for receiving a remote control signal.

The remote control signal receiving circuit 102 is connected, in configuration, to the system controller 101, and it is constituted so as to receive a remote control signal RM which a remote control transmitter 200 transmits when the user operates the transmitter 200 and then to supply the system controller 101 with an operation signal corresponding to the signal RM.

Also, the TV receiver 100 also comprises a reception antenna 105, a tuner 106 for receiving a broadcast signal (RF modulated signal) captured by the reception antenna 105 and performing processing such as channel selection processing, intermediate-frequency amplification processing, wave detection processing to obtain the above-mentioned SD signal (525$i$ signal), and a buffer memory 109 for temporarily storing the SD signal received from the tuner 106.

Also, the TV receiver 100 comprises an image signal processing section 110 for converting the SD signal (525$i$ signal) temporarily stored in the buffer memory 109 into the HD signal (1050$i$ signal), a display section 111 for displaying an image produced by means of the HD signal received from the image signal processing section 110, an On-Screen Display (OSD) circuit 112 for generating a display signal SCH for displaying characters, graphics, etc. on a screen of the display section 111, and a synthesizer 113 for synthesizing the display signal SCH and the HD signal received from the image signal processing section 110, as described above, to then supply it to the display section 111.

The display section 111 comprises a Cathode Ray Tube (CRT) or a flat panel display such as a Liquid Crystal Display (LCD).

The following will describe the operations of the TV receiver 100 with reference to FIG. 1.

The SD signal (525i signal) transmitted from the tuner 106 is temporarily recorded on the buffer memory 109. Then, the SD signal temporarily stored in the buffer memory 109 is supplied to the image signal processing section 110, which converts it into an HD signal (1050i signal). That is, the image signal processing section 110 obtains pixel data constituting the HD signal (hereinafter called "HD pixel data sets") from pixel data constituting the SD signal (hereinafter called "SD pixel data sets"). The HD signal transmitted from the image signal processing section 110 is supplied to the display section 111, which then displays an image based on the HD signal on its screen.

Also, the user can operate the remote control transmitter 200 to adjust the horizontal and vertical resolutions of the image displayed on the screen of the display section 111 as mentioned above. The image signal processing section 110 calculates HD pixel data sets according to an estimation equation, which will be described later. As coefficient data to be used in this estimation equation, the data corresponding to parameters s, z for determining the respective horizontal and vertical resolutions is produced according to a production equation containing these parameters s, z and is used.

These parameters s, z are adjusted by the user through operations of the remote control transmitter 200. As such, the horizontal and vertical resolutions of the image based on the HD signal transmitted from the image signal processing section 110 result in a correspondence with the adjusted parameters s, z, respectively.

Figure 3:
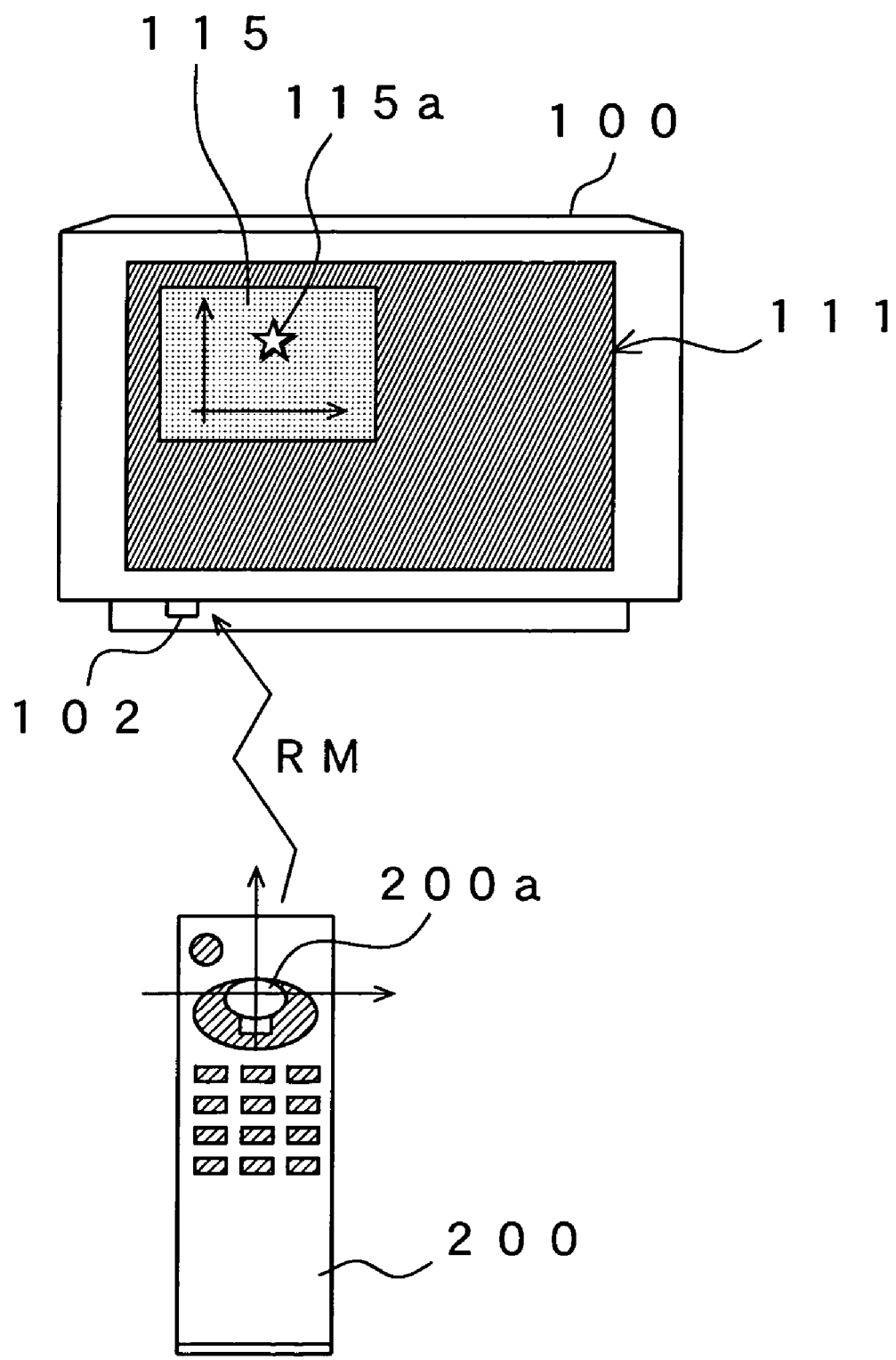
FIG. 3 is an illustration showing an example of a user interface for adjusting a picture quality.

FIG. 3 shows one example of a user interface for adjusting the parameters s, z. In adjustment, the display section 111 displays the adjustment screen 115 as OSD display wherein the adjustment position of the parameters s, z is indicated by a start-marked icon 115a. Also, the remote control transmitter 200 comprises a joystick 200a as user operation means.

The user can operate the joystick 200a to move the icon 115a on the adjustment screen 115, thereby adjusting a value of the parameters s, z for determining the horizontal and vertical resolutions.

Figure 4:
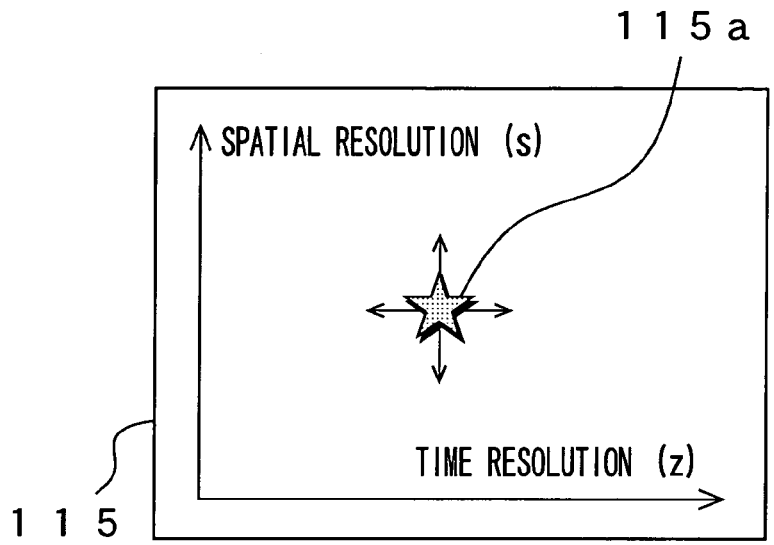
FIG. 4 is an expanded view showing an adjustment screen.

FIG. 4 shows an expanded part of the adjustment screen 115. When the icon 115a moves from side to side, the value of the parameter z for determining the time resolution (a resolution for time direction) can be adjusted, while when it moves up and down, the value of the parameter s for determining the spatial resolution (a resolution for spatial direction) can be adjusted.

The user can adjust the values of the parameters s, z with referencing the contents of the adjustment screen 115 displayed on the display section 111 so that the user can easily adjust the resolution thereof.

Incidentally, the remote control transmitter 200 may be equipped with, in place of the joystick 200a, any other pointing device such as a mouse or a track ball. Further, the values of the parameters s, z adjusted by the user may be displayed digitally on the adjustment screen 115.

The following will describe the details of the image signal processing section 110.

The image signal processing section 110 includes first through third tap selection circuits 121 to 123 each for selectively extracting, from the SD signal (525i signal) stored in the buffer memory 109, multiple items of SD pixel data located on a periphery of an objective position in the HD signal (1050i signal) and for transmitting them.

The first tap selection circuit 121 selectively extracts SD pixel data for use in prediction (hereinafter called "prediction tap"). The second tap selection circuit 122 selectively extracts SD pixel data for use in class grouping (hereinafter called "space class tap") corresponding to the distribution pattern of the levels of SD pixel data. The third tap selection circuit 123 selectively extracts SD pixel data for use in class grouping (hereinafter called "motion class tap") corresponding to motion. Note here that, if the space class is determined using SD pixel data that belongs to a plurality of fields, this space class also contains motion information.

The image signal processing section 110 also includes a space class detection circuit 124 for detecting a level distribution pattern of the data (SD pixel data) of a space class tap selectively extracted by the second tap selection circuit 122, detecting a space class based on this level distribution pattern, and then transmitting their class information.

If the space class is detected with respective SD pixel data being eight-bit data, the bulky class is generated. Thus, the space class detection circuit 124 performs a calculation such that, for example, the SD pixel data is compressed from eight bit-data into two bit-data. The space class detection circuit 124 then transmits the compressed data corresponding to respective SD pixel data as class information of the space class. According to this embodiment, the data compression is performed according to Adaptive Dynamic Range Coding (ADRC). Alternative to ADRC, the information may be compressed according to DPCM (prediction coding), VQ (Vector Quantization), etc.

Originally, although the ADRC has been developed as an adaptive re-quantization method for high-performance coding employed in a Video Tape Recorder (VTR), it is suitable for use in the above-mentioned data compression because it can efficiently represent a local pattern of a signal level with a small of word length. Assuming that, when the ADRC is employed, a maximum value and a minimum value of data (SD pixel data) of a space class tap are MAX and MIN, respectively, a dynamic range of the data of the space class tap is DR (=MAX−MIN+1), and the number of re-quantization bits is P, following Equation (1) can be calculated on each of the SD pixel data ki as space class tap data to obtain a re-quantization code qi as compressed data.

$$qi=[(ki-\text{MIN}+0.5).2^P/DR] \quad (1)$$

In the Equation (1), the portion enclosed with [ ] means truncation processing. If SD pixel data sets of Na are given as the space class tap data sets, term, "i" indicates 1 through Na.

Also, the image signal processing section 110 also includes a motion class detection circuit 125 for detecting a motion class for mainly representing a degree of motion from data (SD pixel data) of a motion class tap selectively extracted by the third tap selection circuit 123 and then transmitting their class information.

The motion class detection circuit 125 calculates inter-frame differences from the data (SD pixel data) mi and ni of the motion class tap selectively extracted by the third tap selection circuit 123 and then performs threshold processing on an average value of the absolute values of thus calculated differences to detect a motion class, which is an index of the motion.

That is, the motion class detection circuit 125 calculates an average value AV of the absolute values of the differences according to following Equation (2).

$$AV = \frac{\sum_{i=1}^{Nb} |mi - ni|}{Nb} \quad (2)$$

When the third tap selection circuit 123 extracts twelve items of SD pixel data of m1 through m6 and n1 through n6 as mentioned above, for example, Nb in the Equation (2) is six.

The motion class detection circuit 125 in turn compares thus calculated average value AV to one or a plurality of threshold values, thus obtaining class information MV of a motion class. In a case where, for example, three threshold values of th1, th2, and th3 (th1<th2<th3) are provided to detect four motion classes, if AV<th1, MV=0; if th1<AV<th2, MV=1; if th2<AV<th3, MV=2; and if th3<AV, MV=3.

Also, the image signal processing section 110 includes a class synthesis circuit 126 for obtaining a class code CL indicating a class including pixel data of an HD signal to be produced (1050$i$ signal), that is, pixel data of an objective position, based on a re-quantization code qi as the class information of the space class received from the space class detection circuit 124 and the class information MV of the motion class received from the motion class detection circuit 125.

The class synthesis circuit 126 calculates the class code CL according to following Equation (3).

$$CL = \sum_{i=1}^{Na} qi(2^P)^{i-1} + MV \cdot (2^P)^{Na} \quad (3)$$

Note here that in the Equation (3), Na indicates a number of items of data (SD pixel data) of the space class tap and P indicates a number of re-quantization bits by means of the ADRC.

Also, the image signal processing section 110 includes a coefficient memory 134. The coefficient memory 134 stores multiple items of coefficient data, Wi to be used in an estimation equation used in a later-described estimation/prediction calculation circuit 127.

The multiple items of coefficient data, Wi are used as information for converting the 525$i$ signal as an SD signal into the 1050$i$ signal as an HD signal. The coefficient memory 134 receives the class code CL, as read-out address information, from the above-mentioned class synthesis circuit 126. The multiple items of coefficient data, Wi, each corresponding to the class code CL, used in the estimation equation are then read out of the coefficient memory 134, and supplied to the estimation/prediction calculation circuit 127.

Also, the image signal processing section 110 includes an information memory bank 135. The later-described estimation/prediction calculation circuit 127 calculates HD pixel data y to be produced according to an estimation equation of following Equation (4) based on data (SD pixel data) xi of a prediction tap and coefficient data Wi read out of the coefficient memory 134.

$$y = \sum_{i=1}^{n} W_i \cdot x_i \quad (4)$$

where n is the number of prediction tap selected by the first tap selection circuit 121.

It is noted that the positions of n items of pixel data of a prediction tap selectively extracted by the tap selection circuit 121 have a distribution in spatial (horizontal and vertical) and time directions to the objective position in HD signal.

The multiple Items of coefficient data Wi (i=1-n) of this estimation equation are produced according to a production equation that contains parameters, s, z as shown by following Equation (5).

$$W_1 = w_{10} + w_{11}s + w_{12}z + w_{13}s^2 + w_{14}sz + \\ w_{15}z^2 + w_{16}s^3 + w_{17}s^2z + w_{18}sz^2 + w_{19}z^3 \quad (5)$$

$$W_2 = w_{20} + w_{21}s + w_{22}z + w_{23}s^2 + w_{24}sz + \\ w_{25}z^2 + w_{26}s^3 + w_{27}s^2z + w_{28}sz^2 + w_{29}z^3$$

$$\vdots$$

$$W_i = w_{i0} + w_{i1}s + w_{i2}z + w_{i3}s^2 + \\ w_{i4}sz + w_{i5}z^2 + w_{i6}s^3 + w_{i7}s^2z + w_{i8}sz^2 + w_{i9}z^3$$

$$\vdots$$

$$W_n = w_{n0} + w_{n1}s + w_{n2}z + w_{n3}s^2 + w_{n4}sz + \\ w_{n5}z^2 + w_{n6}s^3 + w_{n7}s^2z + w_{n8}sz^2 + w_{n9}z^3$$

The information memory bank 135 stores therein such multiple items of the coefficient seed data, $w_{10}$ through $w_{n9}$, which are the coefficient data in this production equation, for each class. How to produce the coefficient seed data sets will be described later.

When converting 525$i$ signal into 1050$i$ signal, it is necessary to get 4 pixels of 1050$i$ signal against each pixel of 525$i$ signal in each of the odd and even fields, as described above. In this case, 4 pixels in 2×2 unit pixel block constituting the 1050$i$ signal in each of the odd and even fields have different phase shift with respect to their central prediction tap.

FIG. 5 shows the phase shift from the central prediction tap $SD_0$ for 4 pixels $HD_1$-$HD_4$ in 2×2 unit pixel block constituting the 1050$i$ signal in the odd field. It is noted that the positions of $HD_1$-$HD_4$ are respectively offset from $SD_0$ by $k_1$-$k_4$ in the horizontal direction and by $m_1$-$m_4$ in the vertical direction.

FIG. 6 shows the phase shift from the central prediction tap $SD_0'$ for 4 pixels $HD_1'$-$HD_4'$ in 2×2 unit pixel block constituting the 1050$i$ signal in the even field. It is noted that the positions of $HD_1'$-$HD_4'$ are respectively offset from SD0' by $k_1'$-$k_4'$ in the horizontal direction and by $m_1'$-$m_4'$ in the vertical direction.

Therefore, the multiple items of coefficient seed data, $w_{10}$-$w_{n9}$ are stored in above described information memory bank 135 for each combination of the class and the output pixels ($HD_1$-$HD_4$, $HD_1'$-$HD_4'$).

Also, the image signal processing section 110 includes a coefficient production circuit 136 for producing the coefficient data Wi (i=1-n) to be used in the estimation equation for each class according to the Equation (5) using the coefficient seed data for each class and values of the parameters s, z wherein the coefficient data, Wi corresponds to the values of the parameters s, z. To this coefficient production circuit 136 are loaded the class-specific coefficient seed data from the information memory bank 135. Also, the system controller 101 supplies this coefficient production circuit 136 with values of the parameters s, z.

The above-mentioned coefficient memory 134 stores the coefficient data Wi (i=1-n) for each class produced by this coefficient production circuit 136. The coefficient production circuit 136 produces the coefficient data Wi for each class in, for example, each vertical blanking period. With this, even when the user has changed a value of the parameters s, z under the operation of the remote control transmitter 200, the class-specific coefficient data Wi stored in the coefficient memory 134 can be changed immediately in correspondence to thus changed value of the parameter h or v, thus permitting the user to adjust the resolution smoothly.

Also, the image signal processing section 110 includes a normalization coefficient production circuit 137 for calculating a normalized coefficient S according to following Equation (6), in which the normalized coefficient S corresponds to the class-specific coefficient data Wi (i=1-n) produced by the coefficient production circuit 136, and a normalization coefficient memory 138 for storing thus produced normalized coefficient S.

$$S = \sum_{i=1}^{n} W_i \qquad (6)$$

The normalization coefficient memory 138 receives the class code CL from the above-mentioned class synthesis circuit 126 as read-out address information, and the normalized coefficient S corresponding to the class code CL is read out of this normalization coefficient memory 138 and supplied to the normalization calculation circuit 128, which will be described later.

Also, the image signal processing section 110 includes the estimation/prediction calculation circuit 127 for calculating pixel data of an HD signal to be produced (that is, pixel data of an objective position), based on the data (SD pixel data) xi of the prediction tap selectively extracted by the first tap selection circuit 121 and the coefficient data Wi read out of the coefficient memory 134.

When converting the SD signal (525i signal) into the HD signal (1050i signal), this estimation/prediction calculation circuit 127 produces pixel data for each 2×2 unit pixel block constituting the HD signal since four pixels of HD signal (HD$_1$'-HD$_4$' as shown in FIG. 5, or HD$_1$-HD$_4$ as shown in FIG. 6) are associated with one pixel of SD signal, as described above. That is to say, the estimation/prediction calculation circuit 127 is supplied from the first tap selection circuit 121 the data xi of the prediction tap associated with four pixels (objective pixels) in one unit pixel block, and, from coefficient memory 134, coefficient data, Wi associated with the four pixels constituting the unit pixel block, to thereby calculate pixels data, $y_1$-$y_4$ for four pixels constituting the unit pixel block respectively, using the estimation equation (4).

Also, the image signal processing section 110 includes the normalization calculation circuit 128 for normalizing by dividing the pixel data, $y_1$-$y_4$ for four pixels received in order from the estimation/prediction calculation circuit 127 by the normalized coefficient S corresponding to the coefficient data Wi (i=1-n) read out of the normalization coefficient memory 138 and used in each production.

Although, as described above, the coefficient production circuit 136 produces the coefficient data, Wi to be used in the estimation equation, thus produced coefficient data contain a rounding error, so that a total sum of the coefficient data, Wi (i=1-n) do not always become 1.0. This causes the pixel data, $y_1$-$y_4$ calculated by the estimation/prediction calculation circuit 127 to fluctuate in level owing to the rounding error. As mentioned above, the fluctuations can be removed by normalization at the normalization calculation circuit 128.

The image signal processing section 110 includes a post-processing circuit 129 for receiving in order the data $y_1$'-$y_4$' for four pixels in the unit pixel block which have been normalized by the normalized calculation circuit 128, for performing linear ordering of the data, and for outputting the data of the 1050i format.

The image signal processing section 110 includes history information storage section 130 for storing history information on the values of the parameters s, z supplied from the system controller 101 to coefficient production circuit 136.

Figure 7:
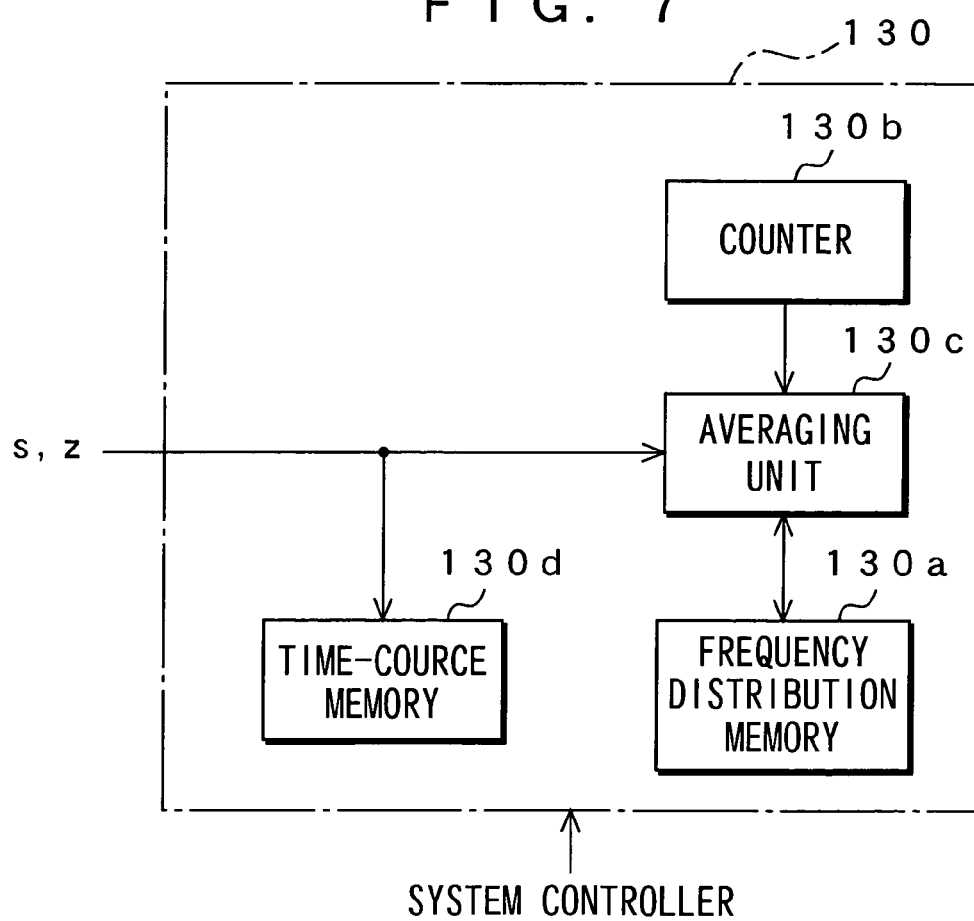
FIG. 7 is block diagram explaining a configuration of history information storage device.

Referring to FIG. 7, there is shown a configuration of the history information storage section 130. This history information storage section 130 has frequency distribution memory 130a for storing information on each frequency distribution of values of the parameters, s, z fed by the system controller 101 to the coefficient production circuit 136. The frequency distribution memory 130a stores averaged frequency of the respective values of the parameters, s, z. The frequency distribution memory 130a can be a non-volatile memory, for example, so as to hold the stored contents thereon if the television receiver 100 is powered off.

For the reason, the history information storage section 130 has a counter 130b for counting the frequency (count) of inputting the values of parameters, s, z to the coefficient production circuit 136, and averaging unit 130c for averaging the frequency for the values of the parameters, s, z based on the count of the counter 130b.

Count-up of counter 130b is controlled by the system controller 101. The counter 130b is counted up at end of the adjustment, though the user can adjust the values of the parameters, s, z on adjustment screen 115, as described above.

The averaging unit 130c obtains a new mean value of the new frequencies for the respective values of the parameters, s, z, using inputted values of the parameters, s, z, the count of the counter 130b, and the mean value of the frequencies for the preceding values of the parameters, s, z as stored in frequency distribution memory 130c.

In this instance, when the number of times of inputting is M, that is, the count of counter 130b is M, the new mean value $n_M$ of the new frequencies is obtained by the following formula, assuming that the mean value of the frequencies for the parameters up to the last inputting is $n_{M-1}$.

$$n_M = ((n_{M-1} \times (M-1)) + 1)/M$$

On the other hand, regarding the frequencies for values of parameters that differ from the inputted values of the parameters, the mean value $n_M$ of the new frequencies is given by the following formula, assuming that the number of times of inputting is M and that the preceding mean value of the frequencies for the values of the parameters is $n_{M-1}$.

$$n_M = (n_{M-1} \times (M-1))/M$$

In this way, overflow of a memory can be prevented by using the mean values of the frequencies for the respective the parameters, s, z as the information on the frequency distribution of the values of the parameters, s, z to be stored in frequency distribution memory 130.

It should be understood that instead of the mean values of the frequencies of the respective parameters, s, z, the values obtained by normalizing frequencies of the values of the respective parameters, s, z by the largest frequency may alternatively be used to prevent the overflow.

History information storage section 130 also has time-course memory 130d for storing the parameters, s, z, of a predetermined number, for example, 10 latest parameters, s, z, selected from the parameters that are inputted from the system controller 101 to the coefficient production circuit 136. The time-course memory 130d may be a non-volatile memory adapted to hold the contents it stored even when the power supply to television receiver 100 is cut off.

Write operations to the time-course memory 130*d* are performed under the control of the system controller 101. Although the user can adjust the values of the parameters, s, z on the adjustment screen 115, as described above, values of new parameters, s, z are written to the time-course memory 130*d* at the end of the adjustment. In such write operation, if the number of parameters, s, z stored exceeds a predetermined number, the value of the oldest parameters, s, z are deleted.

In television receiver 100, the board on which the image signal processing section 110 is installed is removably mounted so that the television receiver can be upgraded in functionality as needed. Therefore, the history information storage section 130 can be removed together with the substrate. It will be understood that only the history information storage section 130, the frequency distribution memory 130*a*, and the time-course memory 130*d* can be made removable.

The following will describe the operations of the image signal processing section 110.

Based on the SD signal (525*i* signal) stored in the buffer memory 109, the second tap selection circuit 122 selectively extracts data (SD pixel data sets) of a space class tap, which is located on a periphery of the four pixels (pixels at the objective position) in the unit pixel block constituting the HD signal (1050*i* signal) to be generated. In this case, the data (SD pixel data sets) of the space class tap selectively extracted by the second tap selection circuit 122 is supplied to the space class detection circuit 124. This space class detection circuit 124, in turn, performs ADRC processing on respective SD pixel data given as the data of the space class tap to thereby obtain a re-quantization code qi as the class information of the space class (class grouping for mainly indicating a waveform in the space)(see the Equation (1)).

Also, based on the SD signal (525*i* signal) stored in the buffer memory 109, the third tap selection circuit 123 selectively extracts data (SD pixel data) of a motion class tap, which is located on a periphery of the four pixels (pixels at the objective position) in the unit pixel block constituting the HD signal (1050*i* signal) to be generated. In this case, the data (SD pixel data sets) of the motion class tap selectively extracted by the third tap selection circuit 123 is supplied to the motion class detection circuit 125. This motion class detection circuit 125 in turn obtains class information MV of the motion class (class grouping for mainly indicating a degree of motion) from respective SD pixel data given as data of the motion class tap.

This motion information MV and the above-mentioned re-quantization code qi are supplied to the class synthesis circuit 126. This class synthesis circuit 126 in turn obtains the class code CL indicating a class including four pixels (pixels at the objective position) in the unit pixel block for each unit pixel block constituting the HD signal (1050*i* signal) to be produced on the basis of this motion information MV and the re-quantization code qi (see the Equation (3)). This class code CL is then supplied as read-out address information to the coefficient memory 134 and the normalization coefficient memory 138.

During each vertical blanking period, for example, the coefficient production circuit 136 produces the coefficient data, Wi (i=1-n) to be used in the estimation equation for each combination of the class and output pixels (HD$_1$-HD$_4$, HD$_1$'-HD$_4$') class, wherein the coefficient data, Wi corresponds to values of the parameters, s, z, adjusted by the user, using coefficient seed data w10-wn9, coefficient data Wi (i=1-n) of the estimation equation are calculated (See equations (5)). The coefficient memory 134 then stores them therein. On the other hand, the normalized coefficient memory 138 stores normalization coefficient S, generated by normalized coefficient calculation unit 137 (see equation (6)) and corresponding to the coefficient data Wi (i=1-n) of the estimation equation calculated by the coefficient production circuit 136, as described above.

As the class code CL is supplied to coefficient memory 134 as readout-address information, coefficient data Wi of the estimation equation for four output pixels (HD$_1$-HD$_4$ in a odd field and HD$_1$'-HD$_4$' in an even field) corresponding to that class code CL are read out of the coefficient memory 134 and supplied to the estimation/prediction calculation circuit 127.

Also, based on the SD signal (525*i* signal) stored in the buffer memory 109, the first tap selection circuit 121 selectively extracts the data (SD pixel data) of a prediction tap, which is located on a periphery of the four pixels (pixels at the objective position) in the unit pixel block constituting the HD signal (1050*i* signal) to be generated.

The estimation/prediction calculation circuit 127 calculates the data $y_1$-$y_4$ of the four pixels (pixels at the objective position) in the unit pixel block constituting the HD signal to be produced (see equation (4)) using data (SD pixel data) xi of the prediction tap and coefficient data, Wi read out of the coefficient memory 134. The data y1-y4 of the four pixels in the unit pixel block constituting the HD signal received in order from the estimation/prediction calculation circuit 127 is supplied to normalized calculation circuit 128.

As described above, normalized coefficient memory 138 is supplied with the class code CL as readout-address information to read the normalization coefficient S corresponding to the class code CL, that is, normalization coefficient S corresponding to the coefficient data, Wi used in the calculation of HD pixel data, $y_1$-$y_4$, outputted from the estimation/prediction calculation circuit 127. The normalization coefficient S is supplied to the normalized calculation circuit 128.

In the normalized calculation circuit 128, HD pixel data, y1-y4, outputted from the estimation/prediction calculation circuit 127 is normalized by dividing it by the corresponding normalization coefficients S.

This normalization eliminates fluctuations in level of the data, y1-y4 due to the rounding errors induced in the calculation of coefficient data, Wi in the coefficient production circuit 136.

Data, $y_1'$-$y_4'$ of the four pixels in the unit pixel block normalized in, and outputted in sequence from the normalized calculation circuit 128 are supplied to the post-processing circuit 129.

In this post-processing circuit 129, data, $y_1'$-$y_4'$ of four pixels in the unit pixel block supplied in sequence from the normalized calculation circuit 128 is linearly ordered before it has been outputted therefrom in a 1050*i* format. Thus, the post-processing circuit 129 outputs 1050*i*-formatted signal as HD signal.

In this way, HD pixel data y is calculated in the image signal processing section 110 using the coefficient data, Wi(i=1-n) of the estimation equation corresponding to the values of the adjusted parameters, s, z. Thus, the user can adjust the values of parameters, s, z to thereby adjust the resolutions of the image of the HD signal in the space direction and in the time direction as well. It should be appreciated that coefficient data of each class corresponding to the values of the adjusted parameters, s, z can be produced by the coefficient production circuit 136 as they are needed, and hence that a memory for storing a huge amount of coefficient data is not necessary, thereby facilitating saving a memory space.

The user can adjust the values of the parameters, s, z on adjustment screen 115, as described above. Frequency distribution memory 130a of the history information storage section 130 (FIG. 7) stores information on each frequency distribution of the values of the parameters, s, z entered into the coefficient production circuit 136 from the system controller 101. The time-course memory 130d of the history information storage section 130 (FIG. 7) stores the values of the latest parameters, s, z of a predetermined number, for example, 10 items among the parameters, s, z entered into the coefficient production circuit 136 from the system controller 101.

In this way, the history information stored in the frequency distribution memory 130a and the time-course memory 130d of the history information storage section 130 may be utilized to generate the coefficient seed data $w_{10}$-$w_{n9}$ to be stored in the information memory bank 135 when the board containing the image signal processing section 110 is replaced to upgrade the television receiver 100.

Next, an example of a method of producing coefficient seed data, w10-wn9 will now be described. Here, an example is given for producing coefficient seed data, $w_{10}$-$w_{n9}$, which is coefficient data in the production equation of the Equation (5).

Here, for the following explanation, the terms tj (j=0 through 9) are defined as following Equation (7).

$$t_0=1, t_1=s, t_2=z, t_3=s^2, t_4=sz, t_5=z^2, t_6=s^3, t_7=s^2z,$$
$$t_8=sz^2, t_9=z^3 \qquad (7)$$

By using the Equation (7), the Equation (5) is transformed into following Equation (8):

$$W_j = \sum_{i=0}^{9} w_{ji} t_i \qquad (8)$$

Finally, an undetermined coefficient wij is obtained by learning. That is, for each combination of the class and the output pixel, by using multiple items of SD pixel data and multiple items of HD pixel data, a coefficient value that minimizes a square error is determined. That is, the least square method is employed for solution. Supposing the number of times of learning to be m, a residual error in the data of the k-th ($1 \leq k \leq m$) learning to be $e_k$, and a total sum of square errors to be E, the value of E can be given by following Equation (9) based on the Equations (4) and (5).

$$E = \sum_{k=1}^{m} e_k^2 \qquad (9)$$
$$= \sum_{k=1}^{m} [y_k - (W_1 x_{1K} + W_2 x_{2K} + \ldots + W_n x_{nK})]^2$$
$$= \sum_{k=1}^{m} \{y_k - [(t_0 w_{10} + t_1 w_{11} + \ldots + t_9 w_{19}) x_{1k} + \ldots +$$
$$(t_0 w_{n0} + t_1 w_{n1} + \ldots + t_9 w_{n9}) x_{nk}]\}^2$$
$$= \sum_{k=1}^{m} \{y_k - [(w_{10} + w_{11} s + \ldots + w_{19} z^3) x_{1k} + \ldots +$$
$$(w_{n0} + w_{n1} s + \ldots + w_{n9} z^3) x_{nk}]\}^2$$

In the equation, terms $x_{ik}$ indicate the k-th pixel data of an i-th prediction tap position of an SD image and terms $y_k$ indicate k-th pixel data of the corresponding k-th HD image.

According to a solution by use of the least square method, a value of $w_{ij}$ that makes partial differentiation of the Equation (9) into zero is calculated. This is indicated by following Equation (10).

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0 \qquad (10)$$

Assuming terms $X_{ipjq}$ and $Y_{ip}$ as given in following Equations (11) and (12), the Equation (10) can be changed into following Equation (13) by use of matrix.

$$X_{ipjq} = \sum_{k=1}^{m} x_{ik} t_p x_{jk} t_q \qquad (11)$$

$$Y_{ip} = \sum_{k=1}^{m} x_{ik} t_p y_k \qquad (12)$$

$$\begin{bmatrix} X_{1010} & X_{1011} & X_{1012} & \cdots & X_{1019} & X_{1020} & \cdots & X_{10n9} \\ X_{1110} & X_{1111} & X_{1112} & \cdots & X_{1119} & X_{1120} & \cdots & X_{11n9} \\ X_{1210} & X_{1211} & X_{1212} & \cdots & X_{1219} & X_{1220} & \cdots & X_{12n9} \\ \vdots & \vdots & \vdots & \ddots & \vdots & \vdots & \ddots & \vdots \\ X_{1910} & X_{1911} & X_{1912} & \cdots & X_{1919} & X_{1920} & \cdots & X_{19n9} \\ X_{2010} & X_{2011} & X_{2012} & \cdots & X_{2019} & X_{2020} & \cdots & X_{20n9} \\ \vdots & \vdots & \vdots & \ddots & \vdots & \vdots & \ddots & \vdots \\ X_{n910} & X_{n911} & X_{n912} & \cdots & X_{n919} & X_{n920} & \cdots & X_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix} \qquad (13)$$

This equation is generally referred to as a normal equation. This normal equation is solved with respect to $w_{ij}$ using a sweeping-out method (Gauss-Jordan's elimination method) and the like, thus calculating the coefficient seed data sets.

FIG. 8 shows a concept of the above-mentioned method for producing the coefficient seed data. Specifically, a plurality of SD signals is produced from an HD signal. For example, SD signals of total 81 kinds are produced with the parameters, s, z for varying a spatial band (regarding a horizontal direction and a vertical direction) and time band (regarding frame direction) of a filter used at the time of producing the SD signals from the HD signal being varied respectively at nine steps. By performing learning between a plurality of SD signals thus produced and the HD signal, the coefficient seed data is produced.

Figure 9:
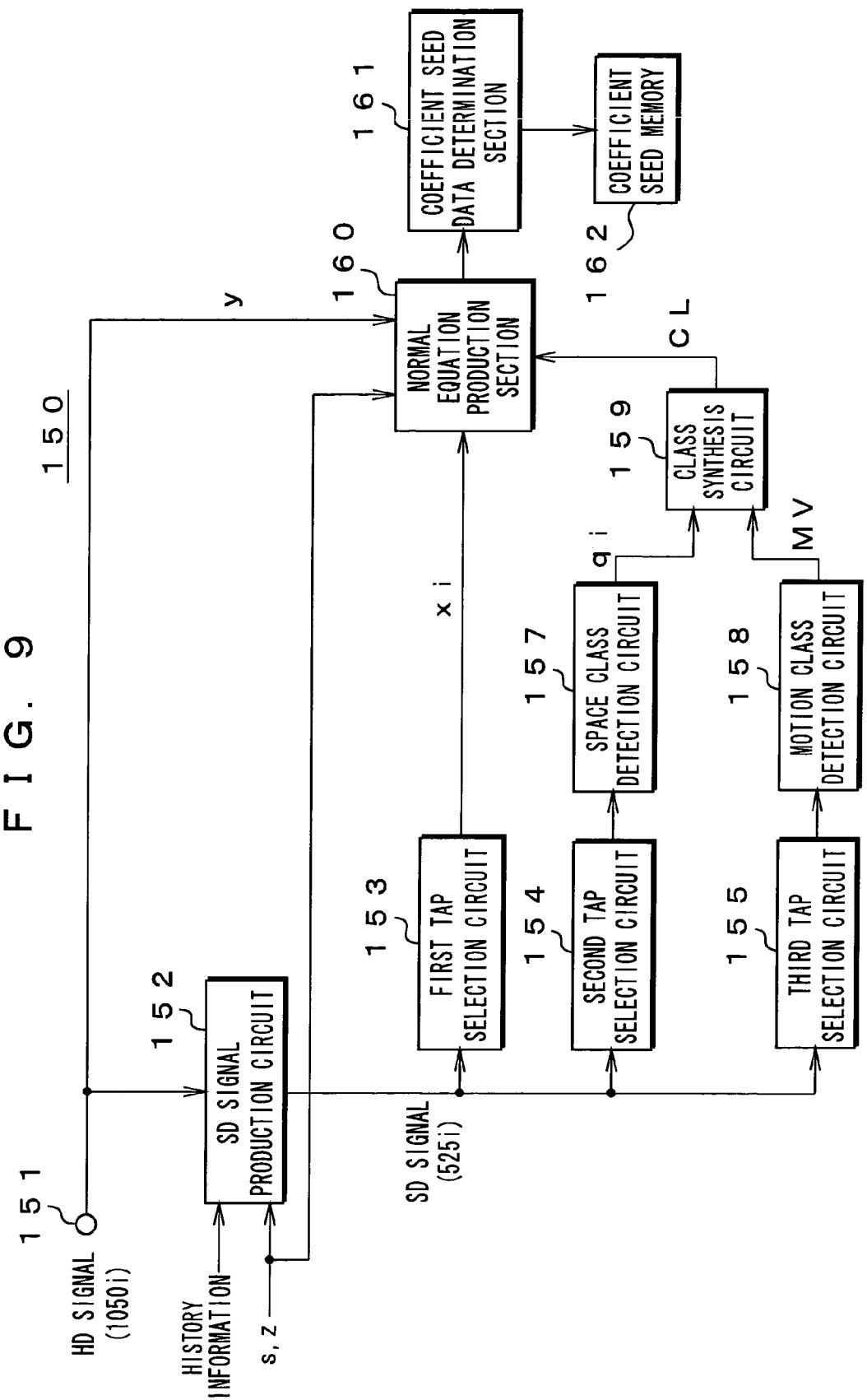
FIG. 9 is a block diagram showing a configuration example of a coefficient seed data production device.

FIG. 9 shows a configuration of a coefficient seed data production device 150 for producing the coefficient seed data, w10-wn9 to be stored in the information memory bank 135 of the above television receiver 100.

This coefficient seed data production device 150 includes an input terminal 151 for receiving the HD signal (1050i signal) as a teacher signal, and an SD signal production circuit 152 for performing a thinning-out processing on this HD signal horizontally and vertically to thereby obtain SD signal as a student signal.

The SD signal production circuit 152 is supplied with the values of the parameters, s, z corresponding to the values of parameters, s, z used in the television receiver 100 (FIG. 1) described above. In the SD signal production circuit 152, the band of a band limiting filter used in generating an SD signal from an HD signal is varied in spatial and time directions based on the parameters, s, z.

The SD signal production circuit 152 receives the history information on the values of inputted parameters, s, z which has been stored in the frequency distribution memory 130a and time-course memory 130d of the history information storage section 130 of the television receiver 100 described above.

It is noted that the history information is not stored in the SD signal production circuit 152 when the coefficient seed data, $w_{10}$-$w_{n9}$ to be stored in the information memory bank 135 of a new television receiver 100 is produced for the first time, since the history information has not yet been stored in the frequency distribution memory 130a and time-course memory 130d of the history information storage section 130.

In short, the history information is inputted to the SD signal production circuit 152 when, for example, the board that includes the image signal processing section 110 is replaced to upgrade the television receiver 100 and the coefficient seed data w10-wn9 to be stored in the information memory bank 135 is produced.

In the SD signal production circuit 152, values of inputted parameters, s, z are adjusted based on the history information, and the bands of space and time directions are then varied in accordance with the values of the adjusted parameters, s, z. In the event that no history information is entered, the bands of the space and time directions are varied directly in accordance with the values of the inputted parameters, s, z.

At this stage, in the television receiver 100, the respective values of the parameters, s, z are adjusted in predetermined steps, for example, within a range of 0-8 under the user operation, to adjust resolutions on the space and time directions.

Figure 10:
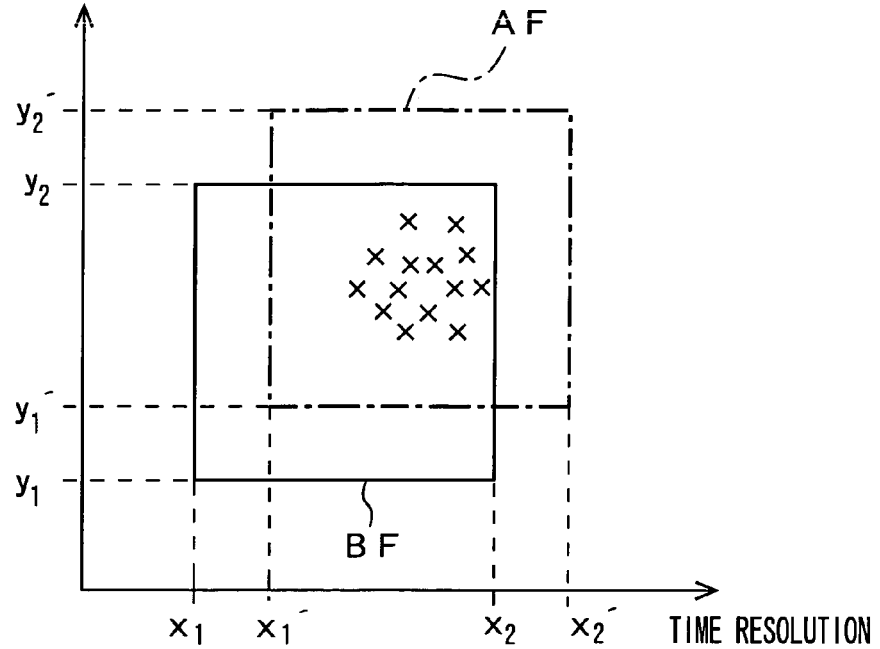
FIG. 10 is an illustration for explaining variation in a range of resolution adjustment.

If, in this case, the bands of space and time directions are varied in accordance with the values of the parameters, s, z themselves inputted to the SD signal production circuit 152, coefficient seed data, $w_{10}$-$w_{n9}$ are produced in television receiver 100 so that the resolutions can be adjusted within a range BF as shown in FIG. 10 by a solid-line frame (range of spatial resolution being $y_1$-$y_2$, and range of time-wise resolution being $x_1$-$x_2$).

In the SD signal production circuit 152, when the history information is input, the position of center-of-gravity is calculated using the information on the frequency distribution for values of each of the parameters, s, z. In this case, values of the latest parameters, s, z of a predetermined number are weighted with larger weights. Thus, in the SD signal production circuit 152, the values of the inputted parameters, s, z are adjusted based on the center-of-gravity. In this instance, the bands are narrowed as the value of parameters, s, z increase. Accordingly, the resolutions of the television receiver 100 (FIG. 1) are adjusted to improve as the values of the parameters, s, z are increased.

In the example shown herein, the values of the inputted parameters, s, z are linearly transformed so as to cause the center of the adjustable range of the parameters, s, z to be shifted towards the center-of-gravity in the television receiver 100. For example, when the values of the center of the adjustable range of the parameters, s, z that can be adjusted in television receiver 100 are s0 and z0, the values of the center-of-gravity are sm and zm, and the values of the inputted parameters, s, z are s1 and z1, the values of the adjusted parameters, s, z will be given by the following transformation equations.

$$s2=s1+(sm-s0); \text{ and } z2=z1+(zm-z0)$$

When the bands of space and time directions are adjusted in accordance with the values of the adjusted parameters, s, z in this way, coefficient seed data, $w_{10}$-$w_{n9}$ is generated in the television receiver 100 such that resolutions can be adjusted within the range as shown in FIG. 10 by a dotted line frame AF (range of spatial resolution being $y_1'$-$y_2'$, range of time-wise resolution being $x_1'$-$x_2'$) having a center-of-gravity of resolution adjustable positions (marked with x) inside the region indicated by a solid line frame BF of FIG. 10.

In the example describe above, newer values of parameters, s, z are weighted with larger weight to obtain the position of center-of-gravity based on the information on the frequency distribution for the respective values of the parameters, s, z. However, an alternative center-of-gravity not weighted with weight may be used. Further, a position of the center-of-gravity may be used that is obtained without using information on the frequency distribution but obtained by weighting the values of the latest parameters, s, z of a predetermined number with larger weights. Further, the position of the center-of-gravity may be replaced by the values of the parameters, s, z having the largest frequencies as determined based on information on the frequency distributions for the respective values of the parameters, s, z. Still further, the position of the center-of-gravity may be replaced by the values of the newest parameters, s, z among the parameters, s, z of a predetermined number.

Referring back to FIG. 9, is shown that the coefficient seed data production device 150 has a first through a third tap selection circuits 153-155 each for selectively extracting and output multiple items of the SD pixel data, that are located on a periphery of an objective point of the associated HD signal (1050i signal), from an SD signal (525i signal) outputted from SD signal production circuit 152. These first through third tap selection circuits 153-155 can be the same configuration as those of the first through third tap selection circuits 121-123 of the above image signal processing section 110.

The coefficient seed data production device 150 also includes space class detection circuit 157 for detecting the level distribution pattern of the data (SD pixel data) of the space class tap selectively extracted by the second tap selection circuit 154, detecting the space class of the data based on the level distribution pattern thus detected, and outputting the class information thereof.

This space class detection circuit 157 has the same configuration as that of the space class detection circuit 124 of the image signal processing section 110 described above. This space class detection circuit 157 generates re-quantization code qi for each SD pixel data representative of data of the space class tap and outputs the code qi as class information indicative of the space class of the data.

The coefficient seed data production device 150 also includes motion class detection circuit 158 for mainly detecting the motion class that indicates a degree of motion from the data (SD pixel data) of motion class tap selectively extracted by the third taps selection circuit 155, and for outputting class information MV associated with the motion class.

This motion class detection circuit 158 has the same configuration as that of the motion class detection circuit 125 of the image signal processing section 110, as described above. The motion class detection circuit 158 calculates an inter-frame difference for data (SD pixel data) of the motion class tap selectively extracted by the third tap selection circuit 155, and to perform threshold processing on the mean value of the absolute value of the difference, thereby detecting the motion class as an index of the motion thereof.

In detecting the motion class, a motion vector may be used in place of the degree of motion.

The coefficient seed data production device 150 includes class synthesis circuit 159 for receiving class information of the space class in the form of re-quantization code qi from the space class detection circuit 157 and the class information MV of motion class from the class information 158, to produce, based on the re-quantization code qi and the class information MV, class code CL indicative of the class including the objective pixel relative to the HD signal (1050i signal). This class synthesis circuit 159 also has the same configuration as that of the class synthesis circuit 126 of the image signal processing section 110 as described above.

The coefficient seed data production device 150 further includes normal equation production section 160 for producing normal equation (equation (13)) for obtaining coefficient seed data, w10-wn9 for each class, based on respective HD pixel data y representing the pixel data at the objective position obtained from the HD signal supplied to the input terminal 151, data (SD pixel data) xi of the prediction tap selectively extracted by the first tap selection circuit 153 in correspondence to the respective HD pixel data y, values of the parameters, s, z, and the class code CL outputted from class synthesis circuit 159 in correspondence to the respective HD pixel data y.

In this case, learning data are generated for each combination of one item of HD pixel data, y and the corresponding data (SD pixel data) xi of n prediction taps. The bands of spatial and time directions in the SD signal production circuit 152 are varied in association with the change in the values of the adjusted parameters, s, z, which results in a sequence of multiple SD signals, and resultant learning data establishes relationship between the respective HD signal and the associated SD signals.

Thus, in the normal equation production unit 160, a set of normal equations involving multiple items of registered learning data associated with different values of the parameters, s, z is generated, enabling calculation of the coefficient seed data, w10-wn9.

It is noted that in this case, the learning data is generated for one combination of one item of HD pixel data y and the corresponding data (SD pixel data) xi of n prediction taps. In the normal equation production section 160, normal equation is generated for each of the output pixels ($HD_1$-$HD_4$ of FIG. 5 and $HD_1'$-$HD_4'$ of FIG. 6). For example, normal equation associated with HD1 is generated from the learning data consisting of HD pixel data y having the same deviation relative to the central prediction tap as HD1.

The coefficient seed data production device 150 also includes coefficient seed data determination section 161 for receiving the data of the normal equation produced in the normal equation production section 160 for each combination of the class and the output pixel, resolving the normal equation, and determining the coefficient seed data, $w_{10}$-$w_{n9}$ for each combination of the class and the output pixel. The coefficient seed data production device 150 also includes coefficient seed memory 162 for storing the coefficient seed data thus determined. In coefficient seed data determination section 161, the normal equation is solved by a sweep method, for example, to obtain the coefficient seed data.

Referring again to FIG. 9, operation of the coefficient seed data production device 150 will now be described.

An HD signal (1050i signal) is supplied to the input terminal 151 as a teacher signal, which signal is subjected to horizontal and vertical thinning-out operation in the SD signal production circuit 152 to output an SD signal (525i signal) as a student signal.

In this case, the values of the parameters, s, z are inputted to the SD signal production circuit 152 to determine spatial and time-wise resolutions, which determine the bands of space direction and time direction of the limiting filter used in producing an HD signal from a given SD signal.

In a case where, for example, the board containing the image signal processing section 110 is exchange for upgrading television receiver 100 and coefficient seed data, $W_{10}$-$w_{n9}$ to be stored in the information memory bank 135 is generated, the history information on the past parameters manually inputted by the user into the frequency distribution memory 130a and the time-course memory 130d of the history information storage section 130 in the substrate that has been exchanged is inputted.

If the history information is entered in the SD signal production circuit 152, the values of the parameters, s, z are adjusted based on the history information. For example, the center-of-gravity of parameters, s, z is calculated based on the history information, and the values of the parameters, s, z are subjected to a linear transformation such that the center of the adjustable range of the parameters, s, z, adjustable on side of television receiver 100, is moved to the center of gravity. Then, in the SD signal production circuit 152, the bands of the band limiting filter used in generating an SD signal from an HD signal as described above are changed in the space direction as well as in time direction in accordance with the values of adjusted parameters, s, z.

In a case where the coefficient seed data, w10-wn9 to be stored in information memory bank 135 of a brand new television receiver 100 is generated, bands of the space and time directions of the band limiting filter, which is used in generating an SD signal from an HD signal, are varied as described above in accordance with the inputted values of the parameters, s, z, because there is no history information then.

As the values of the parameters, s, z inputted to the SD signal production circuit 152 are varied in sequence, the bands of space and time directions of the band limiting filter used in generating an SD signal from a given HD signal are varied accordingly. As a consequence, multiple SD signals varying in the bands of space and time directions in stages are generated.

Data (SD pixel data) of a space class tap located o a periphery of the objective position in the HD signal (1050i signal) is selectively extracted in the second tap selection circuit 154, from the SD signal (525i signal) generated by the SD signal production circuit 152. The data (SD pixel data) of the space class tap selectively extracted by the second tap selection circuit 154 are supplied to the space class detection circuit 157.

In the space class detection circuit 157, ADRC processing is subjected to respective SD pixel data as the space class tap, to obtain re-quantization code qi as the class information on the space class (classes for mainly describing waveforms in space). (See equation (1).)

From the SD signal generated by the SD signal production circuit 152, data (SD pixel data) of a motion class tap located on a periphery of the objective pixel in the HD signal, is selectively extracted in the third tap selection circuit 155. The data (SD pixel data) of the motion class tap selectively extracted by the third tap selection circuit 155 is supplied to the motion class detection circuit 158. In this motion class detection circuit 158, the class information MV on the motion class (motion classes mainly representing the degree of motion) is obtained from respective SD pixel data as the data of the motion class tap.

The class information MV and the re-quantization code qi described above are supplied to class synthesis circuit 159. In this class synthesis circuit 159, a class code CL for denoting the class including the pixel data of the objective position in the HD signal (1050i) is obtained from the class information MV and re-quantization code qi.

In the first tap selection circuit 153, the data (SD pixel data) of a prediction tap located on a periphery of the objective position in the HD signal is selectively extracted from the SD signal produced by the SD signal production circuit 152.

In the normal equation production section 160, a normal equation (equation (13)) for respectively producing the coefficient seed data, $w_{10}$-$w_{n9}$ is generated for each combination of the class and the output pixels, from the HD pixel data y as the pixel data at the objective position obtained from the HD signal supplied to input terminal 151, the data (SD pixel data) xi of the prediction tap selectively extracted in the first tap selection circuit 153 in association with the respective HD pixel data y, values of the parameters s, z, and the class code CL outputted from class synthesis circuit 159 in association with the respective HD pixel data y.

The respective normal equations are solved by the coefficient seed data determination section 161 for coefficient seed data, $w_{10}$-$w_{n9}$ for each combination of the class and the output pixel. The coefficient seed data, $w_{10}$-$w_{n9}$ is stored in the coefficient seed data memory 162.

In this way, the coefficient seed data production unit 150 shown in FIG. 9 can generate the coefficient seed data, w10-wn9, which is used for the estimation equation, to be stored in the information memory bank 135 of the image signal processing section 110 shown in FIG. 1, for each combination of the class and the output pixels ($HD_1$-$HD_4$ and $HD_1'$-$HD_4'$).

In this coefficient seed data production device 150, when the coefficient seed data, $w_{10}$-$w_{n9}$ (to be stored in information memory bank 135 of the image signal processing section 110 of television receiver 100 (FIG. 1)) is formed, the history information on the values of the parameters, s, z, which have been inputted by the user beforehand and has been stored in the frequency distribution memory 130a and the time-course memory 130d of the history information storage section 130 of the television receiver 100, is stored in the SD signal production circuit 152.

This history information is inputted in the coefficient seed data production device 150 in such occasion as replacement of the board that includes the image signal processing section 110 through an upgrade of the television receiver 100, a transmission via a network or the like.

The values of the inputted parameters, s, z are adjusted in the SD signal production circuit 152 based on the history information. Based on the adjusted parameters, s, z, the bands of space and time directions of the band limiting filter for use in generating an SD signal from an HD signal can be varied.

By storing and using the coefficient seed data, w10-wn9 thus obtained in the information memory bank 135 of the board, which contains the image signal processing section 110, newly installed on the upgraded television receiver 100, the user can adjust the values of the parameters, s, z to by adjust resolutions within a range (frame AF defined by a dotted line in FIG. 10) centered at a position of the center-of-gravity of the adjustable domain of the resolution available in the past. In other words, it is possible to automatically set up an adjustable range of resolution in which the user can adjust the resolutions according to his taste.

Next, an alternative approach to the production of the coefficient seed data will now be described. This is also an example in which the coefficient seed data, $w_{10}$-$w_{n9}$ is produced for use as the coefficient data of the production equation (5).

Figure 11:
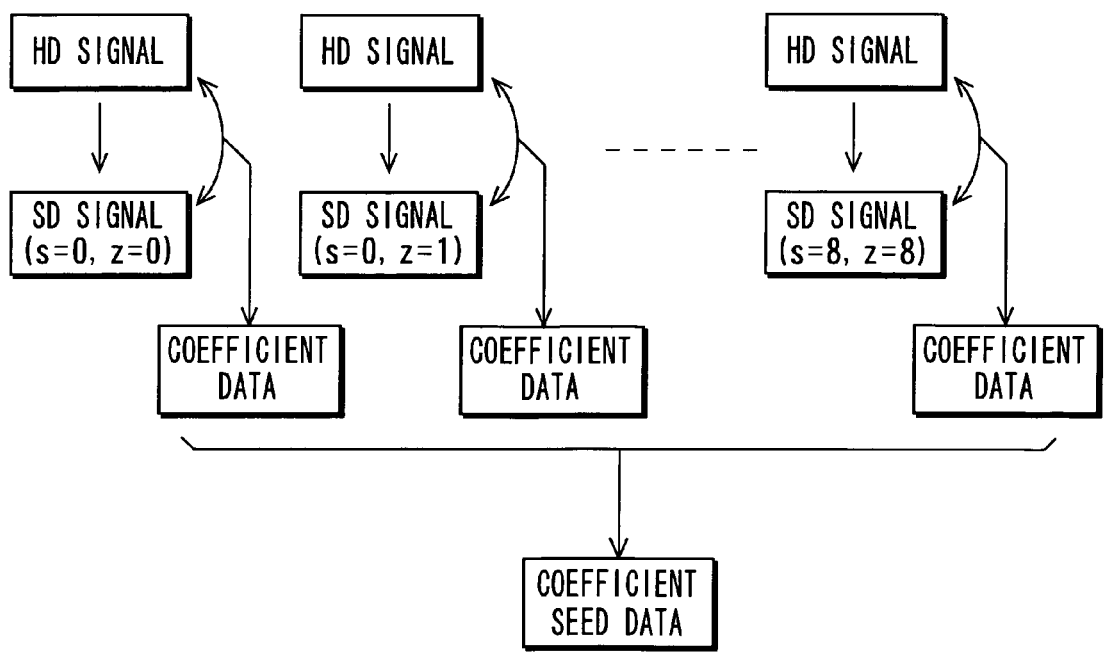
FIG. 11 is an illustration showing another example of the method for producing coefficient seed data.

FIG. 11 shows the concept of this example. Multiple SD signals are generated from an HD signal. For example, each of the variable parameters, s, z that make the filtering band of a filter used in generating SD signals from the HD signal variable in the space direction (vertical and horizontal directions) and in the time direction (frame direction), is varied in 9 stages, thereby enabling production of 81 items of SD signals in total. By repeating learning between each of the SD signals thus generated and the HD signal, the coefficient data, Wi associated with the estimation equation (4) is generated. Then, the coefficient seed data is generated using the coefficient data, Wi produced for each of the SD signals.

First, a method of producing the coefficient data of the estimation equation will be described. In the example shown herein, the coefficient data, Wi (i=1-n) of the estimation equation (4) is obtained according to the least-square method. As a general example, following observation equation (14) is considered:

$$XW = Y \tag{14}$$

$$X = \begin{bmatrix} x11 & x12 & \cdots & x1n \\ x21 & x22 & \cdots & x2n \\ \cdots & \cdots & \cdots & \cdots \\ xm1 & xm2 & \cdots & xmn \end{bmatrix}, W = \begin{bmatrix} w1 \\ w2 \\ \cdots \\ wn \end{bmatrix}, Y = \begin{bmatrix} y1 \\ y2 \\ \cdots \\ ym \end{bmatrix}$$

where X is an inputted data, W coefficient data, and Y a predicted value. In equation (14), m is the number of items of the leaning data, and n is the number of prediction taps.

The least squares method is applied to the data collected by the observation equation (14). On the basis of the observation equation (14), following residual equation (15) is constructed:

$$XW = Y + E, E = \begin{bmatrix} e1 \\ e2 \\ \cdots \\ em \end{bmatrix} \tag{15}$$

In view of the residual equation (15), the most probable values of the respective Wi are considered to be the values for which $e^2$ given by following equation (16) is minimum. That is, it is necessary to take the conditions of following Equation (17) into account.

$$e^2 = \sum_{i=1}^{m} e_i^2 \tag{16}$$

$$e_1 \frac{\partial e_1}{\partial w_i} + e_2 \frac{\partial e_2}{\partial w_i} + \ldots + e_m \frac{\partial e_m}{\partial w_i} = 0 \quad (i = 1, 2, \ldots, n) \tag{17}$$

That is, conditions in the number of n based on the value i in the Equation (17) are considered, and $W_1, W_2, \ldots, W_n$ having values satisfying these conditions may be calculated. As such, from the residual equation of the Equation (15), following Equation (18) can be obtained. Further from the Equations (18) and (14), following Equation (19) can be obtained.

$$\frac{\partial e_i}{\partial w_1} = x_{i1}, \frac{\partial e_i}{\partial w_2} = x_{i2}, \ldots, \frac{\partial e_i}{\partial w_n} = x_{in} \quad (i = 1, 2, \ldots, m) \tag{18}$$

$$\sum_{i=1}^{m} e_i x_{i1} = 0, \sum_{i=1}^{m} e_i x_{i2} = 0, \ldots, \sum_{i=1}^{m} e_i x_{in} = 0 \tag{19}$$

From the Equations (15) and (19), a normal equation of following Equation (20) can be obtained.

$$\begin{cases} \left(\sum_{j=1}^{m} x_{j1} x_{j1}\right) w_1 + \left(\sum_{j=1}^{m} x_{j1} x_{j2}\right) w_2 + \ldots + \left(\sum_{j=1}^{m} x_{j1} x_{jn}\right) w_n = \\ \qquad\qquad\qquad\qquad\qquad\qquad \left(\sum_{j=1}^{m} x_{j1} y_j\right) \\ \left(\sum_{j=1}^{m} x_{j2} x_{j1}\right) w_1 + \left(\sum_{j=1}^{m} x_{j2} x_{j2}\right) w_2 + \ldots + \left(\sum_{j=1}^{m} x_{j2} x_{jn}\right) w_n = \\ \qquad\qquad\qquad\qquad\qquad\qquad \left(\sum_{j=1}^{m} x_{j2} y_j\right) \\ \ldots \\ \left(\sum_{j=1}^{m} x_{jn} x_{j1}\right) w_1 + \left(\sum_{j=1}^{m} x_{jn} x_{j2}\right) w_2 + \ldots + \left(\sum_{j=1}^{m} x_{jn} x_{jn}\right) w_n = \\ \qquad\qquad\qquad\qquad\qquad\qquad \left(\sum_{j=1}^{m} x_{jn} y_j\right) \end{cases} \tag{20}$$

Since the normal equation of the Equation (20) is capable of making equations in the same number as unknown number n, the most probable value of each Wi can be obtained. In this case, the simultaneous equations are solved using the sweeping-out method etc.

The following will describe how to obtain the coefficient seed data sets using the coefficient data produced in correspondence to each of the SD signals.

Suppose coefficient data in a certain class, which is obtained as a result of learning performed by use of the SD signals corresponding to the parameters, s, z, to be $k_{szi}$. Herein, the term i indicates a prediction tap number. From this value of $k_{szi}$, coefficient seed data of this class is obtained.

The coefficient data, Wi (i=1-n) is given by the above-mentioned Equation (5) using the coefficient seed data, $w_{10}$ through $w_{n9}$. Herein, under the consideration that the least square method has bee used on the coefficient data, Wi, the residual is given by following Equation (21).

$$e_{szi} = k_{szi} - (w_{i0} + w_{i1}s + w_{i2}z + w_{i3}s^2 + w_{i4}sz + w_{i5}z^2 + \tag{21}$$
$$w_{i6}s^3 + w_{i7}s^2z + w_{i8}sz^2 + w_{i9}z^3)$$
$$= k_{szi} - \sum_{j=0}^{9} w_{ij}t_j$$

Herein, the term $t_j$ is given in the above-mentioned Equation (7). By performing the least square method on the Equation (21), following Equation (22) can be obtained.

$$\frac{\partial}{\partial w_{ij}} = \sum_s \sum_z (e_{szi})^2 = \sum_s \sum_z 2\left(\frac{\partial e_{szi}}{\partial w_{ij}}\right) e_{szi} \tag{22}$$
$$= -\sum_s \sum_z 2t_j e_{szi}$$
$$= 0$$

Herein, by defining $X_{jk}$ and $Y_j$ to be such as given in following Equations (23) and (24), respectively, the Equation (22) is changed to following Equation (25).

$$X_{jk} = \sum_s \sum_z t_j t_k \tag{23}$$

$$Y_j = \sum_s \sum_z t_j k_{szi} \tag{24}$$

$$\begin{bmatrix} X_{00} & X_{01} & \cdots & X_{09} \\ X_{10} & X_{11} & \cdots & X_{19} \\ \vdots & \vdots & \ddots & \vdots \\ X_{90} & X_{91} & \cdots & X_{99} \end{bmatrix} \begin{bmatrix} w_{i0} \\ w_{i1} \\ \vdots \\ w_{i9} \end{bmatrix} = \begin{bmatrix} Y_0 \\ Y_1 \\ \vdots \\ Y_9 \end{bmatrix} \tag{25}$$

This Equation (25) is also a normal equation and so can be solved by a general solution such as the sweeping-out method, thus calculating the coefficient seed data, $w_{10}$ through $w_{n9}$.

Figure 12:
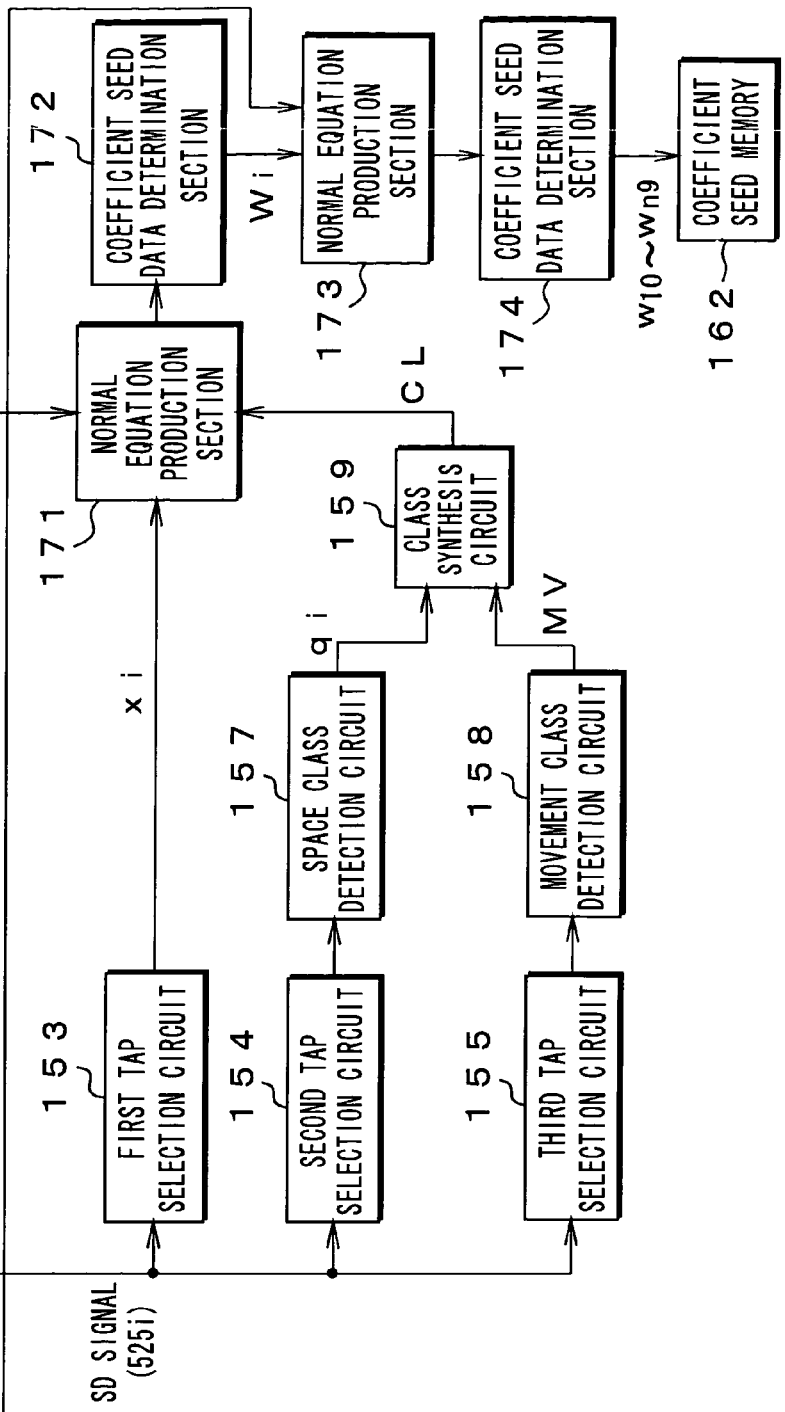
FIG. 12 is a block diagram showing a configuration example of another coefficient seed data production device.

FIG. 12 shows a configuration of another coefficient seed data production device 150' for producing coefficient seed data based on a concept shown in FIG. 11. In FIG. 12, components that correspond to those in FIG. 9 are indicated by the same reference symbols and their detailed description is omitted.

The coefficient seed data production device 150' includes normal equation production section 171 for producing a normal equation (see the Equation (20)) to be used for obtaining coefficient data, Wi (i=1-n) for each combination the class and the output pixel (see $HD_1$-$HD_4$ of FIG. 5 and $HD_1'$-$HD_4'$ of FIG. 6), based on the respective HD pixel data y given as pixel data of the objective position obtained from the HD signal received at the input terminal 151, the data (SD pixel data) $x_i$ of the prediction tap selectively extracted by the first tap selection circuit 153 respectively in correspondence with the respective HD pixel data y thus obtained, and the class codes CL received from the class synthesis circuit 159 respectively in correspondence with the respective HD pixel data sets y thus obtained.

In this case, learning data is produced in combination of one item of the HD pixel data y and the pixel data of the prediction tap in the number of n corresponding thereto. The bands of space and time directions in the SD signal production circuit 152 vary in correspondence with a change of the values of the parameters, s, z, so that a plurality of SD signals are sequentially produced, thus producing learning data between the HD signal and each of the SD signals. This permits the normal equation production section 171 to produce a normal equation for obtaining the coefficient data, Wi (i=1-n) for each combination of the class and the output pixel in respective correspondence with each of the SD signals.

Also, the coefficient seed data production device 150' includes a coefficient data decision section 172 for receiving data of the normal equation produced by the normal equation production section 171 to then solve this normal equation in order to obtain the coefficient data, Wi for each combination of the class and the output pixel in respective correspondence to each SD signal, and a normal equation production section 173 for producing a normal equation (see the Equation (25)) for obtaining the coefficient seed data, $w_{10}$ through $w_{n9}$ for each combination of the class and the output pixel using the coefficient data, Wi that correspond to the values of the parameters, s, z and each of the SD signals.

Also, the coefficient seed data production device 150' includes a coefficient seed data determination section 174 for receiving data of the normal equation produced for each combination of the class and the output pixel by the normal equation production section 173 to then solve the normal equation for each combination thereof in order to obtain the coefficient seed data, $w_{10}$ through $w_{n9}$ for each combination of the class and the output pixel, and the coefficient seed memory 162 for storing coefficient seed data, $w_{10}$ through $w_{n9}$ thus obtained.

The other components of the coefficient seed data production device 150' shown in FIG. 12 are constituted like those of the coefficient seed data production device 150 shown in FIG. 9.

The following will describe the operations of the coefficient seed data production device 150' as shown in FIG. 12. At the input terminal 151, an HD signal (1050i signal) as a teacher signal is supplied. Then, the HD signal is subjected to the thinning-out processing horizontally and vertically in the SD signal production circuit 152, thus producing the SD signal (525i signal) as the student signal.

The values of the parameters, s, z inputted into the SD signal production circuit 152 are sequentially changed, thereby varying the bands of space and time directions of the band limiting filter used in generating an SD signal from an HD signal, so that multiple SD signals varying in steps in the bands of space and time directions in stages are sequentially produced, If the history information is entered into the SD signal production circuit 152, the values of the parameters, s, z are adjusted based on the history information, and the bands of space and time directions to be used in generating an SD signal from an HD signal as described above are varied in accordance with the values of the adjusted parameters, s, z.

Based on the SD signals (525i signals) produced in the SD signal production circuit 152, the second tap selection circuit 154 selectively extracts the data (SD pixel data) of a space class tap located on a periphery of an objective position in the HD signal (1050i signal). The data (SD pixel data) of the space class tap selectively extracted by this second tap selection circuit 154 is supplied to the space class detection circuit 157.

This space class detection circuit 157 performs ADRC processing on respective SD pixel data given as the data of the space class tap to thereby obtain a re-quantization code qi used as class information of a space class (class grouping mainly for indicating of a waveform in a space) (see the Equation (1)).

Also, based on the SD signals produced by the SD signal production circuit 152, the third tap selection circuit 155 selectively extracts the data (SD pixel data) of a motion class tap located on a periphery of the objective position in the HD signal. The data (SD pixel data) of the motion class tap selectively extracted by this third tap selection circuit 155 is supplied to the motion class detection circuit 158. This motion class detection circuit 158 obtains class information MV of a motion class (class grouping for mainly indicating a degree of motion) based on respective SD pixel data given as data of the motion class tap.

The motion information MV and the above-mentioned re-quantization code qi are supplied to the class synthesis circuit 159. This class synthesis circuit 159 obtains a class code CL that indicates a class including pixel data of an objective position in the HD signal (1050i signal), based on this motion information MV and the re-quantization code qi (see the Equation (3)).

Also, based on the SD signals produced by the SD signal production circuit 152, the first tap selection circuit 153 selectively extracts the data (SD pixel data) of a prediction tap located on a periphery of the objective position in the HD signal.

Then, the normal equation production section 171 produces a normal equation (see the Equation (20)) for obtaining coefficient data, $W_i$ (i=1-n) for each combination of the class and the output pixel in correspondence to the respective SD signals produced by the SD signal production circuit 152 based on respective HD pixel data y given as pixel data of the objective position obtained from the HD signal received at the input terminal 151, the data (SD pixel data) xi of a prediction tap selectively extracted by the first tap selection circuit 153 in correspondence to the respective HD pixel data y thus given, and the class code CL received from the class synthesis circuit 159 in correspondence to the respective HD pixel data y thus given.

Then, this normal equation is solved by the coefficient data decision section 172 so that the coefficient data, Wi for each combination of the class and the output pixel in correspondence to the respective SD signals can be obtained. Based on the class-specific coefficient data, Wi corresponding to each of the SD signals, the normal equation production section 173 produces a normal equation (see the Equation (25)) for obtaining the coefficient seed data, $w_{10}$-$w_{n9}$ for each combination of the class and the output pixel.

Then, this normal equation is solved by the coefficient seed data decision section 174 so that the coefficient seed data, $w_{10}$ through $w_{n9}$ for each combination of the class and the output pixel can be obtained. The coefficient seed data, $w_{10}$-$w_{n9}$ are stored in the coefficient seed memory 162.

Thus, the coefficient seed data production device 150' shown in FIG. 12 can also produce the coefficient seed data, $w_{10}$ through $w_{n9}$ for each combination of the class and the output pixel ($HD_1$-$HD_4$ of FIG. 5 and $HD_1'$-$HD_4'$ of FIG. 6) which is to be stored in the information memory bank 135 of the image signal processing section 110 shown in FIG. 1.

In this coefficient seed data production device 150' too, the values of inputted parameters, s, z are adjusted in the SD signal production circuit 152 based on the history information. Based on the adjusted parameters, s, z, the bands of the space direction (vertical and horizontal directions) and time direction of the band limiting filter for use in generating an SD signal from an HD signal can be varied. Thus, by storing the coefficient seed data, w10-wn9 thus obtained in the information memory bank 135 of the new board that contains the image signal processing section 110 installed on an upgraded television receiver 100, the user can adjust the values of the parameters, s, z to adjust resolutions within a range (frame AF defined by a dotted line in FIG. 10) centered at the position of the center-of-gravity of the adjustable domain of resolution available in the past.

It will be understood that the production equation (5) used to generate the coefficient data, Wi (i=1-n) in the image signal processing section 110 of FIG. 1, can be applied equally well to other cases in which equations involve polynomials of different orders and/or different functions.

In the image signal processing section 110 of FIG. 1, resolutions of space and time directions in the image are adjusted by setting up a parameter s that determines a resolution of space direction (vertical and horizontal directions) and a parameter z that determines a resolution of time direction (frame direction) and adjusting the parameters, s, z. It will be understood that the image signal processing section 110 can be extended to include other parameters for determining picture qualities thereof. For example, the parameters may include a parameter determining the degree of noise reduction, in addition to the parameters determining vertical and horizontal resolutions.

Although the image signal processing section 110 of FIG. 1 is shown to have two adjustable parameters, s, z, it will be apparent that the processing section 110 can be configured to include only one parameter or at least three parameters. In that case too, the history information of the respective parameters is stored in the history information storage section 130. The coefficient seed data production device 150 shown in FIG. 9 and the coefficient seed data production device 150' shown in FIG. 12 can generate necessary data in a manner similar to those described above using the history information on the respective parameters.

Figure 13:
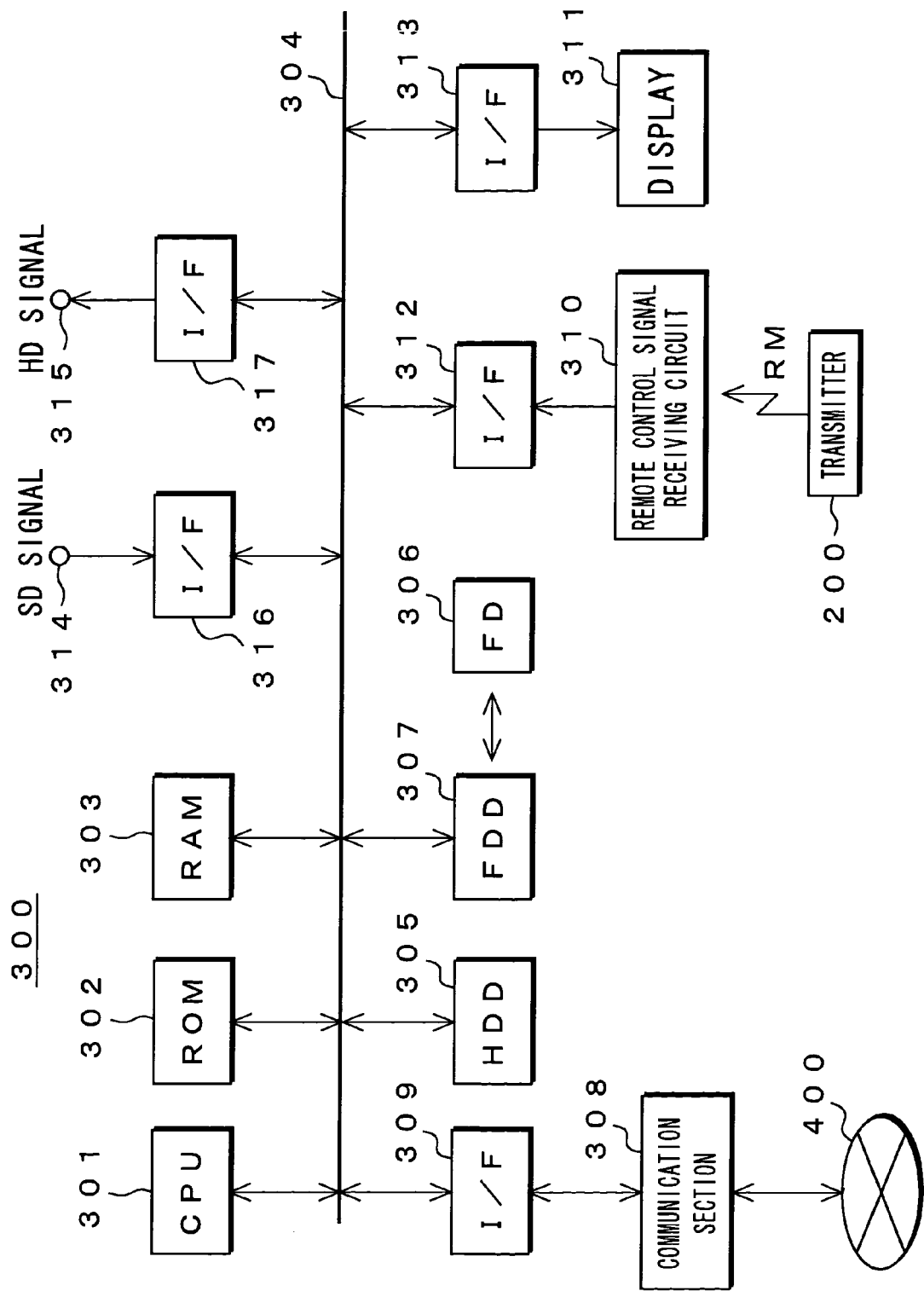
FIG. 13 is a block diagram showing a configuration example of image signal processing apparatus implemented in software.

Incidentally, it is possible to implement the processing of the image signal processing section 110 shown in FIG. 1 as software implementation executed by image signal processing device 300, for example, shown in FIG. 13.

First, the image signal processing device 300 will now be described. This image signal processing device 300 comprises a CPU 301 for controlling the operations of the apparatus as a whole, a ROM (Read Only Memory) 302 for storing operation programs of this CPU 301, coefficient seed data, etc., and a RAM (Random Access Memory) 303 constituting a work area for the CPU 301. These CPU 301, ROM 302, and RAM 303 are all connected to a bus 304.

Also, the image signal processing device 300 comprises a hard disk drive (HDD) 305 and a floppy disk (registered trademark) drive (FDD) 307 for driving a floppy disk 306, which are used as an external memory. These drives 305 and 307 are both connected to the bus 304.

Also, the image signal processing device 300 comprises a communication section 308 for connecting to a communication network 400 such as the Internet through either wired transmission or wireless transmission. This communication section 308 is connected to the bus 304 via an interface 309.

Also, the image signal processing device 300 comprises a user interface section. This user interface section has a remote control signal receiving circuit 310 for receiving a remote control signal RM from a remote control transmitter 200, and a display 311 consisting of an Liquid Crystal Display (LCD) and the like. The remote control signal receiving circuit 310 is connected via an interface 312 to the bus 304 and, similarly, the display 311 is connected via an interface 313 to the bus 304.

Also, the image signal processing device 300 comprises an input terminal 314 for receiving the SD signal, and an output terminal 315 for transmitting the HD signal. The input terminal 314 is connected via an interface 316 to the bus 304 and, similarly, the output terminal 315 is connected via an interface 317 to the bus 304.

Instead of storing the processing programs, the coefficient seed data, etc. in the ROM 302 beforehand as mentioned above, for example, they may be downloaded via the communication section 308 from the communication network 400 such as the Internet, and accumulated on the hard disk or in the RAM 303 for use. Also, these processing programs, the coefficient seed data, etc. may be provided on the floppy disk 306.

Also, instead of inputting the SD signal to be processed through the input terminal 314, the SD signal may be recorded on the hard disk beforehand or downloaded via the communication section 308 from the communication network 400 such as the Internet. Also, instead of transmitting processed HD signal through the output terminal 315 or concurrent with this, an image of the processed HD signal may be supplied to the display 311 to be displayed thereon, the processed HD signal may be stored on the hard disk or it may be sent via the communication section 308 to the communication network 400 such as the Internet.

Figure 14:
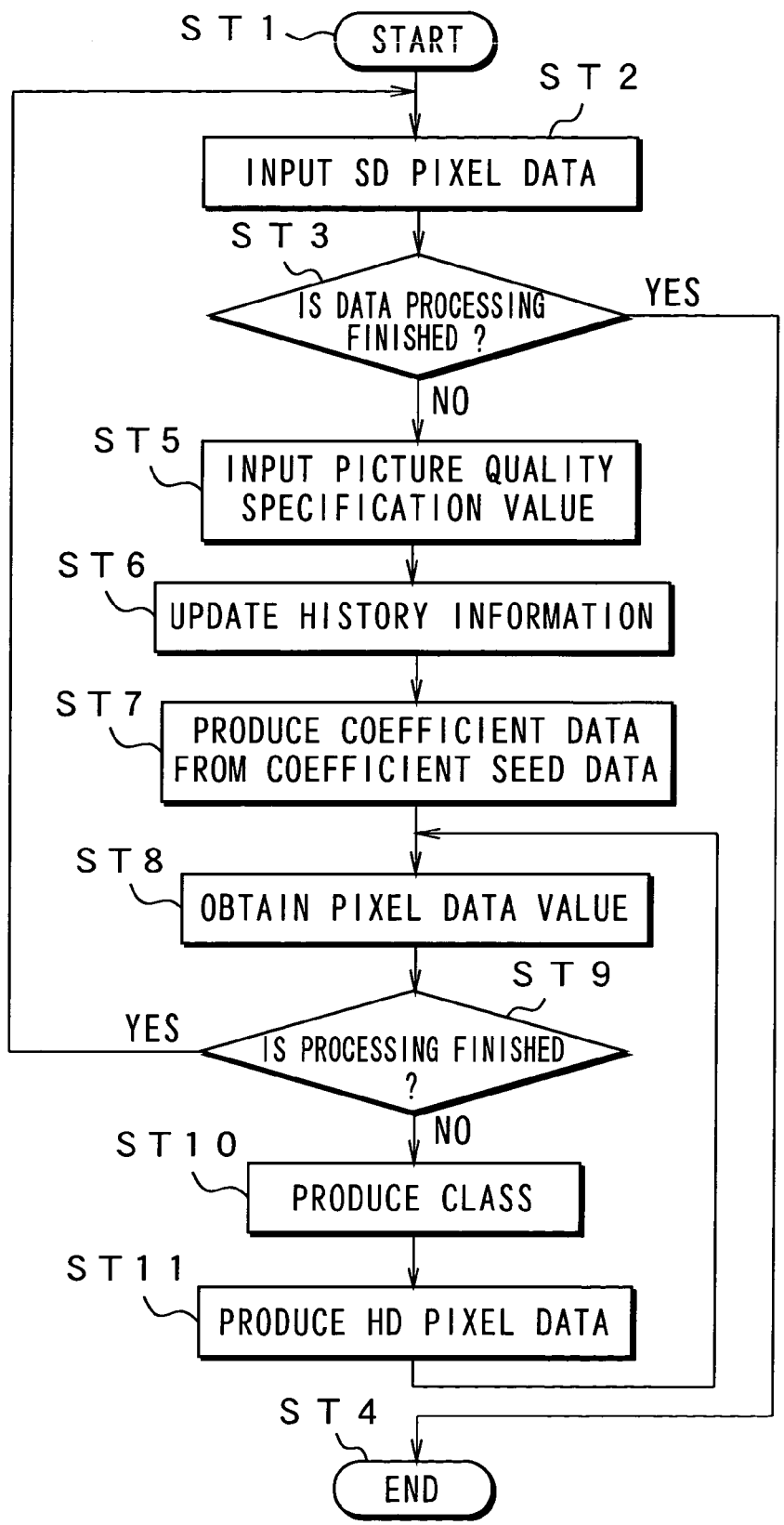
FIG. 14 is a flowchart for illustrating image signal processing.

The following will describe a processing procedure for obtaining an HD signal from an SD signal at the image signal processing device 300 shown in FIG. 13 with reference to a flowchart of FIG. 14.

First, the processing starts at step ST1 and, at step ST2, SD pixel data is input in units of a frame or a field. If the SD pixel data is input through the input terminal 314, then the RAM 303 temporarily stores the SD pixel data. Also, if the SD pixel is recorded on a hard disk, then the SD pixel data is read out of the hard disk drive 305 and the RAM 303 temporarily stores it.

At step ST3 then, it is judged whether or not the processing of the input SD pixel data in all the frames or fields is finished. If it is finished, then the process finishes at step ST4. Contrarily, if it is not finished, then the procedure goes to step ST5.

At step ST5, a picture quality specification value (for example, the parameters, s, z) input by the user under the control of the remote control transmitter 200 is read out of the RAM 303, for example. At step ST6, when new picture quality specification value has been input, the history information (corresponding to the contents of frequency distribution memory 130$a$ and time-course memory 130$d$ of the history information storage section 130 in the television receiver 100 of FIG. 1) stored, for example, in the hard disk is updated.

At step ST7 then, the coefficient data, Wi to be used in the estimation equation (see the Equation (4)) for each combination of the class and the output pixel (HD$_1$-HD$_4$ of FIG. 5 and HD$_1$'-HD$_4$' of FIG. 6) is produced according to a production equation (see the Equation (5)) using thus read picture quality specification value and the coefficient seed data sets for each combination thereof.

Next, at step ST8, based on the SD pixel data inputted at step ST2, pixel data of class taps and prediction taps corresponding to the respective HD pixel data to be produced is obtained. At step ST9 then, it is judged whether or not the processing of obtaining the HD pixel data in all the regions of the input SD pixel data is finished. If it is finished, then the procedure returns to step ST2, thus shifting to the processing of inputting SD pixel data of the next frame or field. On the other hand, if it is not finished, then the procedure goes to step ST10.

At step ST10, a class code CL is produced from the SD pixel data of the class taps obtained at step ST7. At step ST11 then, the HD pixel data is produced according to the estimation equation using the coefficient data, Wi corresponding to that class code CL and the SD pixel data of the prediction taps, and then the procedure returns to step ST8 wherein the above-mentioned processing is repeated.

Thus, the processing along the flowchart shown in FIG. 14 is performed to process the SD pixel data that constitutes the input SD signal, so that HD pixel data that constitutes the HD signal can be obtained. As mentioned above, the HD signal thus processed and obtained is transmitted through the output terminal 315 or supplied to the display 311 that displays an image thereon or even supplied to the hard disk drive 305 that records it on a hard disk.

The history information stored in the hard disk, for example, is utilized when new coefficient seed data are used at step ST7, as described above. By the use of new coefficient seed data thus produced, picture quality can be adjusted within the adjustable range that suits the user's taste. It will be apparent that the history information may be stored in a removable memory such as a memory card, instead of a hard disk.

Also, the processing at the coefficient seed data production device 150 of FIG. 9 can be carried out software-wise by a processing apparatus, not shown.

Figure 15:
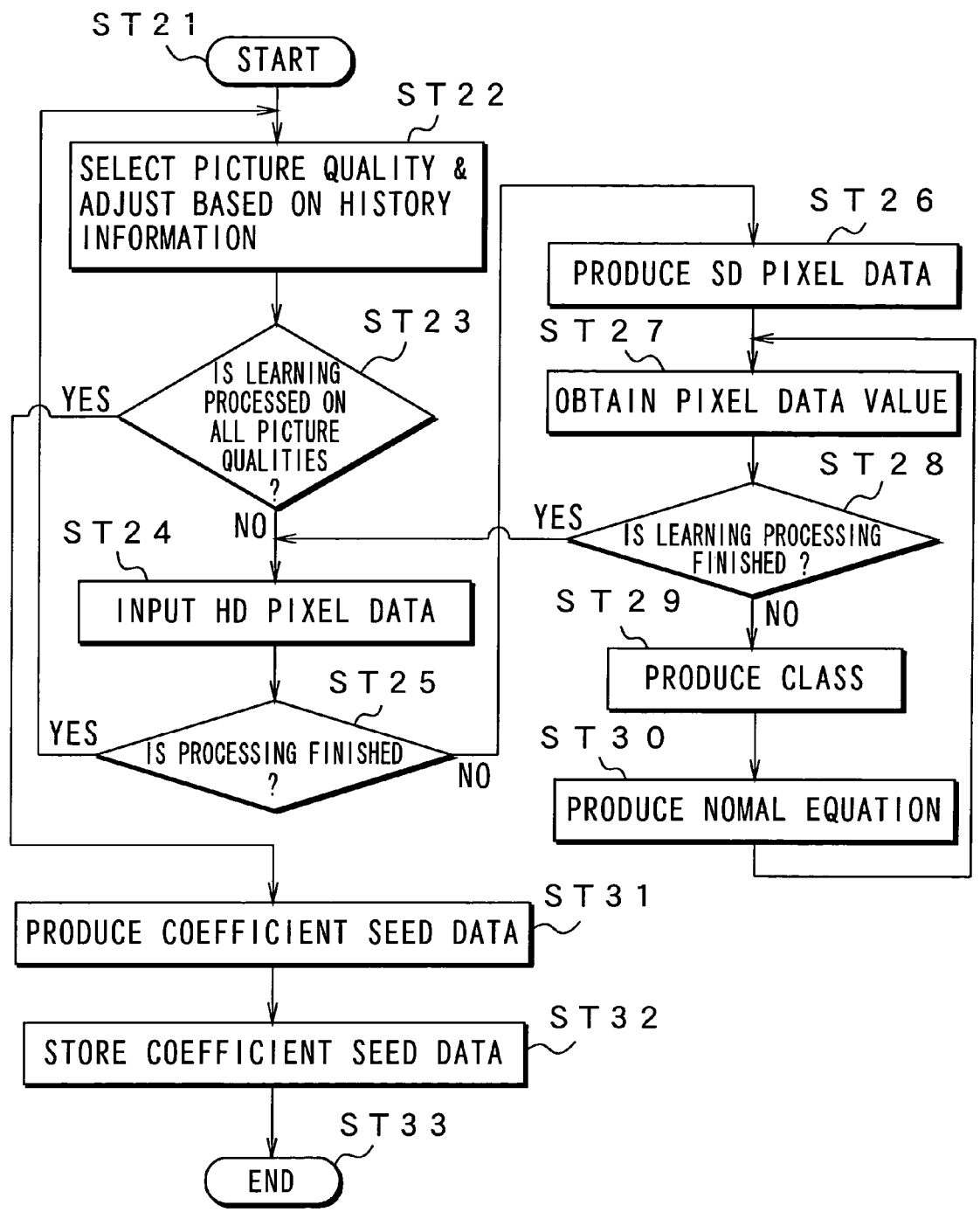
FIG. 15 is a flowchart for illustrating coefficient seed data production processing (part 1)

The following will describe a processing procedure for producing coefficient seed data sets with reference to a flowchart of FIG. 15.

First, the procedure starts at step ST21 and, at step ST22, a picture quality pattern (which is identified by, for example, the parameters, s, z) to be used in learning is selected and the picture quality pattern thus selected is adjusted based on the history information. At step ST23 then, it is judged whether or not the learning on all the picture quality patterns is finished. If learning on all of them is not finished, the procedure goes to step ST24.

At step ST24, already known HD pixel data is input in units of a frame or field. At step ST25 then, it is judged whether or not the processing on the HD pixel data of all the frames and fields is finished. If it is finished, then the procedure returns to step ST22 wherein the next picture quality pattern is selected and then the above-mentioned processing is repeated. If it is not finished yet, the procedure goes to step ST26.

At step ST26, SD pixel data is produced from the HD pixel data inputted at step ST24 on the basis of the picture quality pattern adjusted at ST22. At step ST27, pixel data of class taps and prediction taps is obtained in correspondence with respective HD pixel data input at the step ST24 on the basis of the SD pixel data produced at step ST26.

At step ST28 then, it is judged whether or not the learning processing on all the regions of the produced SD pixel data is finished. If it is finished, then the procedure returns to step ST24 wherein the above-mentioned processing is repeated after the HD pixel data of next one frame or one field is input, while it is not finished yet, then the procedure goes to step ST29.

At step ST29, a class code CL is produced from the SD pixel data of the class taps obtained at step ST27. At step ST30 then, a normal equation (see the Equation (13)) is produced. Then, the procedure returns to step ST27.

Also, if it decides at step ST23 that the learning on all the picture quality patterns is finished, the procedure goes to step ST31. At step ST31, the normal equation is solved according to the sweeping method etc. to calculate the coefficient seed data for each combination of the class and the output pixel (see $HD_1$-$HD_4$ of FIG. 5 and $HD_1'$-$HD_4'$ of FIG. 6) and, at step ST32, the coefficient seed data is stored in a memory and then, at step ST33, the processing ends.

Thus, the processing is performed along the flowchart shown in FIG. 15 so that the coefficient seed data can be obtained using the same method as that by the coefficient seed data production device 150 shown in FIG. 9.

Also, the processing by the coefficient seed data production device 150' of FIG. 12 can also be carried out software-wise by a processing apparatus, not shown.

Figure 16:
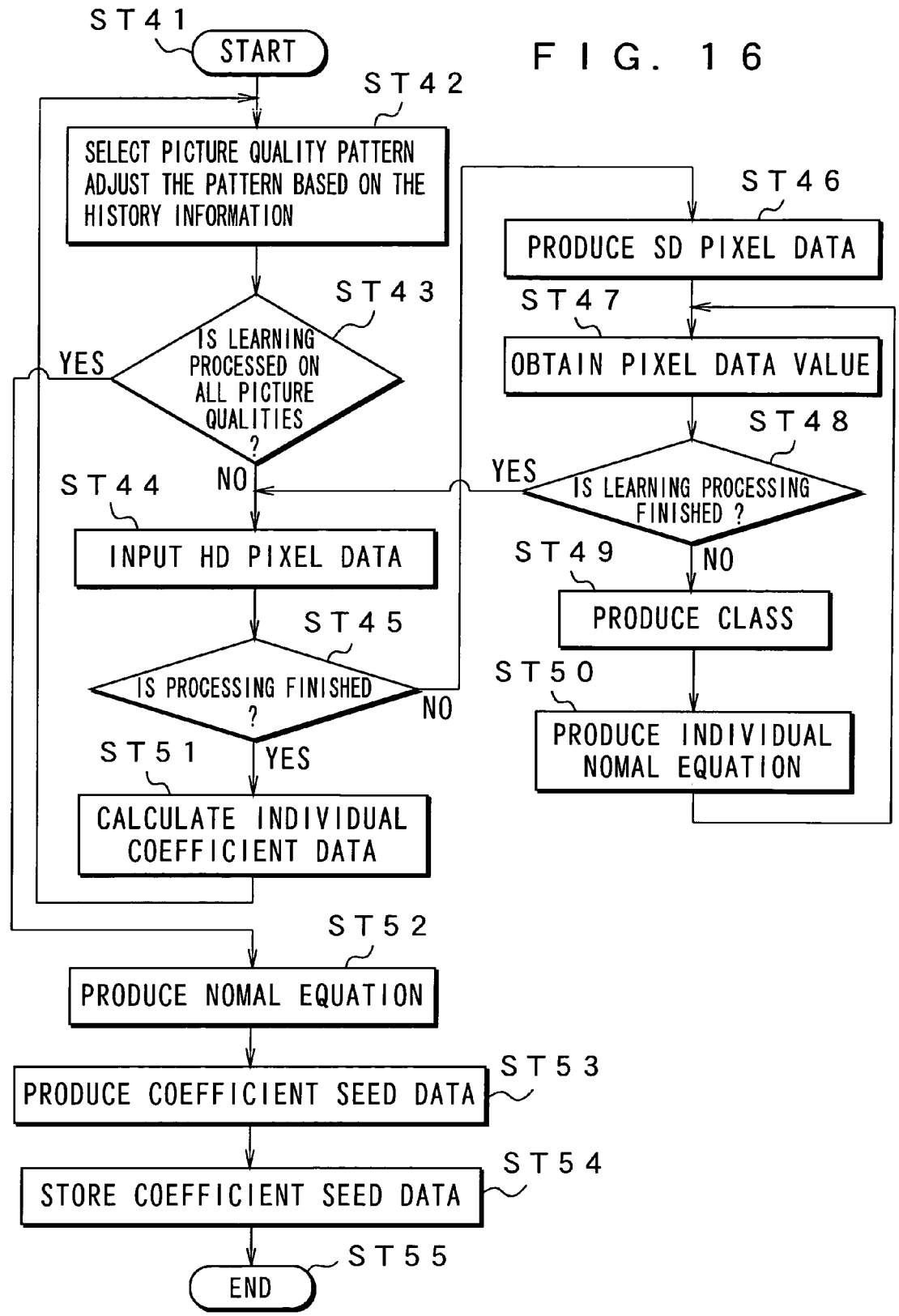
FIG. 16 is a flowchart for illustrating coefficient seed data production processing (part 2)

The following will describe a processing procedure for producing coefficient seed data with reference to a flowchart of FIG. 16.

First, the procedure starts at step ST41 and, at step ST42, a picture quality pattern (which is identified by, for example, the parameters, s, z) to be used in learning is selected and the picture quality pattern thus selected is adjusted based on the history information. At step ST43 then, it is judged whether the processing for calculating all the picture quality patterns is finished. If it is not finished, the procedure goes to step ST44.

At step ST44, already known HD pixel data sets are input in units of a frame or field. At step ST45 then, it is judged whether the processing on the HD pixel data of all the frames and fields is finished. If it is not finished, the procedure goes to step ST46 wherein the SD pixel data is produced from the HD pixel data inputted at step ST44 on the basis of the picture quality pattern adjusted at step ST42.

At step ST47, pixel data of the class taps and the prediction taps corresponding to respective HD pixel data inputted at step ST44 are obtained from the SD pixel data produced at step ST46. At step ST48 then, it is judged whether the learning processing on all the regions of the produced SD pixel data is finished. If it is finished, the procedure returns to step ST44 wherein the above-mentioned processing is repeated after the next HD pixel data is input, while it is not finished yet, the procedure goes to step ST49.

At step ST49, a class code CL is produced from the SD pixel data of the class tap obtained at step ST47. At step ST50 then, a normal equation (see the Equation (20)) for obtaining the coefficient data is produced. Then, the procedure returns to step ST47.

Also, if it decides at step ST45 that the processing on HD pixel data of all the frames and fields is finished, then the procedure goes to step ST51 wherein the normal equation produced at step ST50 is solved using the sweeping method etc. in order to calculate the coefficient data for each combination the class and the output pixel (see $HD_1$-$HD_4$ of FIG. 5 and $HD_1'$-$HD_4'$ of FIG. 6).

Then, the procedure returns to step ST42 wherein the next picture quality pattern is selected and adjusted, and then the above described processing is repeated to obtain the coefficient data for each combination that correspond to this next picture quality pattern.

Also, if it decides at step ST43 that the coefficient data for all the picture quality patterns are calculated, the procedure goes to step ST52. At step ST52, a normal equation (see the Equation (25)) for obtaining the coefficient seed data is produced from the coefficient data on all the picture quality patterns.

Then, at step ST53, the normal equation produced at step ST52 is solved using the sweeping method etc., to calculate the coefficient seed data for each combination the class and the output pixel and, at step ST54, the coefficient seed data sets are stored in the memory and then, at step ST55, the processing ends.

Thus, the processing is performed along the flowchart shown in FIG. 16, so that the coefficient seed data can be obtained using the same method as that by the coefficient seed data production device 150' shown in FIG. 12.

The following will describe another embodiment of the invention.

Figure 17:
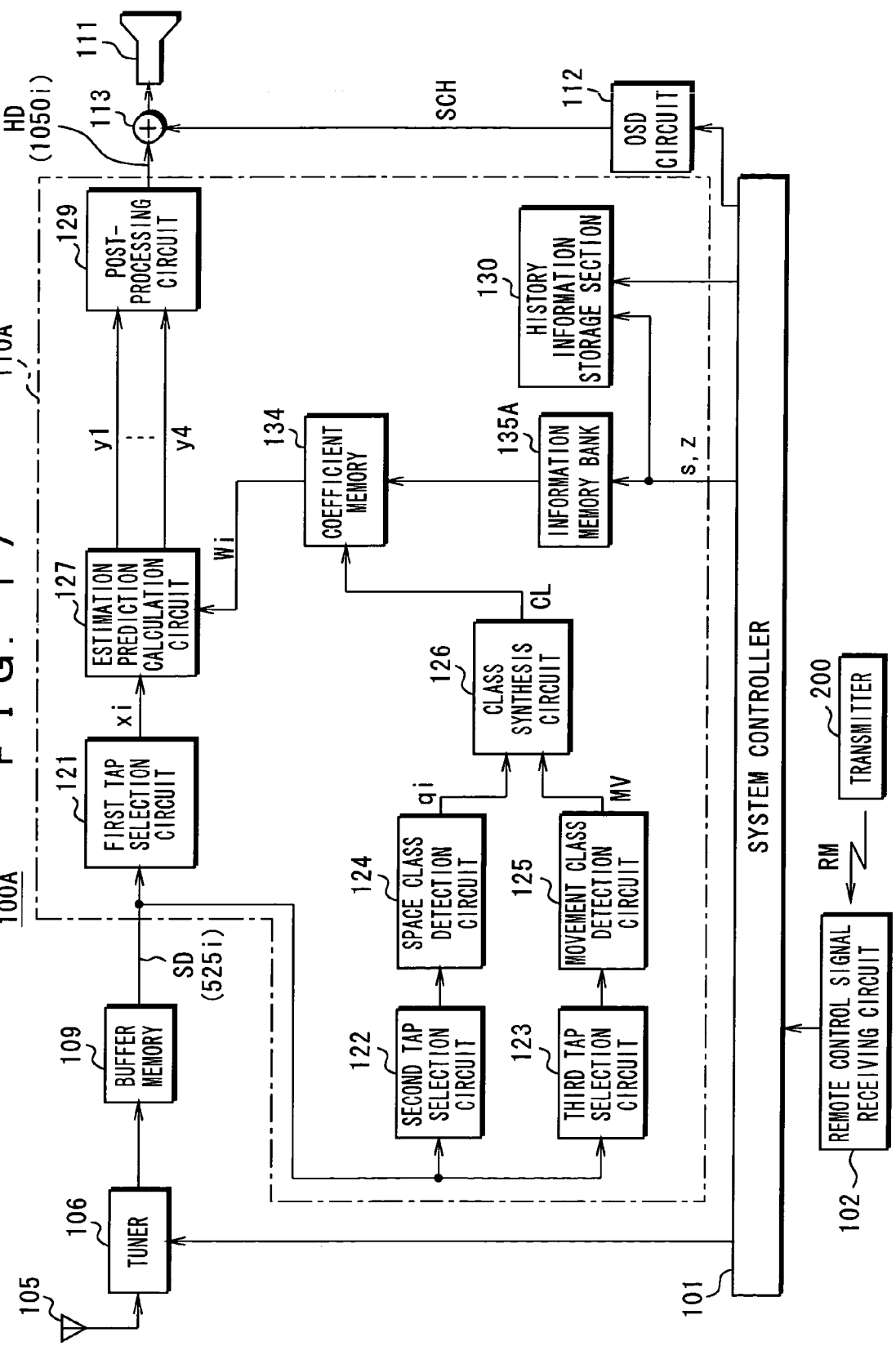
FIG. 17 is a block diagram showing a configuration of a TV receiver according to another embodiment of the invention.

FIG. 17 shows a configuration of a TV receiver 100A according to another embodiment. This TV receiver 100A receives a 525$i$ signal as an SD signal from a broadcast signal to then convert this 525$i$ signal into a 1050$i$ signal as an HD signal, thus displaying an image based on this 1050$i$ signal. In FIGS. 17 and 1, the corresponding components are indicated by the same reference symbols.

The TV receiver 100A is the same as the TV receiver 100 shown in FIG. 1 except that the image signal processing section 110 is replaced by an image signal processing section 110A. The TV receiver 100A performs almost the same operation as the TV receiver 100 does.

The detailed image signal processing section 110A will be described as follows. In this image signal processing section 110A, the components corresponding to the ones of the image signal processing section 110 shown in FIG. 1 are indicated by the same reference symbols and their detailed explanation is omitted.

The image signal processing section 110A includes an information memory bank 135A. The information memory bank 135A accumulates therein beforehand the coefficient data, Wi(i=1-n) for each combination of class, output pixel (see $HD_1$-$HD_4$ of FIG. 5 and $HD_1'$-$HD_4'$ of FIG. 6), and values of parameters, s, z. A method of producing the coefficient data, Wi will be described in detail later.

The following will describe the operations of the image signal processing section 111A.

Based on the SD signal (525i signal) stored in the buffer memory 109, the second tap selection circuit 122 selectively extracts data (SD pixel data) of a space class tap located on a periphery of four pixels (pixels of the objective position) in the unit pixel block constituting the HD signal (1050i signal) to be produced.

The data (SD pixel data) of the space class tap extracted selectively by the second tap selection circuit 122 is supplied to the space class detection circuit 124. This space class detection circuit 124, in turn, performs ADRC processing on the respective SD pixel data given as the data of the space class tap to obtain the re-quantization codes qi as class information of the space class (class grouping mainly for indicating of a waveform in the space)(see the Equation (1)).

Also, based on the SD signal (525i signal) stored in the buffer memory 109, the third tap selection circuit 123 selectively extracts data (SD pixel data) of a motion class tap located on a periphery of four pixels (pixels of the objective position) in the unit pixel block constituting the HD signal (1050i signal) to be produced.

The data (SD pixel data) of the motion class tap extracted selectively by the third tap selection circuit 123 is supplied to the motion class detection circuit 125. This motion class detection circuit 125, in turn, obtains class information MV of a motion class (class grouping mainly for indicating a degree of motion) from the respective SD pixel data given as data of the motion class tap.

This motion information MV and the above-mentioned re-quantization codes qi are supplied to the class synthesis circuit 126. This class synthesis circuit 126 in turn obtains a class code CL that indicates a class including pixel data (pixel data of an objective position) in the unit pixel block constituting the HD signal (1050i signal) to be produced for each unit pixel block based on this motion information MV and the re-quantization codes qi (see the Equation (3)). This class code CL is then supplied as read-out address information to the coefficient memory 134.

During each vertical blanking period, for example, for each combination of the class and the output pixel, the coefficient memory 134 receives and stores the coefficient data, Wi, which is loaded from information memory bank 135A, corresponding to the values of the parameters, s, z adjusted by the user, under the control of the system controller 101.

If the information memory bank 135A stores no coefficient data corresponding to the values of the adjusted parameters, s, z, the coefficient data corresponding to values that precede and follow the values of the adjusted parameters, s, z may be read out of the information memory bank 135A and then used in interpolation processing, thus obtaining the coefficient data corresponding to the values of the adjusted parameters, s, z.

As the class code CL is supplied to the coefficient memory 134 as read-out address information, the coefficient data, Wi of the estimation equation for four output pixels ($HD_1$-$HD_4$ in a odd field and $HD_1'$-$HD_4'$ in an even field) corresponding to that class code CL are read out from the coefficient memory 134 and supplied to the estimation/prediction calculation circuit 127.

Also, based on the SD signal (525i signal) stored in the buffer memory 109, the first tap selection circuit 121 selectively extracts the data (SD pixel data) of a prediction tap located on a periphery of four pixels (pixels of the objective position) in the unit pixel block constituting the HD signal (1050i signal) to be produced.

The estimation/prediction calculation circuit 127 calculates the pixel data, $y_1$-$y_4$ of four pixels (pixels of the objective position) in the unit pixel block constituting the HD signal to be produced, based on the data (SD pixel data) xi of the prediction tap and the coefficient data, Wi of four pixels read out of the coefficient memory 134 (see the Equation (4)). The data $y_1$-$y_4$ of four pixels in the unit pixel block constituting the HD signal, outputted from the estimation/prediction calculation circuit 127, is supplied to post-processing circuit 129.

In this post-processing circuit 129, the data $y_1$-$y_4$ of four pixels in the unit pixel block supplied in sequence from the estimation/prediction calculation circuit 127 is linearly ordered and outputted therefrom in 1050i format. Thus, the post-processing circuit 129 outputs a 1050I-format signal as an HD signal.

In this way, HD pixel data y is calculated in the image signal processing section 110A using the coefficient data, Wi(i=1-n) of the estimation equation associated with the values of the adjusted parameters, s, z. Thus, the user can arbitrarily adjust the values of parameters, s, z to thereby adjust the resolutions of the image of the HD signal in the space direction and in the time direction as well.

History information storage section 130 is supplied with the values of the parameters, s, z to be inputted from the system controller 101 into the information memory bank 135A. Frequency distribution memory 130a and time-course memory 130d of the history information storage section 130 (FIG. 7) are supplied with the history information on the values of the parameters, s, z under the control of system controller 101, in just the same way as in the television receiver 100 shown in FIG. 1.

In this way, the history information stored in the frequency distribution memory 130a and time-course memory 130d of the history information storage section 130 may be utilized to generate the coefficient data, Wi stored in the information memory bank 135A when the board containing the image signal processing section 110A is replaced to upgrade the television receiver 100A.

Next, a method of producing the coefficient data, Wi(i=1-n) will be described.

In the foregoing example, an alternative method of producing the coefficient seed data has been described in which coefficient data, Wi is firstly produced for each combination of the class and the output pixel from the learning with respect to each of the SD signals obtained for varying the values of parameters, s, z in steps, and secondly the coefficient seed data, w10-wn9 is calculated for each combination of the class and the output pixel using the coefficient data, Wi obtained for each combination with respect to the SD signal.

The coefficient data, Wi for each combination of the class, output pixels and values of parameters, s, z, which are stored beforehand in the information memory bank 135A, can be generated by the same method used in the first half of the method of generating coefficient seed data described in the preceding paragraph.

Figure 18:
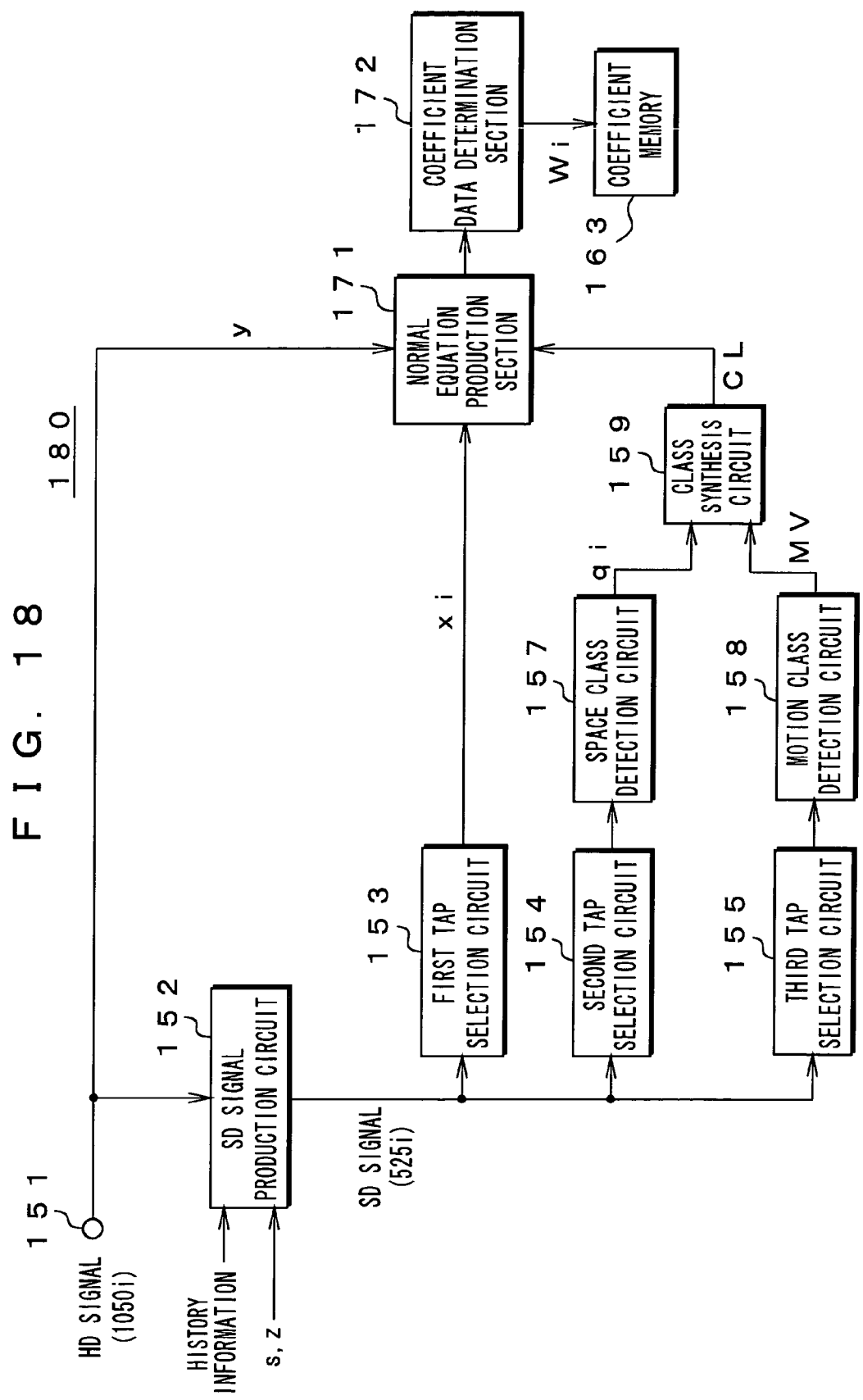
FIG. 18 is a block diagram showing a configuration example of a coefficient data production device.

FIG. 18 shows a coefficient data production device 180. In this coefficient data production device 180, the components corresponding to the coefficient seed data production device 150' shown in FIG. 12 are indicated by the same reference symbols and their detailed description is omitted.

This coefficient data production device 180 has a coefficient memory 163. This coefficient memory 163 stores therein the coefficient data, Wi for each combination of the class and the output pixel, which corresponds to each value of the parameters, s, z, determined by the coefficient data determined section 172. The other components of this coefficient data production device 180 have almost the same configuration as those of the coefficient seed data production device 150' shown in FIG. 12.

The following will describe the operations of the coefficient data production device 180 as shown in FIG. 18.

At the input terminal 151, an HD signal (1050$i$ signal) is supplied as a teacher signal. The HD signal is then subjected to the thinning-out processing horizontally and vertically at the SD signal production circuit 152, thus producing SD signal (525$i$ signal) as a student signal.

As the values of the parameters, s, z inputted to SD signal production circuit 152 are varied in sequence, the bands of space and time directions of the band limiting filter used in generating an SD signal from an HD signal are varied accordingly. As a consequence, multiple SD signals varying in steps the bands of space and time directions in stages are generated.

If the history information is entered into the SD signal production circuit 152, the values of the parameters, s, z are adjusted based on the history information, and the bands of space and time directions to be used in generating the SD signal from the HD signal as described above are varied in accordance with the values of the adjusted parameters, s, z.

Data (SD pixel data) of a space class tap located on a periphery of the objective position in the HD signal (1050$i$ signal) is selectively extracted by the second tap selection circuit 154, from SD signal (525$i$ signal) produced by the SD signal production circuit 152. The data (SD pixel data) of the space class tap selectively extracted by the second tap selection circuit 154 is supplied to the space class detection circuit 157.

This space class detection circuit 157 performs ADRC processing on respective SD pixel data given as the data of the space class tap to obtain the re-quantization codes qi used as class information of a space class (class grouping mainly for indicating a waveform in a space) (see the Equation (1)).

Also, based on the SD signal produced by the SD signal production circuit 152, the third tap selection circuit 155 selectively extracts the data (SD pixel data sets) of the motion class tap located on a periphery of the objective position in the HD signal. The data (SD pixel data) of the motion class tap selectively extracted by this third tap selection circuit 155 is supplied to the motion class detection circuit 158. This motion class detection circuit 158 obtains class information MV of a motion class (class grouping for mainly indicating a degree of motion) based on the respective SD pixel data given as data of a motion class tap.

This motion information MV and the above-mentioned re-quantization codes qi are supplied to the class synthesis circuit 159. This class synthesis circuit 159 in turn obtains a class code CL that indicates a class including pixel data set of the objective position in the HD signal (1050$i$ signal), based on this motion information MV and the re-quantization codes qi (see the Equation (3)).

Also, based on the SD signal produced by the SD signal production circuit 152, the first tap selection circuit 153 selectively extracts the data (SD pixel data) of a prediction tap located on a periphery of the objective position in the HD signal.

Then, the normal equation production section 171 produces the normal equation (see the Equation (20)) for obtaining the coefficient data, Wi (i=1-n) for each combination of the class and the output pixel corresponding to each SD signal produced by the SD signal production circuit 152 on the basis of the respective HD pixel data y given as pixel data of the objective position obtained from the HD signal received at the input terminal 151, the data (SD pixel data) xi of the prediction tap selectively extracted by the first tap selection circuit 153 in correspondence to the respective HD pixel data y thus given, and the class code CL received from the class synthesis circuit 159 in correspondence to the respective HD pixel data y thus given.

Then, the coefficient data determination section 172 solves this normal equation to thereby obtain the coefficient data, Wi for each combination of the class and the output pixel corresponding to each SD signal. That is, at the coefficient data determination section 172 can obtain the coefficient data, Wi for each combination of the class, the output pixel, and the values of the parameters, s, z. These coefficient data, Wi is stored in the coefficient memory 163.

Thus, the coefficient data production device 180 shown in FIG. 18 can produce such coefficient data, Wi for each combination of the class, the output pixels ($HD_1$-$HD_4$ and $HD_1$'-$HD_4$'), and the values of the parameters, h and v so that coefficient data, Wi is stored in the information memory bank 135A of the image signal processing section 110A as shown in FIG. 17.

According to this coefficient data production device 180, the values of inputted parameters, s, z are adjusted in the SD signal production circuit 152 based on the history information, so that the bands of space direction (vertical and horizontal directions) and time direction of the band limiting filter for use in generating an SD signal from an HD signal can be varied based on the adjusted parameters, s, Z.

Thus, by storing the coefficient data, Wi thus obtained in the information memory bank 135 of the new board that contains the image signal processing section 110A installed on an upgraded television receiver 100A, the user can adjust the values of the parameters, s, z to adjust resolutions within a range (frame AF defined by a dotted line in FIG. 10) centered at the position of the center-of-gravity of the adjustable domain of resolution available in the past.

In the example shown above, it has been shown that in image signal processing section 110A shown in FIG. 17, a parameter z is set to determine the resolution in the space direction (vertical direction and horizontal direction) and a parameter s is set to determine the resolution in time direction (frame direction) and the resolutions of space direction and time direction are adjusted based on the values of these parameters. However, the image signal processing section 110A can be configured to include other parameters to adjust other picture qualities.

For example, the parameters may include a parameter determining the degree of noise reduction, in addition to the parameters determining vertical and horizontal resolutions. Although the image signal processing section 110A of FIG. 17 is shown to have two adjustable parameters, s, z, it will be apparent that the processing section 110A can be configured to include only one parameter or at least three parameters. In that case too, the history information of the respective parameters is stored in the history information storage section 130. The coefficient seed data production device 180 shown in FIG. 18 can generate necessary data in a manner similar to those described above using the history information on the respective parameters.

Like data processing functions of image signal processing section 110 shown in FIG. 1, it is possible to implement data processing of the image signal processing section 110A shown in FIG., 17 as software routines executed by, for example, the image signal processing device 300 sown in FIG. 13. In this case, coefficient data are preinstalled in, for example, ROM 302.

Figure 27:
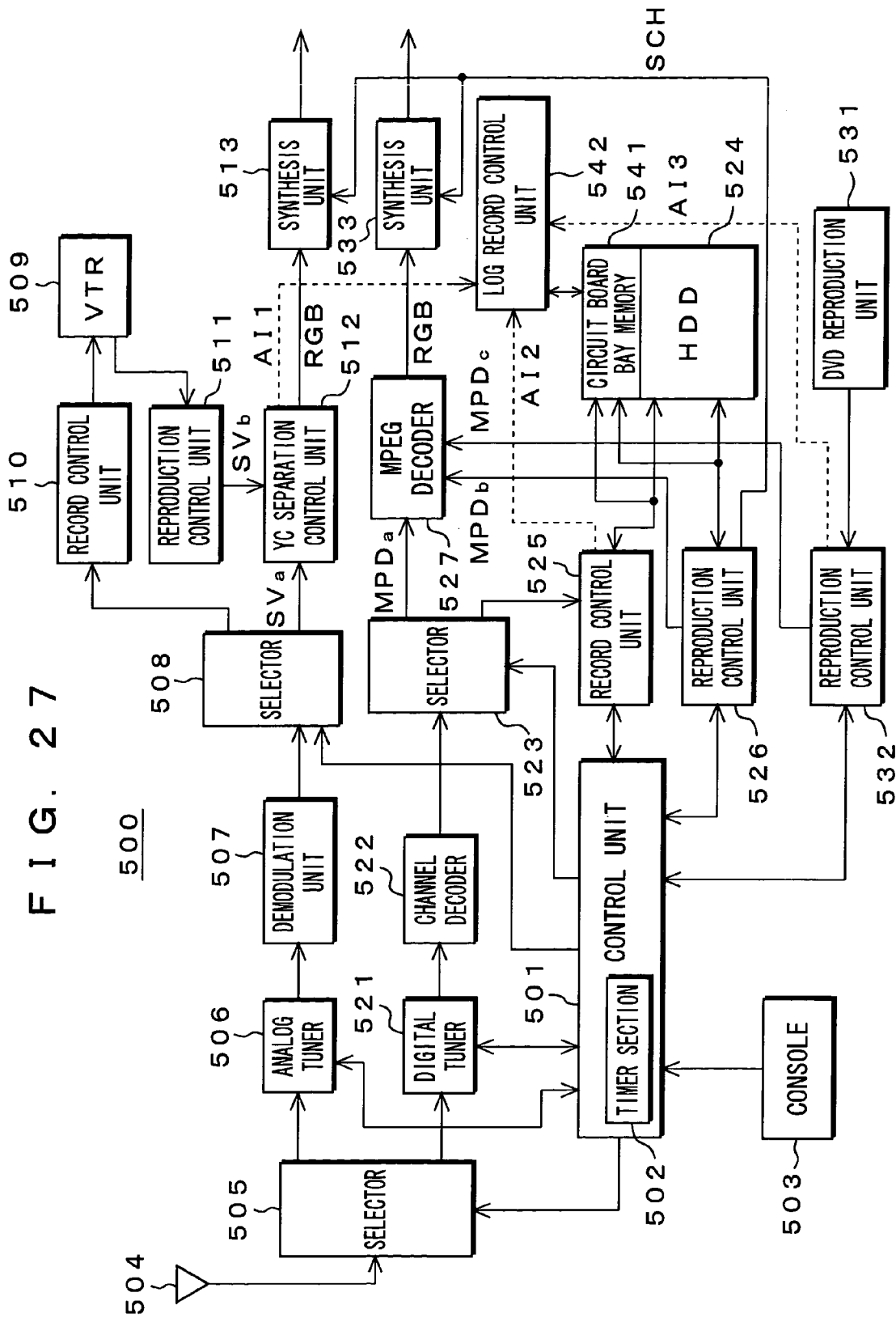
FIG. 27 is a block diagram showing a configuration of a receiver according to still further embodiment of the invention.

The following will describe a processing procedure for obtaining an HD signal from an SD signal performed at the image signal processing device 500 shown in FIG. 27 with reference to the flowchart of FIG. 13.

First, the process starts the processing at step ST61 and, at step ST62, SD pixel data is input in units of a frame or field. When the SD pixel data is input through the input terminal 314, the SD pixel data is stored in the RAM 303 temporarily. Also, when the SD pixel data is recorded on a hard disk beforehand, the SD pixel data is read out of the hard disk drive 305 and stored in the RAM 303 temporarily. At step ST63 then, it is decided whether or not the processing of all the frames or fields of thus input pixel data is finished. If it is finished, then the process for processing ends at step ST64.

Otherwise, the process goes on to step ST65.

At this step ST65, a picture quality specification value (for example, a value of the parameters, s, z) input by the user under the control of the remote control transmitter 200 is read out of the RAM 303, for example. At step ST66, when new picture quality specification value has been input, the history information (corresponding to the contents of frequency distribution memory 130a and time-course memory 130d of the history information storage section 130 in the television receiver 100A of FIG. 17) stored, for example, in the hard disk is updated. At step ST67 then, the coefficient data, Wi for each combination of the class and the output pixels (see HD$_1$-HD$_4$ of FIG. 5 and HD$_1$'-HD$_4$' of FIG. 6) corresponding to the picture quality specification value is read out of ROM 302 and the like according to picture quality specification value thus read and stored in RAM 303 temporarily.

Next, at step ST68, based on the SD pixel data inputted at step ST62, pixel data of class taps and prediction taps corresponding to the respective HD pixel data to be produced is obtained. At step ST69 then, it is judged whether or not the processing of obtaining the HD pixel data in all the regions of the input SD pixel data is finished. If it is finished, then the procedure returns to step ST62, thus shifting to the processing of inputting SD pixel data of the next frame or field. On the other hand, if it is not finished, then the procedure goes to step ST70.

At this step ST70, a class code CL is produced from the SD pixel data of the class tap obtained at step ST68. At step ST71 then, the HD pixel data is produced according to the estimation equation using coefficient data that correspond to that class code CL and the SD pixel data of the prediction tap. Thereafter, the process goes back to step ST68 wherein the above-mentioned processing is repeated.

Figure 19:
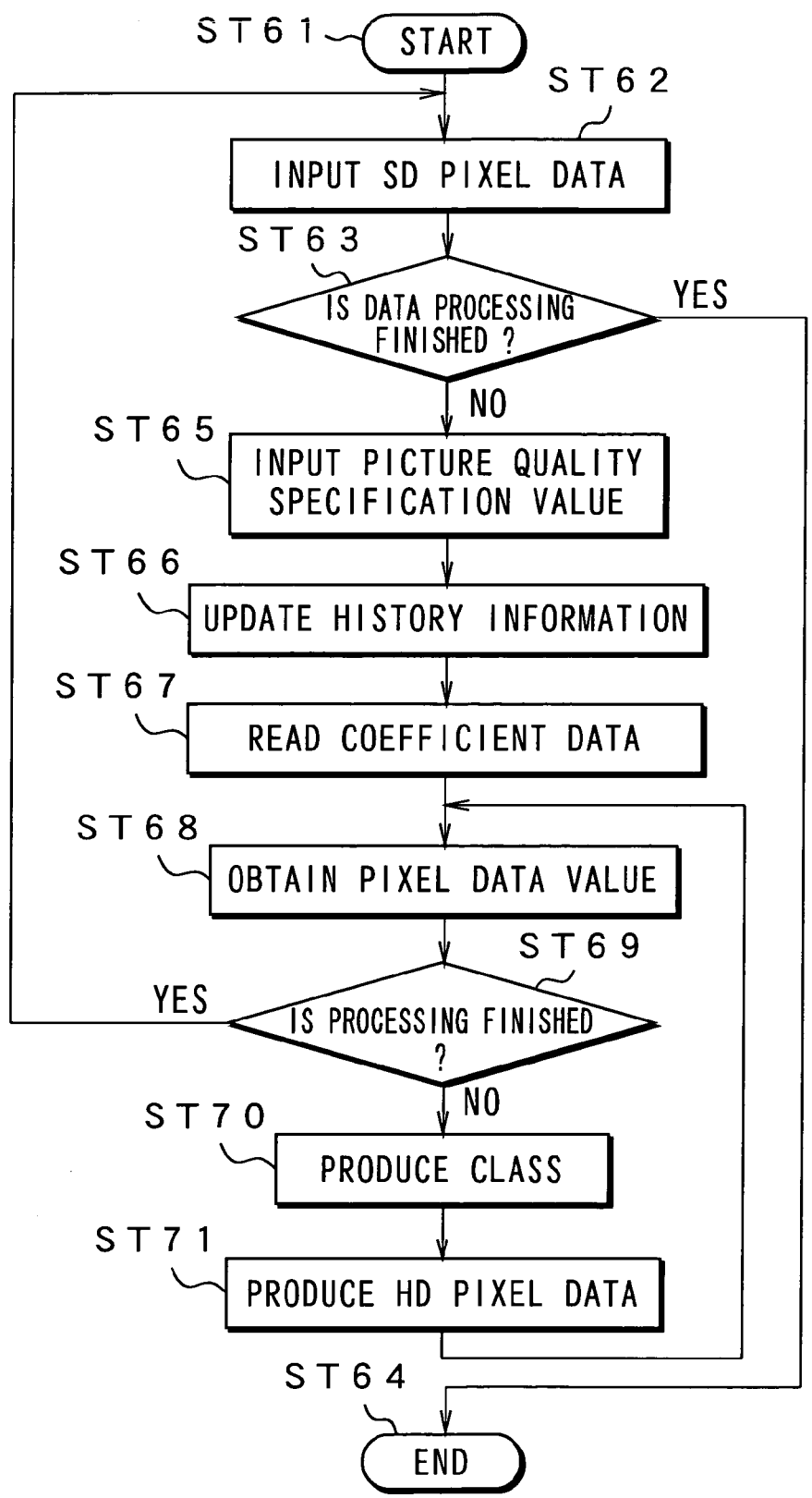
FIG. 19 is a flowchart for illustrating image signal processing.

Thus, the process can perform the processing along the flowchart shown in FIG. 19 to thereby process the SD pixel data constituting the input SD signal, thus obtaining HD pixel data constituting the HD signal. As mentioned above, the HD signal thus processed and obtained is transmitted trough the output terminal 315 or supplied to the display 311 to be displayed thereon or even supplied to the hard disk drive 305 to be recorded on a hard disk.

The history information stored in the hard disk, for example, is utilized when new coefficient data are used at step ST67, as described above. By the use of new coefficient data thus produced, picture quality can be adjusted within the adjustable range that suits the user's taste. It will be apparent that the history information may be stored in a removable memory such as a memory card, instead of a hard disk.

Also, although the processing apparatus is not shown, the processing at the coefficient data production device 180 of FIG. 18 can be also carried out by software.

Figure 20:
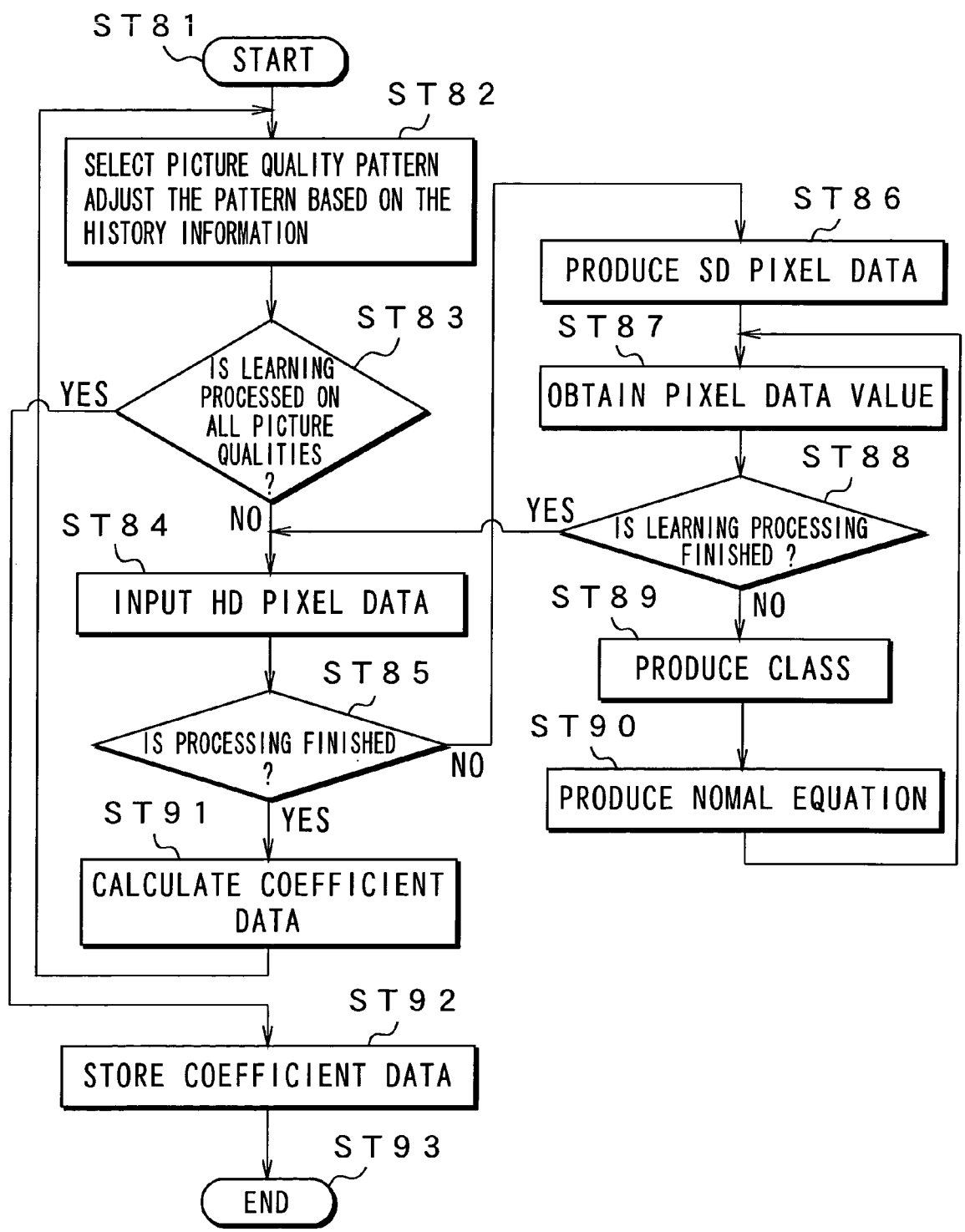
FIG. 20 is a flowchart for illustrating coefficient data production processing.

The following will describe a processing procedure for producing the coefficient data with reference to a flowchart of FIG. 20.

First, the process starts at step ST81 and, at step ST82, a picture quality pattern (which is identified by, for example, the parameters, s, z) to be used in learning is selected and the picture quality pattern thus selected is adjusted based on the history information. At step ST83 then, it is judged whether or not the learning on all the picture quality patterns is finished. If learning on all of them is not finished, the procedure goes to step ST84.

At this step ST84, already known HD pixel data is input in units of a frame or field. At step ST85 then, it is decided whether or not the processing on the HD pixel data of all the frames and fields is finished. If it is not finished, then the process goes to step ST86 wherein the SD pixel data is produced from the HD pixel data inputted at step ST84 based on the picture quality pattern adjusted at ST82.

Then, at step ST87, pixel data of a class tap and a prediction tap is obtained in correspondence with the respective HD pixel data inputted at the step ST84, based on the SD pixel data produced at step ST86. At step ST88 then, it is decided whether or not the learning processing is finished on all the regions of the produced SD pixel data. If it is finished, then the process returns to step ST84 wherein the next HD pixel data sets are input and then the above-mentioned processing is repeated. If not, on the other hand, then the process goes on to step T89.

At this step ST89, a class code CL is produced from the SD pixel data of the class tap obtained at step ST87. At step ST90 then, a normal equation (see Equation (20)) for obtaining the coefficient data is produced. Then, the process returns to step ST87.

If it decides at step ST85 that the processing is finished on the HD pixel data of all the frames and fields, then the process goes to step ST91 wherein the normal equation produced at step ST90 is solved using the sweeping-out method etc., thus calculating the coefficient data for each combination of the class and the output pixel (see HD$_1$-HD$_4$ of FIG. 5 and HD$_1$'-HD$_4$' of FIG. 6). Then, the process returns to step ST82 wherein the next picture quality pattern is selected and the above-mentioned processing is repeated, thereby obtaining the coefficient data sets corresponding to this next picture quality pattern for each combination.

Also, if it decides at the above-mentioned step ST83 that the coefficient data is calculated for all the picture quality patterns, then the memory stores the coefficient data for all the picture quality patterns for each class at step ST92 and then, at step ST93, the processing ends.

Thus, it is possible to obtain the coefficient data according to the processing along the flowchart shown in FIG. 20 using the same method as that used in the coefficient data production device 180 shown in FIG. 18.

In the example shown herein, the parameters, s, z, are additional information for carrying out picture quality conversion. However, besides parameters, s, z, other data such as the coefficient data and the coefficient seed data can be similarly used as the additional information. In short, any kind of information that affects picture qualities (or information to control a picture quality) can be used.

Next, further embodiment of the invention will now be described.

Figure 21:
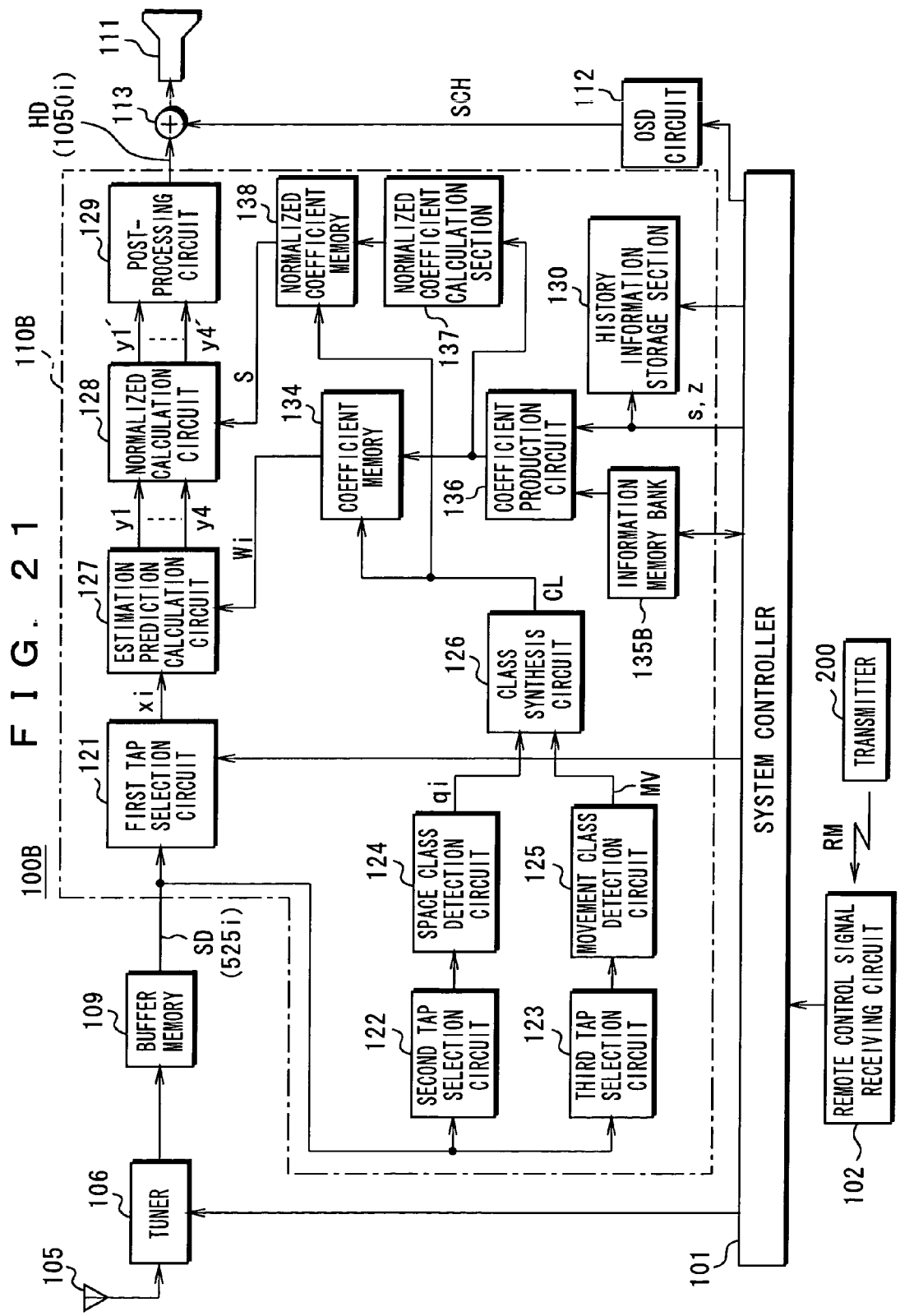
FIG. 21 is a block diagram showing a configuration of a TV receiver according to further embodiment of the invention.

FIG. 21 shows a configuration of a TV receiver 100B according to another embodiment. This TV receiver 100B receives a 525$i$ signal as an SD signal from a broadcast signal to then convert this 525$i$ signal into a 1050$i$ signal as an HD signal, thus displaying an image based on this 1050$i$ signal. In FIGS. 21 and 1, the corresponding components are indicated by the same reference symbols.

The TV receiver 100B is the same as the TV receiver 100 shown in FIG. 1 except that the image signal processing section 110 is replaced by an image signal processing section 110B. The TV receiver 100B performs almost the same operation as the TV receiver 100 does.

The detailed image signal processing section 110B will be described as follows. In this image signal processing section 110B, the components corresponding to the ones of the image signal processing section 110 shown in FIG. 1 are indicated by the same reference symbols and their detailed explanation is omitted.

The image signal processing section 110B includes an information memory bank 135B. The information memory bank 135B stores coefficient seed data, w10-wn9, which is the coefficient data of a production equations (5) for producing coefficient data, Wi (i=1-n) for use in estimation equation (4) for each combinations of te class and the output pixels (HD$_1$-HD$_4$ of FIG. 5 and HD$_1$'-HD$_4$' of FIG. 6). A method of producing the coefficient seed data will be described later.

The information memory bank 135B also stores tap position information of the prediction tap selected in the first tap selection circuit 121, in association with the stored coefficient seed data, w10-wn9. This tap position information provides information on the position of the prediction tap in the production device at the time of generating the coefficient seed data, $w_{10}$-$w_{n9}$.

In this way, the system controller 101 switches the position of the prediction tap selected by the first tap selection circuit 121 based on the tap position information stored in the information memory bank 135B such that this prediction tap position become identical to that used in the production device at the time of generating the coefficient seed data, $w_{10}$-$w_{n9}$.

In the example shown herein, the position of the prediction tap selected by the first tap selection circuit 121 ranges over positions in a vertical and horizontal directions and position in time direction. In this embodiment, prediction tap position can be switched to either one of A-type, B-type, and C-type, based on the tap position information stored in the information memory bank 135B.

Figure 22A:
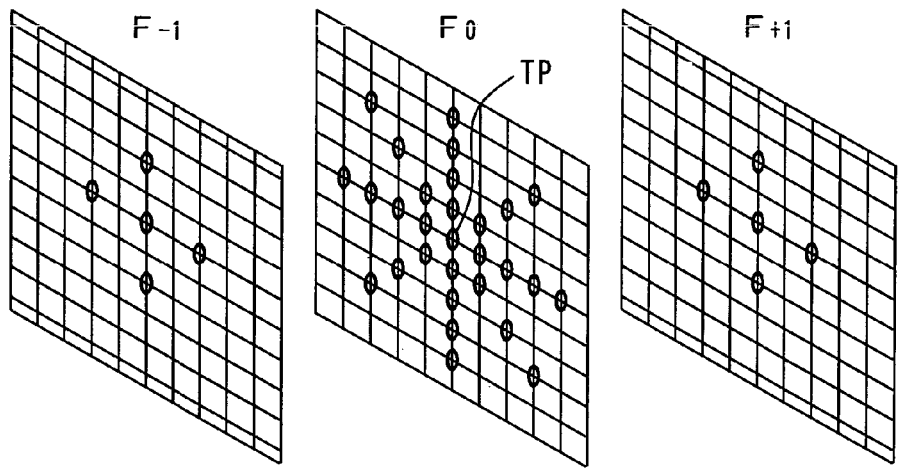
FIGS. 22A-22C are illustrations each for explaining a noise adding method.
Figure 22B:
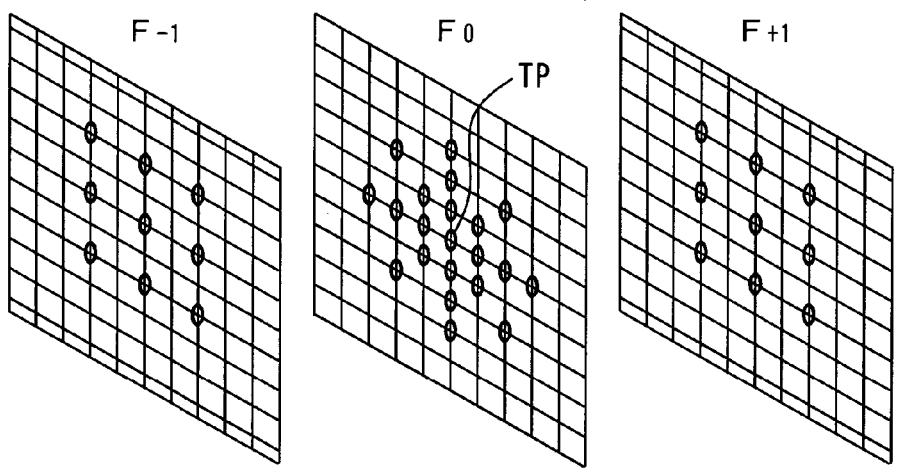
Figure 22C:
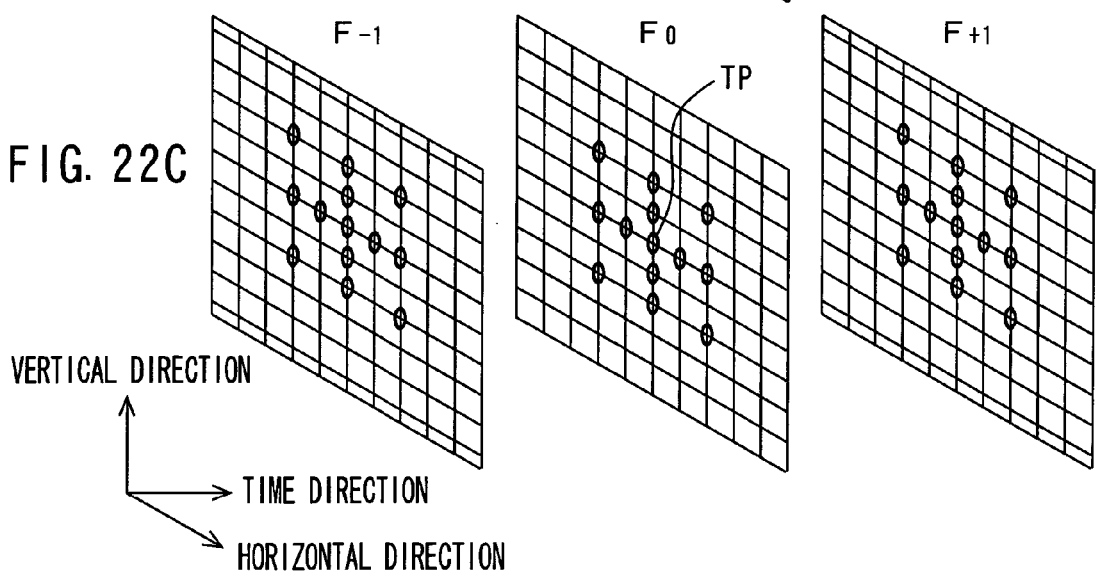

FIGS. 22A-22C illustrate prediction tap positions of A-type through C-type, respectively. Each circle represents a selectable prediction tap position. Category $F_0$ represents the field where pixel data (pixel data at the objective position) in the HD signal to be produced exists. A central prediction tap TP exists in this field $F_0$. Category $F_{-1}$ represents a field prior to the field $F_0$, while category $F_{+1}$ represents a field past the field $F_0$.

A-type prediction tap positions as shown in FIG. 22A illustrate an instance having an increased number of prediction taps in space direction (vertical and horizontal directions). With this type of prediction tap positions, a resolution of space direction, which is determined by the value of parameter s, can be generated with a higher accuracy than that of a resolution of time direction, which is determined by the value of parameter z. C-type prediction tap positions as shown in FIG. 22C illustrate an instance having increased prediction taps in time direction. With this type of the prediction tap positions, a resolution of time direction, which is determined by the value of parameter z, can be generated with a higher accuracy than that of a resolution of space direction, which is determined by the value of parameter s. B-type prediction tap positions shown in FIG. 22B illustrate an intermediate type between A-type and B-type. Each of the A-C type prediction tap positions has the same number of prediction taps.

Referring back to FIG. 21, other components of the image signal processing section 110B have the same configuration as those of the image signal processing section 110 as shown in FIG. 1.

Although not described more in detail, the image signal processing section 110B operates in exactly the same manner as the image signal processing section 110 of FIG. 1 does.

That is, an SD signal (525$i$ signal) can be converted into an HD signal (1050$i$ signal). The user can adjust the values of parameters, s, z to thereby arbitrarily adjust the resolution of space and time directions of the image in HD signal.

Frequency distribution memory 130$a$ (see FIG. 7) of the history information storage section 130 stores information on the respective frequency distributions of values of the parameters, s, z supplied from the system controller 101 to the coefficient production circuit 136. Time-course memory 130$d$ (see FIG. 7) of the history information storage section 130 stores parameters, s, z, of a predetermined number, for example, 10 latest parameters, s, z, selected from the parameters entered from system controller 101 to coefficient production circuit 136.

In this way, the history information stored in the frequency distribution memory 130$a$ and the time-course memory 130$d$ of the history information storage section 130 may be utilized to produce the coefficient seed data, $w_{10}$-$w_{n9}$ to be stored in the information memory bank 135B when the board containing the image signal processing section 110B is replaced to upgrade the television receiver 100B.

The coefficient seed data, w10-wn9 to be stored in the information memory bank 135B is generated in a similar way as the coefficient seed data, w10-wn9 stored in the information memory bank 135 of the image signal processing section 110 shown in FIG. 1.

Figure 23:
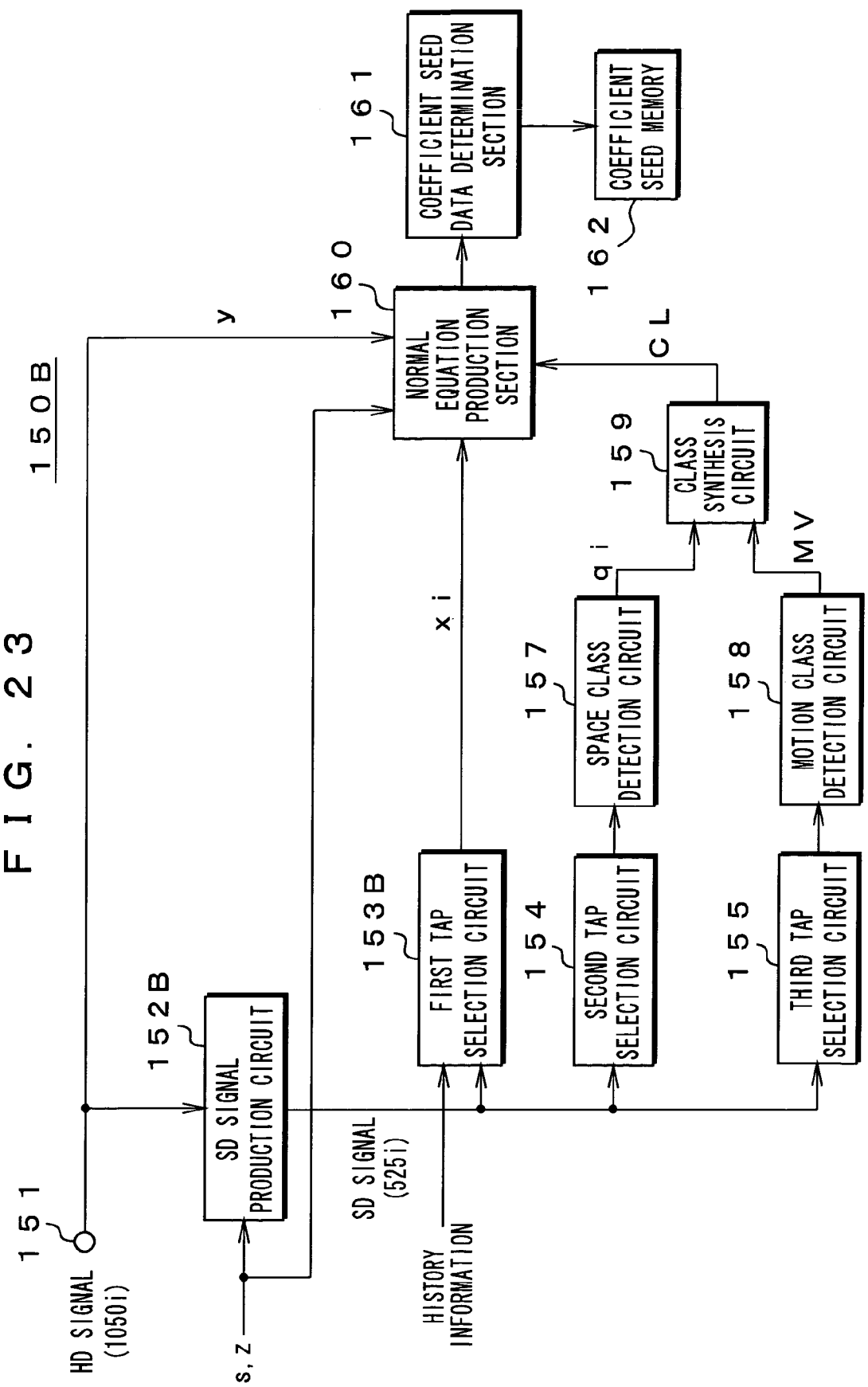
FIG. 23 is a block diagram showing a configuration example of coefficient seed data production device.

FIG. 23 shows a configuration of the coefficient seed data production device 150B for producing the coefficient seed data, w10-wn9 to be stored in the information memory bank 135B of television receiver 100B described above. Components of FIG. 23 corresponding to like components of FIG. 9 will be referred to by the same reference numerals, and details of these components will be omitted.

This coefficient seed data production device 150B has SD signal production circuit 152B for performing a thinning-out processing horizontally and vertically on the HD signal entered into the input terminal 151 to thereby obtain an SD signal as a student signal. This SD signal production circuit 152B is supplied with the values of the parameters, s, z that correspond to the values of parameters, s, z used in the television receiver 100B (FIG. 21) described above. However, unlike SD signal production circuit 152 of the coefficient seed data production device 150 shown in FIG. 9, this SD signal production circuit 152B is not supplied with history information.

Hence, inputted values of parameters, s, z are not adjusted in the SD signal production circuit 152B. Instead, bands of space and time directions of the band limiting filter used in generating an SD signal from an HD signal are varied in response to the inputted values of the parameters, s, z themselves.

The coefficient seed data production device 150B also has first tap selection circuit 153B for selectively extract, from the SD signal (525i signal) outputted from the SD signal production circuit 152, pixel data (SD pixel data) xi of a prediction tap located on a periphery of a objective position in the HD signal (1050i signal).

Unlike the first tap selection circuit 153 of the coefficient seed data production device 150 shown in FIG. 9, this first tap selection circuit 153B is supplied with the history information on the inputted values of parameters, s, z stored in the frequency distribution memory 130a and time course memory 130d of the history information storage section 130 (FIG. 7) of the television receiver 100B described above.

It is noted that when the coefficient seed data, w10-wn9 is stored in the information memory bank 135B of a television receiver 100B that has not yet been used, the history information is not stored in the first tap selection circuit 153B since the history information has not yet stored in the frequency distribution memory 130a and the time-course memory 130d of the history information storage section 130. In short, the history information is inputted to the first tap selection circuit 153B when, for example, the board that includes the image signal processing section 110B is replaced to upgrade the television receiver 100B and the coefficient seed data, w10-wn9 to be stored in the information memory bank 135B is generated.

In the first tap selection circuit 153B, the prediction tap position is switched to any one of the three types, A-C, as shown in FIGS. 22A-22C, respectively, in accordance with the inputted history information.

If no history information is inputted to the first tap selection circuit 153B, then B-type prediction tap position shown in FIG. 22B is assumed. In this case, the coefficient seed data, w10-wn9 is generated such that a resolution of space direction determined by the value of parameter s and a resolution of time direction determined by the value of parameter z are respectively created at a set accuracy.

When the history information is input, the first tap selection circuit 153B determines the center-of-gravity using the frequency distribution information on the respective values of parameters, s, z. In this case, values of the latest parameters, s, z of a predetermined number are weighted with larger weights. In the first tap selection circuit 153B, the type of prediction tap is selected in accordance with the center-of-gravity.

In the television receiver 100B, the respective values of the parameters, s, z are adjusted in a predetermined steps (in the range of 0-8) under the user operation of the television receiver 100B, to adjust resolutions of space and time directions.

Figure 24:
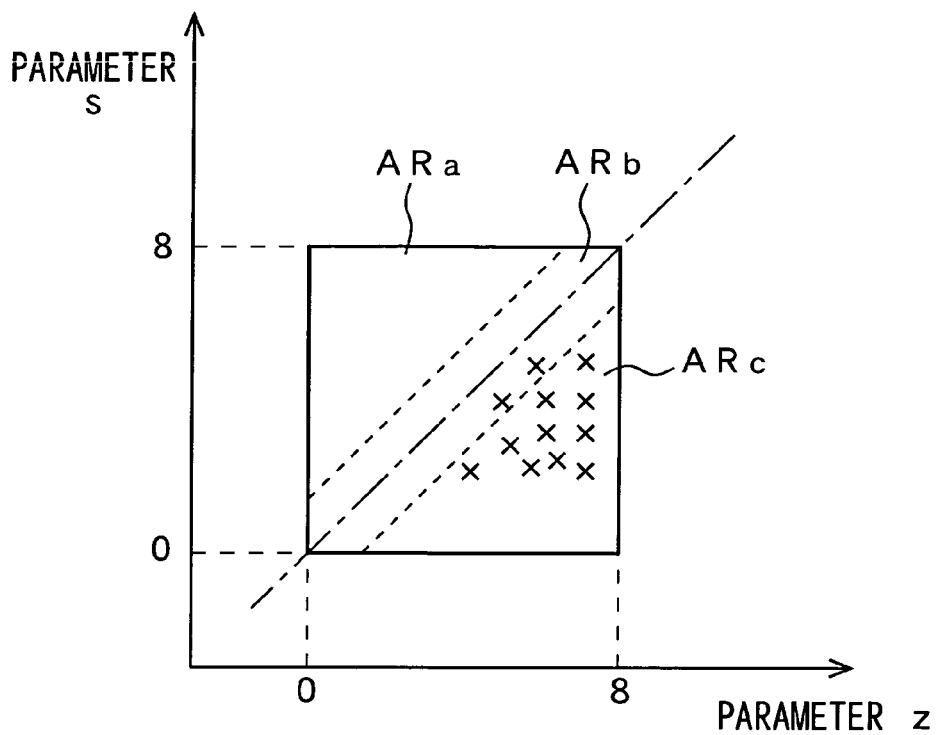
FIG. 24 is an illustration showing a user adjustable range.

When the above-described position of center-of-gravity exists within a region ARa shown in FIG. 24 and it seems that the user is interested in adjustment with an emphasis on the resolution of space direction, A-type prediction tap positions shown in FIG. 22A are selected. In this case, the coefficient seed data, $w_{10}$-$w_{n9}$ is generated such that the resolution of space direction (vertical and horizontal directions) determined by the value of parameter s have a higher accuracy than the resolution of time direction determined by the value of parameter z, since the number of prediction taps is larger in space direction.

When the position of center-of-gravity exists within a region ARb of FIG. 24 and the user does not seem to perform adjustment with an emphasis on a resolution in either space direction or time direction only, B-type prediction tap positions shown in FIG. 22B are selected. In this case, the coefficient seed data, w10-wn9 is generated such that the resolution of space direction determined by the value of parameter s and the resolution of time direction determined by the value of parameter z are respectively created at a set accuracy, as in the above described case where no history information is input.

Further, when the position of center-of-gravity exists within a region ARc of FIG. 24 and the user seems to perform an adjustment with an emphasis on the resolution in space direction, C-type prediction tap positions shown in FIG. 22C are selected. For example, if the position of adjustment of parameters, s, z used in television receiver 100B is located at the position marked by "X" as shown in FIG. 24, with the center-of-gravity existing within the region ARc, C-type prediction tap positions shown in FIG. 22C are selected.

In this case, the coefficient seed data, w10-wn9 is generated such that the resolution of time direction determined by the value of parameter z has a higher accuracy than the resolution of space direction determined by the value of parameter s, since the number of prediction taps is larger in time direction.

The rest of the components of coefficient seed data production device 150B are the same configuration as the corresponding components of the coefficient seed data production device 150 shown in FIG. 9. Although detailed description of the coefficient seed data production device 150B is omitted here, its operation is similar to that of the coefficient seed data production device 150 shown in FIG. 9, and the device 150B can produce, in a preferred fashion, the coefficient seed data, $w_{10}$-$w_{n9}$ to be stored in the information memory bank 135B of the television receiver 100B shown in FIG. 21.

It is noted that the tap position information stored in the information memory bank 135B of the television receiver 100B described above concerns the tap position selected at the time of generating the coefficient seed data, w10-wn9 by the coefficient seed data production device 150B.

Storing the coefficient seed data, $w_{10}$-$w_{n9}$ thus obtained in this manner in the information memory bank 135B of the board containing the image signal processing section 110B that is newly installed at the upgrade of the television receiver 100B, a more accurate resolution of space direction is created for the user when he or she has had an emphasis on the resolution of space direction beforehand, and a more accurate resolution of time direction is created when he or she has had an emphasis on the resolution of time direction beforehand. Therefore, a preferred resolution that suits to the taste of the user can be created.

Although the coefficient seed data production device 150B shown in FIG. 23 corresponds to the coefficient seed data production device 150 shown in FIG. 9, the coefficient seed data $w_{10}$-$w_{n9}$ to be stored in the information memory bank 135B of the television receiver 100B can be also produced by a coefficient seed data production device that corresponds to the coefficient seed data production device 150' shown in FIG. 12. To do this, the SD signal production circuit 152 and the first tap selection circuit 153 of the coefficient seed data production device 150' may be replaced by the SD signal production circuit 152B and the first tap selection circuit 153B of the coefficient seed data production device 150B shown in FIG. 23.

In the image signal processing section 110B of FIG. 21, resolutions of an image in space direction (vertical and horizontal directions) and time direction (frame direction) can be adjusted by varying the value(s) of a parameter s for determining resolution of space direction and a parameter z for determining resolution of time direction and adjusting the values of the parameters, s, z accordingly. It is also possible to construct the image signal processing section capable of adjusting resolutions in more than two directions other than the ones described above. For example, resolutions in vertical and horizontal directions, or resolutions in vertical and horizontal directions as well as time direction may be included as adjustable resolutions.

Although the types of tap positions of prediction taps that can be selected by the first tap selection circuit 121 of the image signal processing section 110B of FIG. 21 are the three types as shown in FIGS. 22A-22C, types of tap positions of selectable prediction taps are not limited to these three.

It should be understood that the data processing carried out by the image signal processing section 110B of FIG. 21 can be implemented as software routines executed by, for example, the image signal processing device 300 as shown in FIG. 13. In this case, the image signal processing is carried out basically following the procedure depicted in the flowchart shown in FIG. 14. Moreover, when pixel data of the prediction tap is obtained at step ST8, the pixel position of the prediction tap is set to the same position of the prediction tap used in the production device at the time of production of the coefficient seed data $w_{10}$-$w_{n9}$ to be used at step ST7.

It will be understood that the data processing carried out by the coefficient seed data production device 150B of FIG. 23 may be implemented as software routines, though the processing apparatus therefor is not shown. In this instance, the coefficient seed data production processing is carried out basically following the procedure depicted in the flowchart shown in FIG. 15. It is noted that, at step ST22, only the picture quality patterns (specified by parameters, s, z) are selected but the adjustment based on its history information is not carried out. It is also noted that in acquiring pixel data of a prediction tap at step ST27, the pixel positions of the prediction tap is selected based on the relevant history information.

Further embodiments of the invention will be described below.

Figure 25:
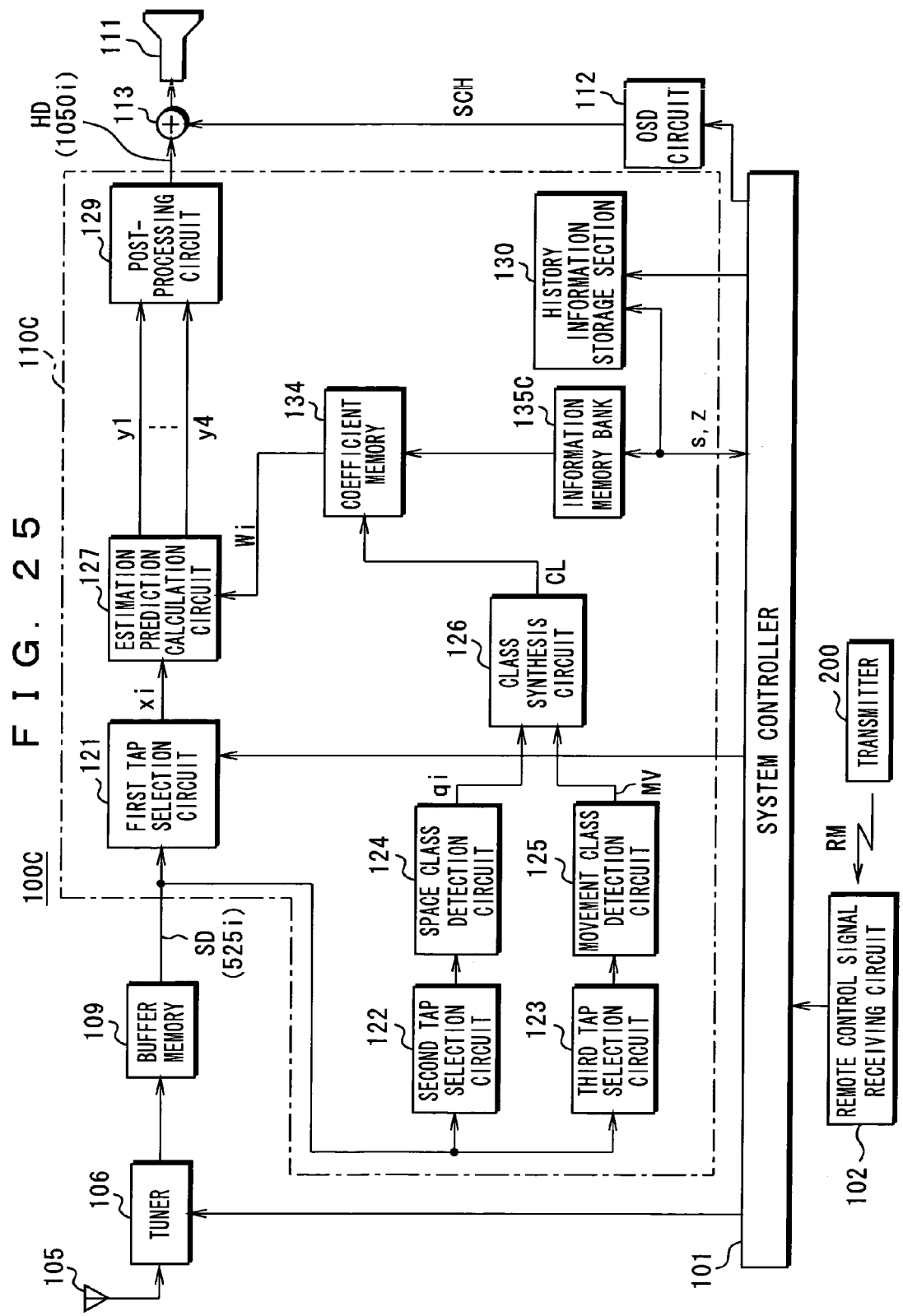
FIG. 25 is a block diagram showing a configuration of a TV receiver according to additional embodiment of the invention.

Referring to FIG. 25, there is shown a configuration of a television receiver 100C in accordance with further embodiment of the invention. This TV receiver 100C receives a 525$i$ signal as an SD signal from a broadcast signal to then convert this 525$i$ signal into a 1050$i$ signal as an HD signal, thus displaying an image based on this 1050$i$ signal. In FIGS. 25 and 17, the corresponding components are indicated by the same reference symbols.

The TV receiver 100C is the same as the TV receiver 100A shown in FIG. 17 except that the image signal processing section 110A is replaced by an image signal processing section 110C. The TV receiver 100C performs almost the same operation as the TV receiver 100A does.

The detailed image signal processing section 110C will be described as follows. In this image signal processing section 110C, the components corresponding to the ones of the image signal processing section 110A shown in FIG. 17 are indicated by the same reference symbols and their detailed explanation is omitted.

The image signal processing section 110C includes an information memory bank 135C. The information memory bank 135C accumulates therein beforehand the coefficient data, Wi(i=1-n) for each combination of class, output pixel (see $HD_1$-$HD_4$ of FIG. 5 and $HD_1'$-$HD_4'$ of FIG. 6), and values of parameters, s, z. A method of producing the coefficient data, Wi will be described in detail later.

Also stored in the information memory bank 135C is tap position information of the prediction tap selected by the first tap selection circuit 121, in association with the stored coefficient data, Wi (i=1-n). This tap position information provides information on the position of the prediction tap selected at the time of producing the coefficient data, $w_{10}$-$w_{n9}$ in the production device.

In this way, the system controller 101 switches the position of the prediction tap selected by the first tap selection circuit 121 based on the tap position information stored in the information memory bank 135C such that this prediction tap position becomes identical to that used in the production device at the time of producing the coefficient data $w_{10}$-$w_{n9}$.

In the example shown herein, the position of the prediction tap selected by the first tap selection circuit 121 ranges over positions in the vertical, horizontal, and time directions. As in image signal processing section 110B as shown in FIG. 21, prediction tap position can be switched to any one of A-type, B-type, and C-type, based on the tap position information stored in the information memory bank 135C.

Other configuration of the image signal processing section 110C is same as that of the image signal processing section 110A as shown in FIG. 17.

Although not described more in detail, the image signal processing section 110C operates in exactly the same manner as the image signal processing section 11C of FIG. 17.

That is, an SD signal (525$i$ signal) can be converted into an HD signal (1050$i$ signal). The user can adjust the values of the parameters, s, z to thereby arbitrarily adjust the resolutions of space and time direction of an image in HD signal.

The frequency distribution memory 130$a$ (see FIG. 7) of the history information storage section 130 stores information on the respective frequency distributions of the values of the parameters, s, z supplied from the system controller 101 to the information memory bank 135C. The time-course memory 130$d$ (see FIG. 7) of the history information storage section 130 stores the values of the parameters, s, z, of a predetermined number, for example, 10 latest parameters, s, z, selected from the parameters entered from the system controller 101 to the information memory bank 135C.

In this way, the history information stored in the frequency distribution memory 130$a$ and in time-course memory 130$d$ of history information storage section 130 may be utilized to produce the coefficient data, w10-wn9 to be stored in the information memory bank 135C when the board containing the image signal processing section 110C is replaced to upgrade the television receiver 100C.

The coefficient data, Wi (i=1-n) to be stored in the information memory bank 135C is produced in a similar way as the coefficient data, Wi stored in the information memory bank 135A of the image signal processing section 110A shown in FIG. 17.

Figure 26:
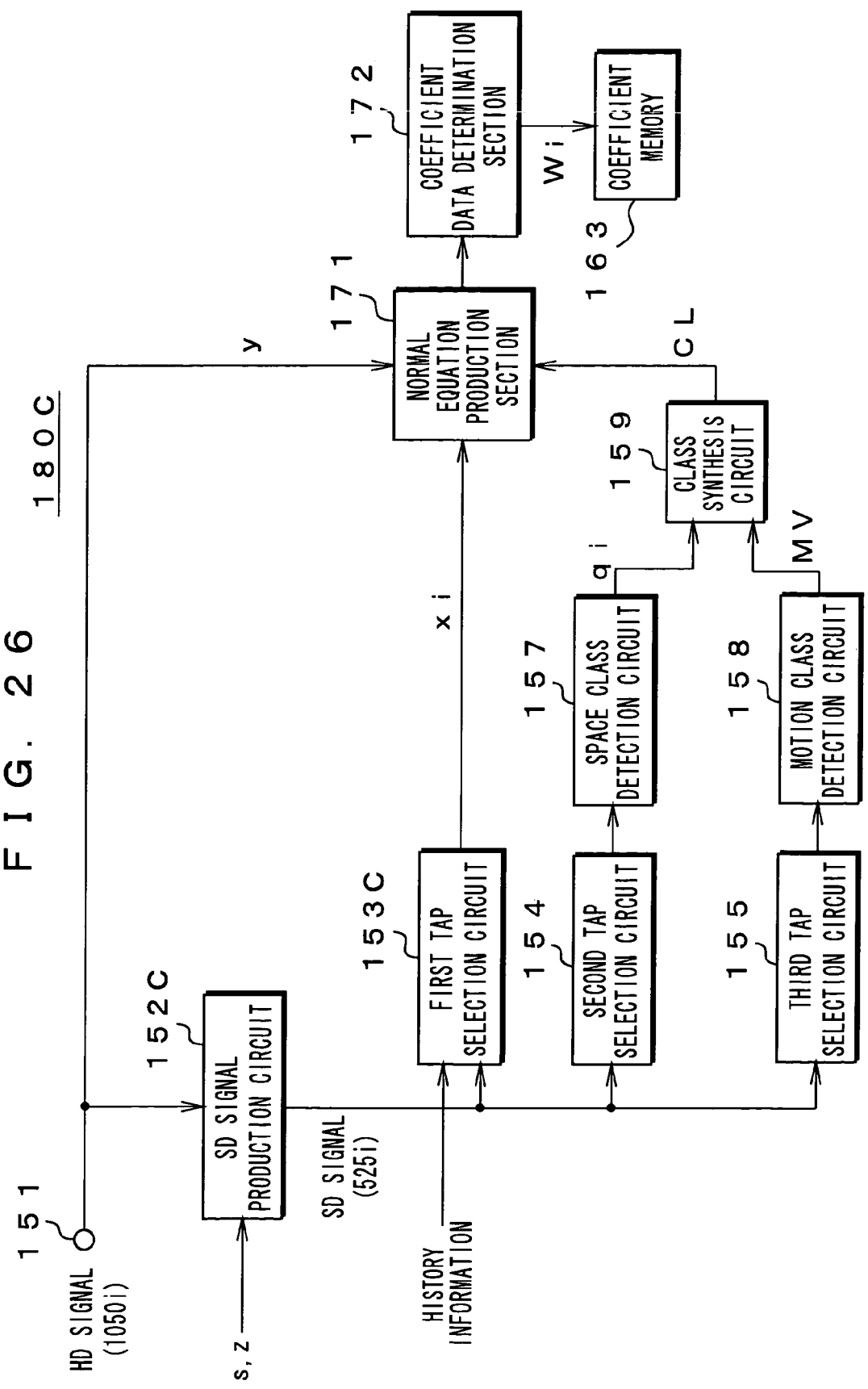
FIG. 26 is a block diagram showing configuration example of coefficient data production device.

Referring to FIG. 26, there is shown a configuration of the coefficient data production device 180C for producing the coefficient data, Wi to be stored in the information memory bank 135C of the above described television receiver 100C. The components of FIG. 26 will be referred to by the same reference numerals as like components of FIG. 18, and detailed description of these components will be omitted.

This coefficient seed data production device 180C has an SD signal production circuit 152C for performing thinning-out processing horizontally and vertically on the HD signal entered into the input terminal 151 to obtain an SD signal serving as a student signal.

The SD signal production circuit 152C is supplied with the values of the parameters, s, z that correspond to the values of parameters, s, z used in the television receiver 100C (see FIG.

25) described above. However, unlike SD signal production circuit 152 of the coefficient data production device 180 shown in FIG. 18, the SD signal production circuit 152C is not supplied with the history information.

Hence, inputted values of parameters, s, z are not adjusted in the SD signal production circuit 152C. Instead, bands of space and time directions of the band limiting filter used in producing an SD signal from an HD signal are varied in response to the inputted values of the parameters, s, z themselves.

The coefficient data production device 180C also has a first tap selection circuit 153C for selectively extract, from SD signal (525$i$ signal) outputted from the SD signal production circuit 152C, pixel data (SD pixel data) xi of a prediction tap located on a periphery of an objective position in the HD signal (1050$i$ signal).

Unlike the first tap selection circuit 153 of coefficient data production device 180 shown in FIG. 18, this first tap selection circuit 153C is supplied with the history information on the inputted values of the parameters, s, z stored in the frequency distribution memory 130$a$ and time course memory 130$d$ (FIG. 7) of history information storage section 130 of the television receiver 100C described above.

It is noted that when the coefficient data, Wi to be stored in the information memory bank 135C of a television receiver 100C that has not yet used is generated, the history information is not stored in the first tap selection circuit 153C since the history information has not yet been stored in the frequency distribution memory 130$a$ and time-course memory 130$d$ of the history information storage section 130. In short, the history information is inputted to the first tap selection circuit 153C when, for example, the board that includes the image signal processing section 110C is replaced to upgrade the television receiver 100C and the coefficient data, Wi to be stored in the information memory bank 135C is produced.

In first tap selection circuit 153C, the prediction tap position is switched to any one of the three types, A-C, as shown in FIGS. 22A-22C, respectively, in accordance with the inputted history information.

If no history information is inputted to the first tap selection circuit 153C, then C-type prediction tap position shown in FIG. 22B is assumed. In this case, the coefficient data, Wi is generated such that a resolution of space direction determined by the value of parameter s and a resolution of time direction determined by the value of parameter z are respectively created at a set accuracy.

When the history information is input, the first tap selection circuit 153C determines the position of center-of-gravity using the frequency distribution information on the values of the respective parameters, s, z. In this case, the values of the latest parameters, s, z of a predetermined number are weighted with larger weights. In the first tap selection circuit 153C, the type of prediction tap is selected in accordance with the position of center-of-gravity.

In the television receiver 100C, the respective values of the parameters, s, z are adjusted in a predetermined steps (in the range of 0-8) under the user operation of the television receiver 100C, to adjust resolutions of space and time directions.

When the above-described position of center-of-gravity exists within a region ARa shown in FIG. 24 and it seems that the user is interested in adjustment with an emphasis on the resolution of space direction, A-type prediction tap positions shown in FIG. 22A are selected. In this case, the coefficient data, Wi is produced such that the resolution of space direction (vertical and horizontal directions) determined by the value of parameter s have a higher accuracy than the resolution of time direction determined by the value of parameter z, since the number of prediction taps is larger in space direction.

When the position of center-of-gravity exists within a region ARb of FIG. 24 and the user does not seem to perform adjustment with an emphasis on a resolution in either space direction or time direction only, B-type prediction tap positions shown in FIG. 22B are selected. In this case, the coefficient data, Wi is produced such that the resolution of space direction determined by the value of parameter s and the resolution of time direction determined by the value of parameter z are respectively created at a set accuracy, as in the above described case where no history information is input.

Further, when the position of center-of-gravity exists within a region ARc of FIG. 24 and the user seems to perform an adjustment with an emphasis on the resolution in space direction, C-type prediction tap positions shown in FIG. 22C are selected. In this case, the coefficient data, Wi is produced such that the resolution of time direction determined by the value of parameter z has a higher accuracy than the resolution of space direction determined by the value of parameter s, since the number of prediction taps is larger in time direction.

The rest of the components of coefficient data production device 150C are the same configuration as the corresponding components of the coefficient data production device 180 shown in FIG. 18. Although detailed description of the coefficient data production device 180C is omitted here, its operation is similar to that of the coefficient data production device 180 shown in FIG. 18, and the device 180C can produce, in a preferred fashion, the coefficient data, Wi to be stored in the information memory bank 135C of the television receiver 100C shown in FIG. 25.

It is noted that the tap position information stored in the information memory bank 135C of the television receiver 100C described above concerns the tap position selected at the time of producing the coefficient data, Wi by the coefficient data production device 180C.

Storing the coefficient data, Wi thus obtained in this manner in the information memory bank 135C of the board containing the image signal processing section 10C that is newly installed at the upgrade of the television receiver 100C, a more accurate resolution of space direction is created for the user when he or she has had an emphasis on the resolution of space direction beforehand, and a more accurate resolution of time direction is created when he or she has had an emphasis on the resolution of time direction beforehand. Therefore, a preferred resolution that suits to the taste of the user can be created.

In the image signal processing section 10C of FIG. 25, resolutions of an image in space direction (vertical and horizontal directions) and time direction (frame direction) can be adjusted by varying the value(s) of a parameter s for determining resolution of space direction and a parameter z for determining resolution of time direction and adjusting the values of the parameters, s, z accordingly. It is also possible to construct the image signal processing section capable of adjusting resolutions in more than two directions other than the ones described above. For example, resolutions in vertical and horizontal directions, or resolutions in vertical and horizontal directions as well as time direction may be included as adjustable resolutions.

Although the types of tap positions of prediction taps that can be selected by the first tap selection circuit 121 of the image signal processing section 110C of FIG. 25 are the three types, types of tap positions of selectable prediction taps are not limited to these three.

It should be understood that the data processing carried out by the image signal processing section 110C of FIG. 25 can be implemented as software routines executed by, for example, the image signal processing device 300 as shown in FIG. 13. In this case, the image signal processing is carried out basically following the procedure depicted in the flowchart shown in FIG. 19. Moreover, when pixel data of the prediction tap is obtained at step ST68, the pixel position of the prediction tap is set to the same position of the prediction tap used in the production device at the time of production of the coefficient data, Wi to be used at step ST67.

It will be understood that the data processing carried out by the coefficient data production device 180C of FIG. 26 may be implemented as software routines, though the processing apparatus therefor is not shown. In this instance, the coefficient data production processing is carried out basically following the procedure depicted in the flowchart shown in FIG. 20. It is noted that, at step ST82, only the picture quality patterns (specified by parameters, s, z) are selected but the adjustment based on its history information is not carried out. It is also noted that in acquiring pixel data of a prediction tap at step ST87, the pixel position of the prediction tap is selected based on the relevant history information.

Although in the embodiments described above in connection with FIGS. 1, 17, 21, and 25, an estimation equation using linear equation has been used to generate an HD signal, the invention is not limited to this estimation equation. For example, high-mode equation may be used as an estimation equation.

It should be understood that the shape of tap used in the respective tap selection circuits is not limited to the one shown in the embodiments described above. Rather, it can be any shape.

Although the invention has been described above to convert an SD signal (525$i$ signal) into an HD signal (1050$i$ signal) with reference to embodiments shown in FIGS. 1, 17, 21, and 25, the invention is not limited to these embodiments. For example, the invention can be applied to a conversion of a first image signal into a second image signal using an estimation equation.

Although the informational signal has been described to be an image signal in the embodiments shown in FIGS. 1, 17, 21 and 25, the invention is not limited to these embodiments. For example, the invention can be applied to a case where the informational signal is an audio signal. In that event, audio quality and acoustic effects correspond to the picture quality above. Selective taps and classes should be then replaced by appropriate parameters adequate to an audio signal.

Next, further embodiments of the invention will now be described below. Referring to FIG. 27, there is shown a signal receiving device 500 in accordance with one embodiment of the invention.

This signal receiving device 500 comprises control unit 501, which has a CPU (Central Processing Unit) 301, not shown, for controlling the operations of the apparatus as a whole. The control unit includes a timer section. The control unit 501 is connected to console 503 provided for a user to carry out various operations including tuning, video recording, video-recording programming, and playback operation.

The signal receiving device 500 comprises receiving antenna 504 for receiving analog and digital broadcast signals, and selector 505 for selectively inputting an analog broadcast signal and a digital broadcast signal received by antenna 504 to analog tuner (tuner) 506 and digital tuner (tuner) 521, respectively, as described later.

In this case, the selector 505 inputs the broadcast signal received by the antenna 504 into the analog tuner 506 when it is intended to receive a program contained in the analog broadcast signal, or into the digital tuner 521 when it is intended to receive a program contained in the digital broadcast signal.

The signal receiving device 500 also comprises analog tuner 506 for obtaining an IF signal for a desired program through tuning processing on the input analog broadcast signal, and demodulation unit 507 for carrying out demodulation processing (image detection processing) on the IF signal obtained by the analog tuner 506 to extract an image signal of the desired program as a broadcasting data.

During a vertical blanking period in the image signal obtained by the demodulation unit 507, additional information AI1 relative to this desired program is multiplexed. This additional information AI1 contains such information as title, performer's name, and genre of the program.

The signal receiving device 500 also comprises selector 508 for inputting the image signal obtained by the demodulation unit 507 in record control unit 510 and YC separation control unit 512, as described in detail later. In this case, the selector 508 inputs the image signal obtained in the demodulation unit 507 into record control unit 510 when recording the signal, and into the YC separation control unit 512 when displaying the image signal on display element (not shown) such as a CRT (Cathode-Ray Tube) or LCD (Liquid Crystal Display).

The signal receiving device 500 also comprises VTR (Video Tape Recorder) 509 serving as an analog recording unit, record control unit 510 for controlling recording of this image signal in the VTR 509, and reproduction control unit 511 for controlling the playback of the image signal received from the VTR 509.

The signal receiving device 500 also comprise YC separation control unit 512 for separating luminance signal Y and carrier chrominance signal C from a image signal and then demodulating the carrier chrominance signal C to obtain red difference signal R-Y and blue difference signal B-Y, and finally obtain chrominance signals R, G, and B for red, green, and blue colors forming image data, through matrix processing using Y, R-Y, and B-Y signals.

In the example shown herein, when image signal is recorded in the VTR 509, the signal is supplied to the VTR 509 through record control unit 510. In reproducing the image signal from the VTR 509, the reproduced image signal is inputted to the YC separation control unit 512 via reproduction control unit 511.

Figure 28:
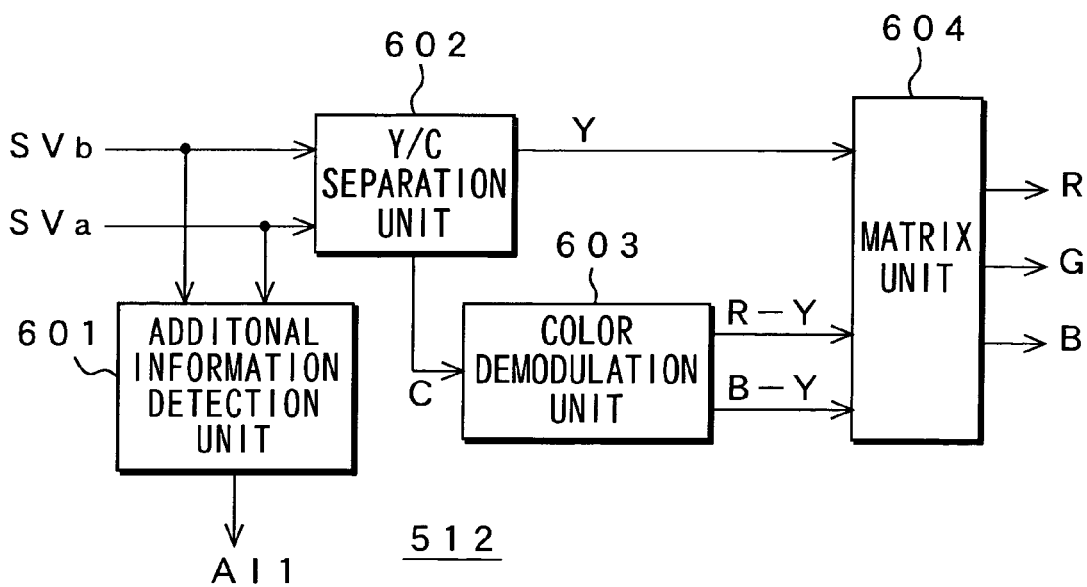
FIG. 28 is a block diagram showing a configuration of a YC separation control unit.

FIG. 28 shows a configuration of the YC separation control unit 512. An image signal SVa received from the demodulation unit 507 via the selector 508 is supplied to additional information detection unit 601 and Y/C separation unit 602. Similarly, an image signal SVb reproduced in the VTR 509 and inputted through the reproduction control unit 511 is supplied to the additional information detection unit 601 and the Y/C separation unit 602.

The additional information detection unit 601 detects the additional information AI1 multiplexed in vertical blanking periods of the input image signal SVa or the input image signal SVb, and supplies detected additional information AI1 to log record control unit 542, as described later. The Y/C separation unit 602 separates the input image signal SVa or the input image signal SVb to luminance signal Y and carrier chrominance signal C, and inputs the luminance signal Y to matrix unit 604 and carrier chrominance signal C to color demodulation unit 603.

The color demodulation unit 603 demodulates the input carrier chrominance signal C to extract red difference signal R-Y and blue difference signal B-Y, and inputs these color-difference signals R-Y and B-Y to the matrix unit 604. The matrix unit 604 performs matrix operation using input luminance signal Y and color-difference signals R-Y and B-Y, to generate and outputs chrominance signals R, G, and B for red, green, and blue.

Referring back to FIG. 27, the signal receiving device 500 has synthesis unit 513 for synthesizing a display signal SCH to display characters, figures, etc. for the OSD (On-Screen Display) function for chrominance signals R, G, and B for red, green, and blue that are outputted from the YC separation control unit 512.

As the chrominance signals R, G, and B of red, green, blue outputted from the synthesis unit 513 are supplied to display devices (not shown) such as a CRT and an LCD, an image associated with the image signal SVa or the image signal SVb is displayed on the display element.

The signal receiving device 500 also comprises digital tuner 521 for obtaining digital modulation data of a desired program by tuning the input digital broadcast signal, and channel decoder 522 for demodulating the digital modulation data obtained in the digital tuner 521 to obtain MPEG (Moving Picture Experts Group)-format broadcasting data.

In the MPEG data obtained in this way in the channel decoder 522, additional information AI2 associated with the desired program is multiplexed. This additional information AI2 contains such information as title, names of performers, and genre of the program.

The signal receiving device 500 also comprises selector 523 for inputting the MPEG data obtained in the channel decoder 522 to MPEG decoder 527 and record control unit 525 as described in detail later. In this case, the selector 523 inputs the MPEG data obtained in the channel decoder 522 into the record control unit 525 when recording the data and inputs the data in the MPEG decoder 527 when displaying images formed by the MPEG data on display elements (not shown) such as CRT and LCD.

The signal receiving device 500 also comprises a digital recording unit in the form of HDD (Hard Disk Drive) 524, record control unit 525 for controlling recording of the MPEG data into the HDD 524, reproduction control unit 526 for controlling reproducing the MPEG data retrieved from the HDD 524, and MPEG decoder 527 for obtaining picture data in the form of chrominance signals R, G, and B for red, green, and blue by decoding the MPEG data.

In recording the MPEG data in the HDD 524 as described above, the MPEG data is supplied thereto via record control unit 525. On the other hand, in reproducing the MPEG data from the HDD 524, the MPEG data reproduced from the HDD 524 is inputted to the MPEG data decoder 527 via the reproduction control unit 526.

It is noted that the selector 523 has a capability to extract the additional information AI2 added to the MPEG data. The additional information AI2 extracted in the selector 523 is supplied to log record control unit 542 via the record control unit 525, as described in detail later.

The signal receiving device 500 also comprises DVD (Digital Video Disc) reproduction unit 531 as a reproduction section and reproduction control unit 532 for controlling the reproduction of contents-data retrieved from the DVD reproduction unit 531.

From the DVD reproduction unit 531, contents-data relative to specific contents is reproduced in response to the operation made by the user. The contents-data contains additional information AI3 regarding, for example, the title, performer's name, director's name, composer's name, songwriter's name, and genre of the contents.

In the example shown herein, when predetermined content data retrieved from the DVD reproduction unit 531 are reproduced, the MPEG data contained in the contents-data is inputted to the MPEG decoder 527 via the reproduction control unit 532. The reproduction control unit 532 further extracts the additional information AI3 added to the contents-data, and supplies it to log record control unit 542, as described in detail later.

Figure 29:
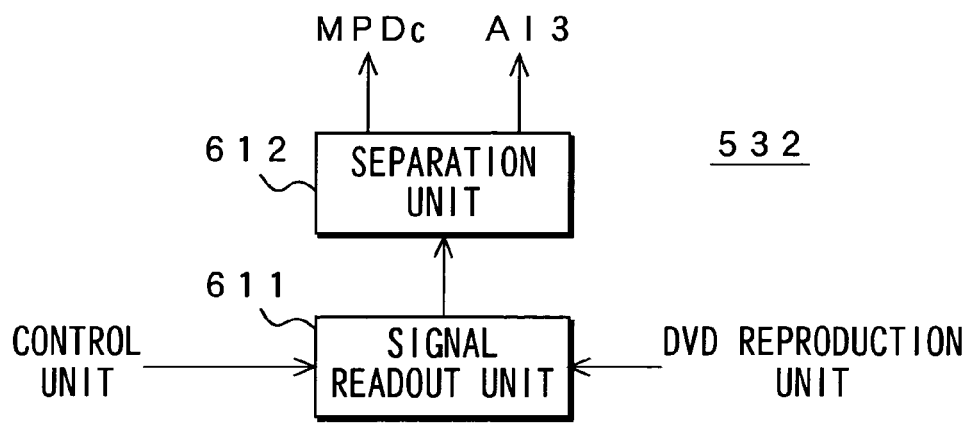
FIG. 29 is a block diagram showing a configuration of a playback control unit.

FIG. 29 shows a configuration of the reproduction control unit 532. As seen in the figure, the reproduction control unit 532 has signal readout unit 611, which brings DVD reproduction unit 531 to data reproducing status under the control of the control unit 501. Predetermined contents-data thus reproduced are supplied to separation unit 612 via the signal readout unit 611. This separation unit 612 extracts the additional information AI3 and MPEG data MPDc from the supplied contents-data and output them separately.

Referring back to FIG. 27 again, the signal receiving device 500 also comprises synthesis unit 533 for synthesizing display signals SCH for use in displaying characters and graphics in order to provide OSD function for chrominance signals R, G, B for red, green, and blue outputted from the MPEG decoder.

As the chrominance signals R, G, B for red, green and blue outputted from the synthesis unit 533 are supplied to display devices such as CRT and LCD (not shown), an image is displayed of MPEG data MPDa supplied from the channel decoder 522 to the MPEG decoder 527 via the selector, MPEG data MPDb supplied from the HDD 524 to the MPEG decoder 527 via the reproduction control unit 526, or MPEG data MPDc supplied from the DVD reproduction unit 531 to the MPEG decoder 527 via the reproduction control unit 532.

Display signal SCH supplied to synthesis units 513 and 533 is formed in the control unit 501 mentioned above and is supplied via the reproduction control unit 526, in a case of this embodiment.

Incidentally, the display signal SCH may be directly supplied from the control unit 501 to the synthesis units 513 and 533.

The display signal SCH is supplied to synthesis units 513 and 533 not only in the event of displaying on the display the channel number of the program selected and displaying a recording schedule, but also in the event of displaying a program table on the display element based on data relative to the program table stored in HDD 524 or in the event of displaying programs recommended to the user among programs in a program table stored in HDD 524, which will be described later.

In the above, the invention has been described as having the HDD 524 to store MPEG data of a desired program obtained by the channel decoder 522 and to reproduce the MPEG data of the desired program. The HDD 524 also records data relative to program table contained in the digital broadcast signal, i.e. EPG (Electronic Program Guide), obtained by, for example, the digital tuner 521. Such the data relative to the program table includes information on the broadcast programs over a few days, e.g. date and hour, channel, title, performers' names, genre, and outline of a respective program.

In this case, the data relative to the program table obtained by the digital tuner 521 is supplied to, and recorded on, the HDD 524 via the control unit 501 and the record control unit 525. The data relative to the program table is updated as needed.

The control unit 501 can search and obtain information on a desired program from the data relative to the program table stored in HDD 524 via the reproduction control unit 526. For example, when the user has scheduled recording of a program based on the data relative to the program table recorded on the HDD 524, the control unit 501 acquires information on the scheduled program and supplies it as part of additional information AI2, to log record control unit 542 via the record control unit 525, as described later.

The signal receiving device 500 also comprises removable circuit board bay memory 541 and the log record control unit 542 for generating information of title, performer's name, and genre in the form of frequency distributions and for storing the information on frequency distributions in the bay memory 541.

Figure 30:
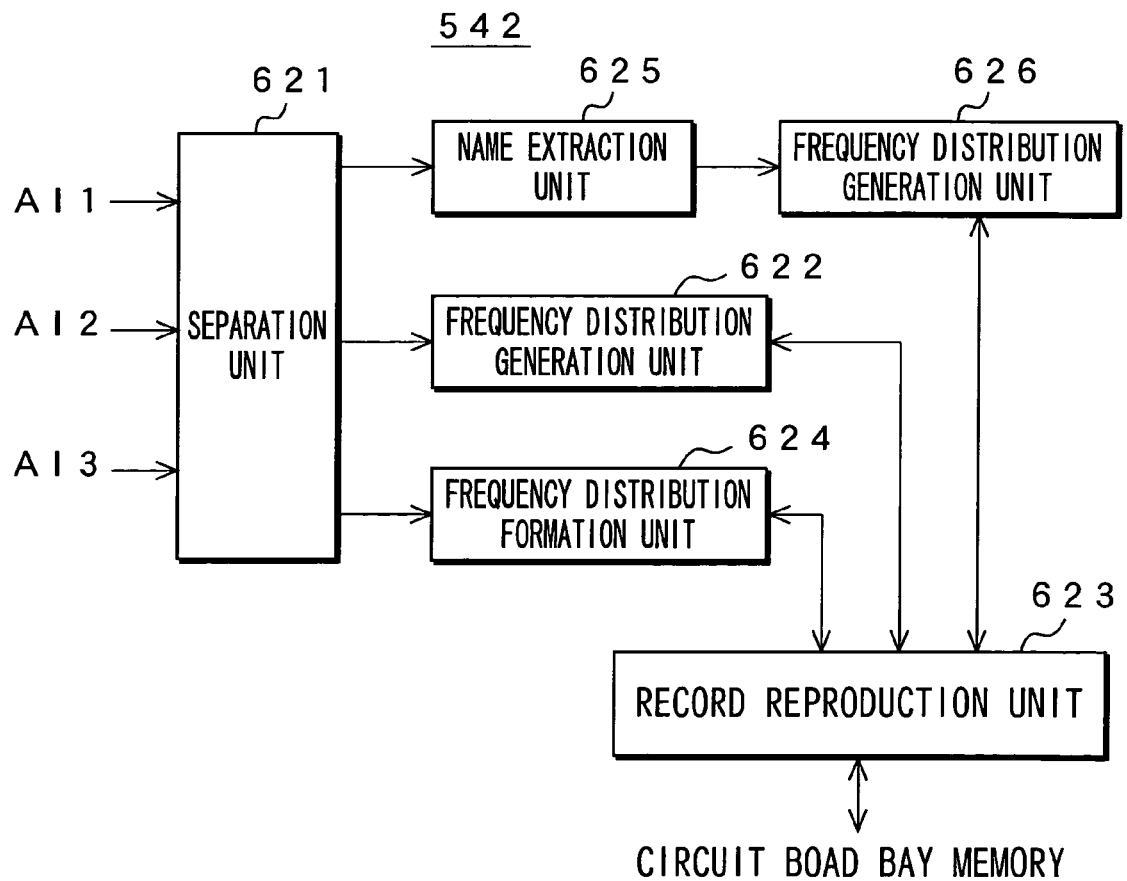
FIG. 30 is a block diagram showing a configuration of a log record control unit.

FIG. 30 shows a configuration of the log record control unit 542. The additional information AI1 supplied from the YC separation control unit 512, the additional information AI2 supplied from the record control unit 525, and the additional information AI3 supplied from the reproduction control unit 532 are respectively supplied to separation unit 621. The separation unit 621 separates information on titles, names of people, genres from the additional information thus supplied.

Information on titles separated in the separation unit 621 is supplied to frequency distribution production device 622. This frequency distribution production device 622 is supplied with information on frequency distribution of titles accumulated so far in the circuit board bay memory 541 and read out therefrom by the record reproduction unit 623.

The frequency distribution production device 622 corrects the information on frequency distribution of titles read out of the circuit board bay memory 541 such that the frequency of the title corresponding to the information on that title separated by the separation unit 621 is incremented. In this manner, information on frequency distribution of titles corrected by the frequency distribution production device 622 is written to circuit board bay memory 541 via the record reproduction unit 623. Thus, the information on frequency distribution of titles stored in the circuit board bay memory 541 is correctly updated in accord with the corrected frequency distribution of titles.

Information on genres separated by separation unit 621 is supplied to the frequency distribution production device 624. This frequency distribution production device 624 is supplied with information on frequency distribution of genres accumulated so far in the circuit board bay memory 541 and read out therefrom by the record reproduction unit 623.

The frequency distribution production device 624 corrects information on frequency distribution of genres read out of the circuit board bay memory 541 such that the frequency of that genre corresponding to the information on that genre separated by the separation unit 621 is incremented. The information on frequency distribution of genres corrected by the frequency distribution production device 624 is written to the circuit board bay memory 541 via the record reproduction unit 623. Thus, the information on frequency distribution of genres stored in the circuit board bay memory 541 is correctly updated in accord with the corrected frequency distribution of genres.

Information on the name of a person separated by the separation unit 621 is supplied to name extraction unit 625. Unlike information on titles and genres described above, information on the name of a person often includes several different pieces of information. The name extraction unit 625 extracts information on individual name of person contained in the information on the name of a person separated by the separation unit 621 and supplies it to the frequency distribution production unit 626. The frequency distribution production unit 626 is supplied with information on frequency distribution of the name of person accumulated so far and read out of the circuit board bay memory 541 by the record reproduction unit 623.

The frequency distribution production unit 626 corrects the information on frequency distribution of the name of person read out from the circuit board bay memory 541 such that the frequency of that name of person corresponding to that information on name of person extracted from the name extraction unit 625 is incremented. In this way, information on frequency distribution of the name of person corrected in the frequency distribution production device 626 is written to the circuit board bay memory 541 via the record reproduction unit 623. Thus, the information on frequency distribution of the name of person stored in the circuit board bay memory 541 is correctly updated in accord with the corrected information on the frequency distribution.

It should be understood that although control lines connected to the record control unit 510, the reproduction control unit 511, the YC separation control unit 512, the synthesis unit 513, the MPEG decoder 527, and the synthesis unit 533 are not shown in FIG. 27, operations of these units are controlled by the control unit 501.

Next, operations of the signal receiving device 500 shown in FIG. 27 will be described.

When receiving a desired program contained in analog broadcast signal according to the operation of console 503 by a user, a broadcast signal received by the receiving antenna 504 is supplied to the analog tuner 506 via the selector 505. In the tuner 506, an IF signal associated with the desired program is obtained by tuning the input analog broadcast signal. The IF signal of the desired program is supplied to the demodulation unit 507. In the demodulation unit 507, the IF signal is demodulated to obtain the image signal of the desired program.

When recording the image signal of the desired program in the VTR 509 according to the operation of console 503 by a user, the image signal is supplied to, and recorded on, the VTR 509 via the selector 508 and the record control unit 510.

When viewing an image based on the image signal of this desired program by displaying it on a display element such as a CRT and LCD according to the operation of console 503 by a use, the signal SVa is supplied to the YC separation control unit 512 via the selector 508. Chrominance signals R, G, and B, of red, green, and blue, respectively, outputted from this YC separation control unit 512 are supplied to a display element such as a CRT and a LCD panel, not shown, via the synthesis unit 513.

Thus, an image formed by the received image signal SVa of the desired program is displayed on the display element. Then, in the YC separation control unit 512, the additional information AI1 is separated from the image signal SVa and supplied to the log record control unit 542.

Figure 31:
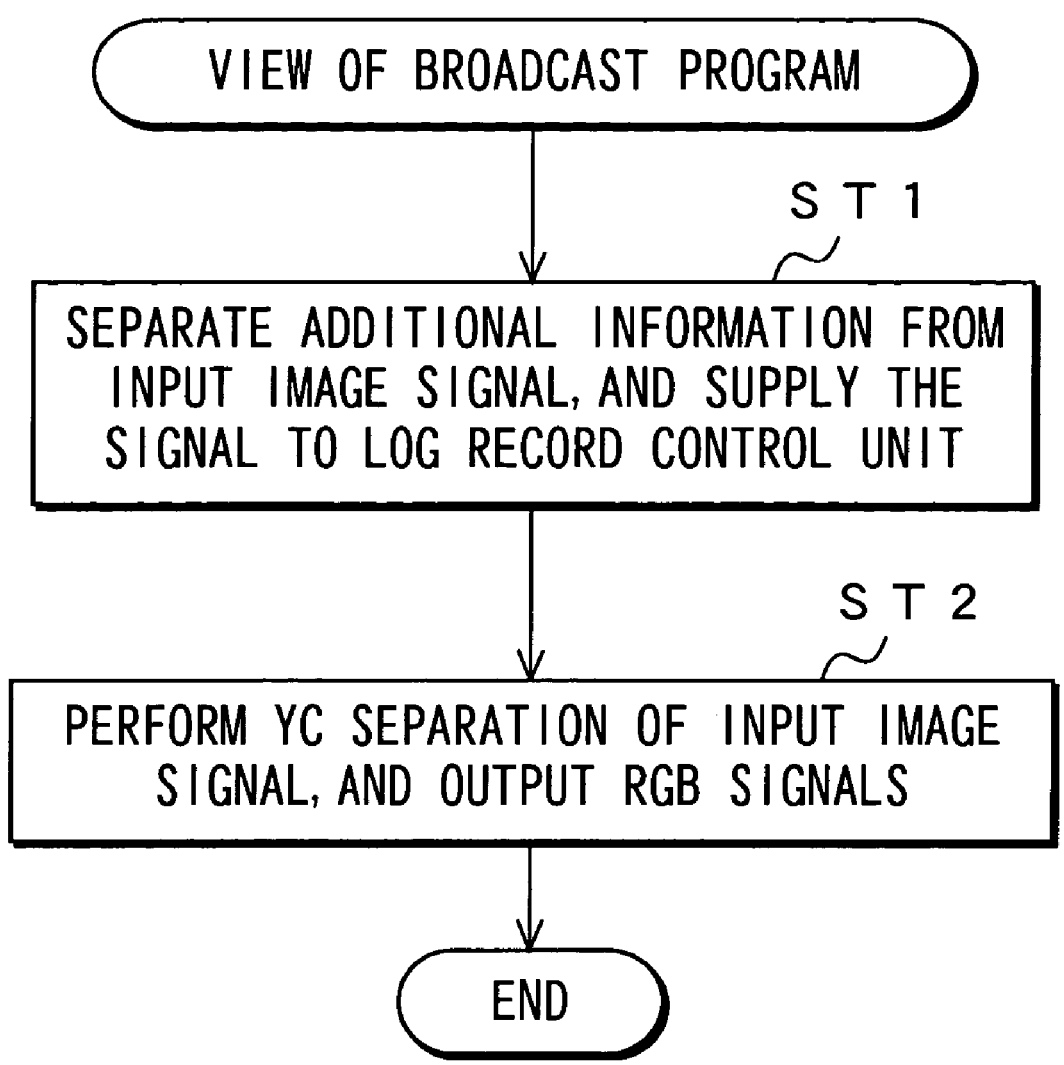
FIG. 31 is a flowchart illustrating operations of the YC separation control unit in receiving a broadcast program.

FIG. 31 is a flowchart showing operations of the YC separation control unit 512 upon a view of a broadcast program. At step ST1, the additional information AI1 is separated from an input image signal, which signal is supplied to the log record control unit 542. Then, at step ST2, a luminance signal Y and a carrier chrominance signal C are separated from the image signal, and, by processing these signals, chrominance signals R, G, and B are outputted.

When the image signal of a desired program recorded in the VTR 509 is reproduced according to the operation of the console 503 by the user, the image signal SVb reproduced by the VTR 509 is supplied to the YC separation control unit 512 via the reproduction control unit 511. Thus, an image of the image signal SVb of the desired program reproduced from the VTR 509 is displayed on the display element.

In this case, the additional information AI1 is separated from the image signal SVb in the YC separation control unit 512, and supplied to the log record control unit 542. Although not described in detail, operations of the YC separation control unit 512 during reproduction of VTR data are similar to the above described operations of the unit 512 during viewing a broadcast program (See flowchart of FIG. 31).

When receiving a desired program contained in a digital broadcast signal according to the operation of the console 503 by the user, the broadcast signal received by the receiving antenna 504 is supplied to the digital tuner 521 via the selector 505.

The tuner 521 is tuned to the input digital broadcast signal to obtain the digital modulation data of a desired program. Channel decoder 522 is supplied with this digital modulation data of the desired program. The channel decoder 522 then demodulates digital modulation data to obtain the MPEG data of the desired program.

The MPEG data of the desired program thus obtained by the channel decoder 522 is supplied to the selector 523. The selector 523 separates the additional information AI2 added to the MPEG data of the desired program, and supplies it to the log record control unit 542 via the record control unit 525.

When the MPEG data of the desired program is recorded in HDD 524 according to the operation of the console 503 by the user, this MPEG data is recorded in the HDD 524 via the selector 523 and the record control unit 525.

When the image of the MPEG data of the desired program is viewed on the display element such as CRT and LCD panel according to the operation of the console 503 by the user, the MPEG data, MPDa is supplied to the MPEG decoder 527 via the selector 523. Then, chrominance signals, R, G, and B, of red, green, and blue outputted from this MPEG decoder 527 are supplied to the display element, not shown, such as CRT and LCD panel via the synthesis unit 513. Thus, an image formed by the MPEG data, MPDa of the desired program received is displayed on the display element.

When the MPEG data of the desired program recorded in the HDD 524 is reproduced according to the operation of the console 503 by the user, the MPEG data, MPDb reproduced from the HDD 524 is supplied to the MPEG decoder 527 via the reproduction control unit 526. Thus, an image formed by the MPEG data, MPDb of the desired program reproduced from the HDD 524 may be displayed on the display element.

The program table can be also displayed on the display element based on an the data relative to the program table recorded in the HDD 524 according to the operation of the console 503 by the user. In this case, the control unit 501 reads information on the genre, date and hour, etc. of the program specified according to, for example, the operation of the console 503 by the user, out of the HDD 524 via the reproduction control unit 526, and produces a display signal SCH for displaying the program table using the information on the retrieved information thus read.

The display signal SCH is supplied from the control unit 501 to the synthesis units 513 and 533 via the reproduction control unit 526. The synthesis units 513 and 533 synthesizes the display signal SCH with the chrominance signals R, G, and B forming image data. As a consequence, the program table is displayed on the screen of the display element, along with the image of the respective chrominance signals R, G, and B. The user can make up a recording schedule for recording a desired program, with the program table being displayed on the display element as described above. In this case, the user can choose the desired program to be recording scheduled from the displayed program table according to the operation of the console 503.

When a recording schedule is made up in this way based on the program table, the control unit 501 reads out of the HDD 524 information on the date and hour and the channel of broadcast, title, performers' name, genre of the program via the reproduction control unit 526, and allows the information to be stored temporarily in a built-in memory (not shown).

The control unit 501 then supplies the information on the channel, title, performers' names, and genre to the log record control unit 542 via the record control unit 525 as the additional information AI2 on the desired program.

The control unit 501 also controls the schedule based on the information on the date and time and the channel of the broadcast so that the desired program be recorded on the schedule. That is, at the scheduled time on the day of the broadcast, the control unit 501 activates either the analog tuner 506 or the digital tuner 521, rendering a channel for the desired program capable of receiving it, and controls the record control unit 510 or the record control unit 525 to record the image signal or MPEG data of the desired program by the VTR 509 or the HDD 524.

Figure 32:
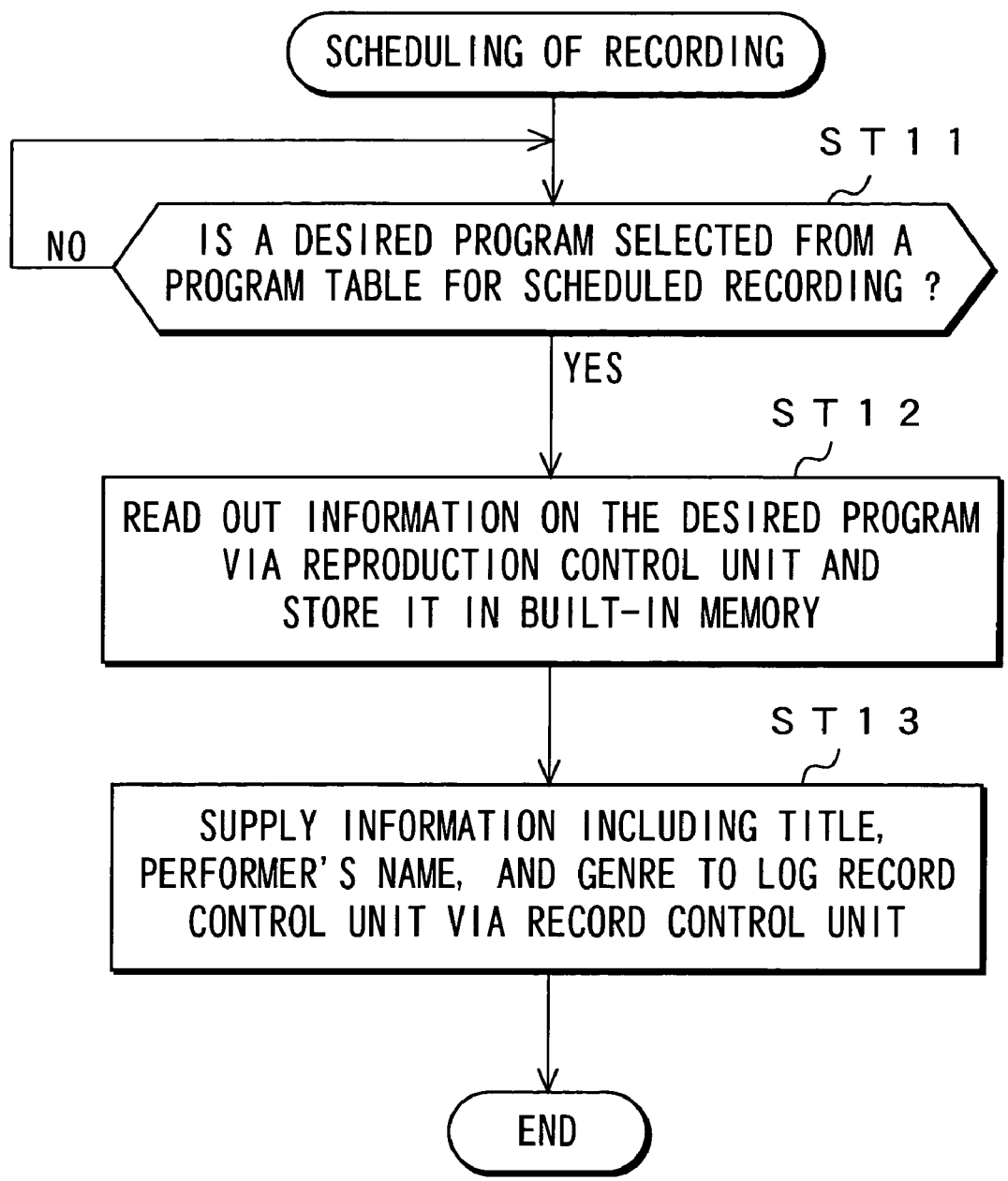
FIG. 32 is a flowchart illustrating operations of the control unit in a scheduled recording of a program.

FIG. 32 is a flowchart showing operations of the control unit 501 controlling a scheduled recording of a program as described above. When at step ST11, a desired program is selected by the user from a program table for scheduled recording, then at step ST12, information including the date and hour and channel of the broadcast, title, and performers' names, and genre of the program is read out from the HDD 524 via the reproduction control unit, and temporarily stored in the built-in memory. Then, at step ST13, the information including the title, performers' names, and genre of the scheduled program is supplied to the log record control unit 542 via the record control unit 525 as the additional information AI2 on the desired program.

It should be apparent that a desired program to be recorded on schedule can be specified by entering the broadcast date and hour and the channel directly according to the operation of the console 503, instead of selecting it on the program table at the scheduled recording. In this case, the control unit 501 temporarily stores the input date and hour of the broadcast and the input channel in the built-in memory, and causes the scheduled recording to be done as schedule based on the stored information.

The control unit 501 searches the HDD 524 via the reproduction control unit 526, based on the information on the broadcast time and day and the channel, for the information regarding the title, performers' names, and genre associated with the desired program thus scheduled. If the information is found to be stored on the hard disk, the control unit 501 retrieves the information and temporarily stores it in the built-in memory. The control unit 501 then supplies the information to the log record control unit 542 via the record control unit 525 as the additional information AI2 on the desired program on the recording schedule.

When reproducing a predetermined contents by the DVD reproduction unit 531 according to the operation of the console 503 by the user, the MPEG data, MPDc reproduced by the DVD reproduction unit 531 is supplied to the MPEG decoder 527 via the reproduction control unit 532. Then the image associated with the MPEG data, MPDc of the contents reproduced by the DVD reproduction unit 531 is displayed on the display element. In this case, the reproduction control unit 532 extracts the additional information AI3 added to the MPEG data and supplies it to the log record control unit 542.

Figure 33:
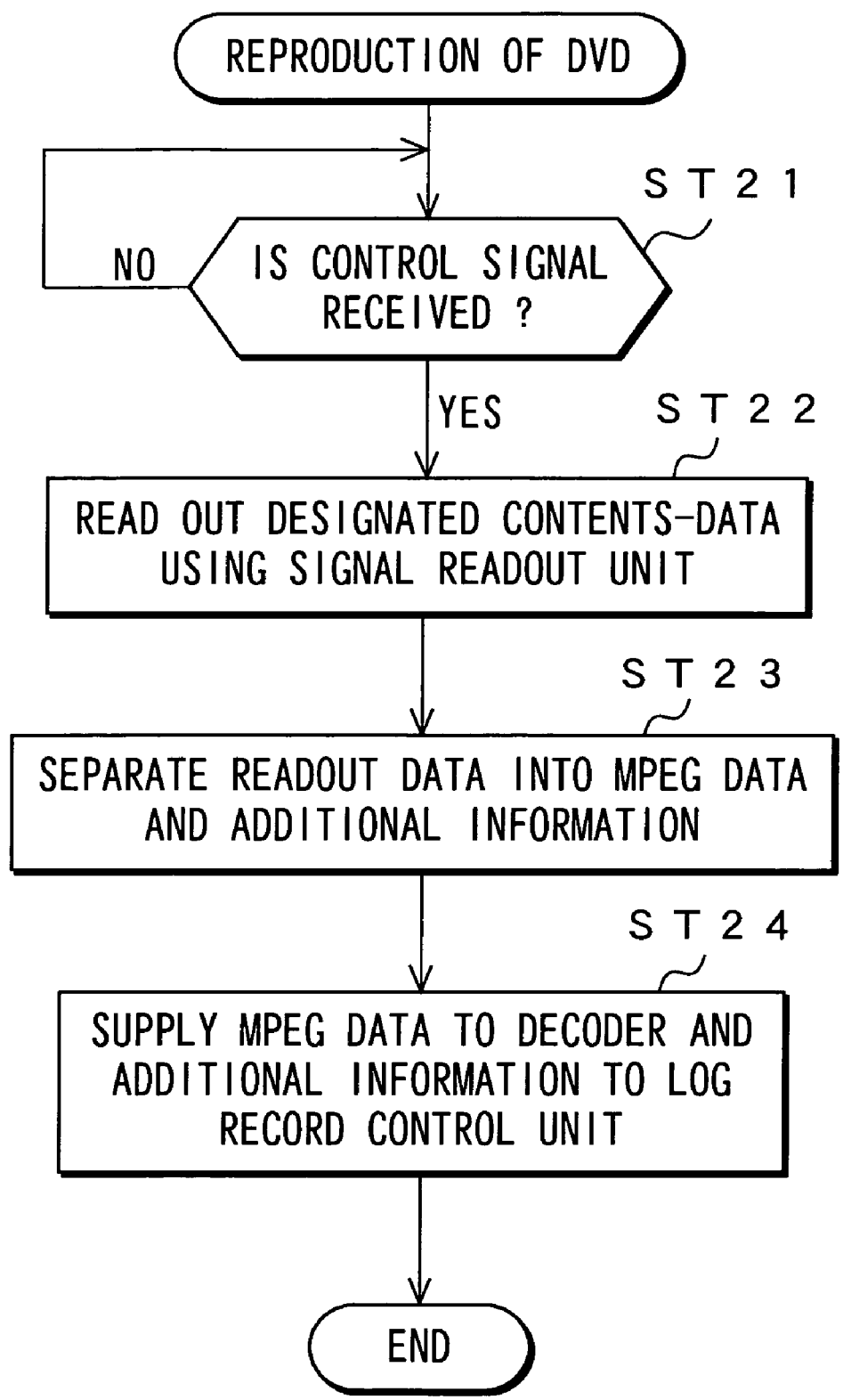
FIG. 33 is a flowchart illustrating operations of playback control unit in reproducing a DVD.

FIG. 33 is a flowchart showing operations of the reproduction control unit 532 (FIG. 29) during reproduction of DVD program. As a control signal instructing the reproduction is supplied from the control unit 501 at step ST21, the DVD reproduction unit 531 is activated to read the data of designated contents therefrom through the signal readout unit 611 at step ST22.

Then, at step ST23, the read data is separated into the MPEG data, MPDc and the additional information AI3 in the separation unit 612, and then, at step ST24, the MPEG data MPDc is supplied to MPEG decoder 527, while the additional information AI3 is supplied to the log record control unit 542.

As described above, the log record control unit 542 is supplied with the additional information AI1, AI2, and AI3 from the YC separation control unit 512, the record control unit 525, and the reproduction control unit 532, respectively. The log record control unit 542 (see FIG. 30) corrects the information on the frequency distribution of titles, performers' names, and genres, every time it receives respective additional information AI1-AI3, and stores corrected or new information on the frequency distribution in the circuit board bay memory 541.

Figure 34:
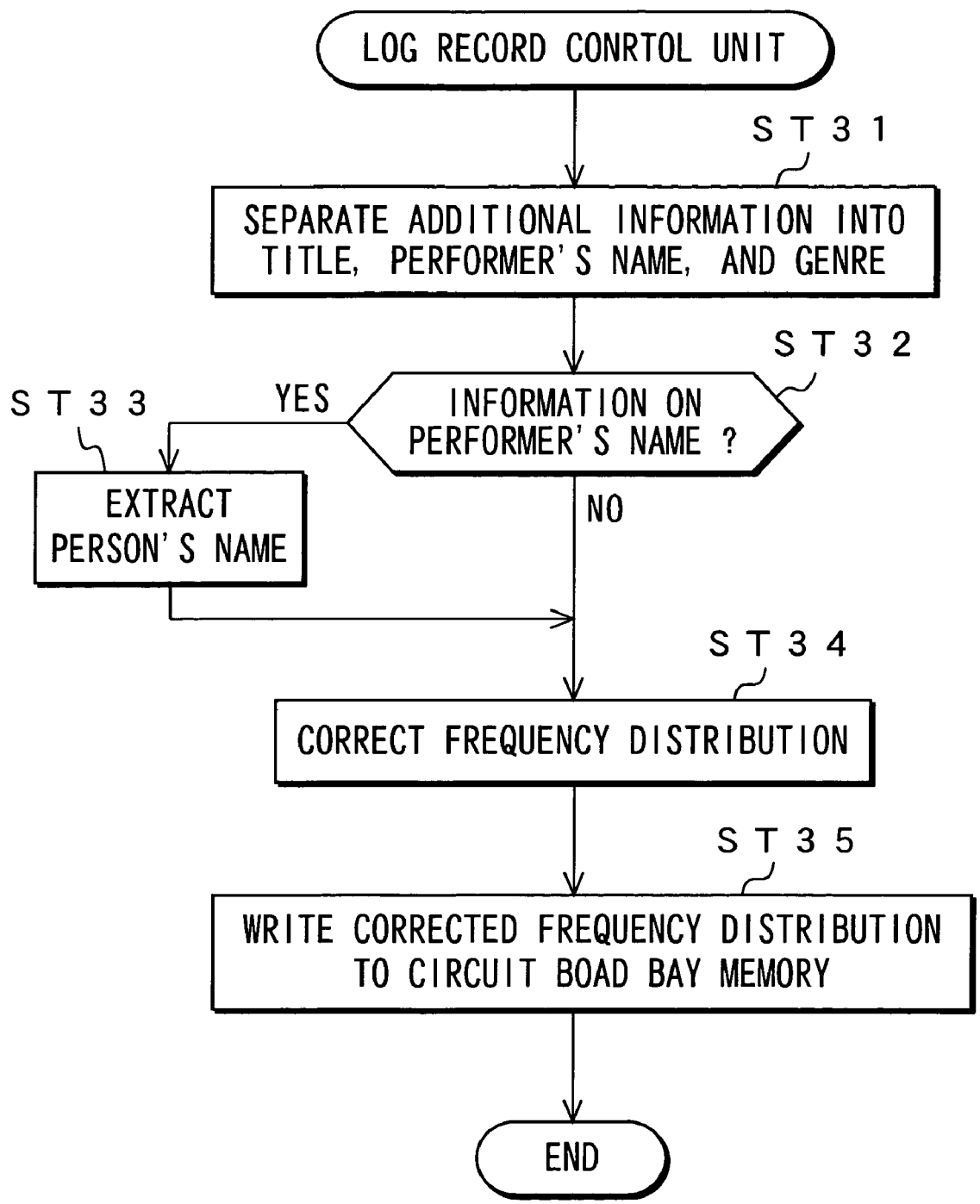
FIG. 34 is a flowchart illustrating operations of the log record control unit.

FIG. 34 is a flowchart showing operations of the log record control unit 542. At step ST31, the additional information is separated into information on title, performer's name, and genre in the separation unit 621. If it is found at step ST32 that the separated information is the information on performer's name, then at the next step ST33, the information on individual person's names contained in the separated information on performer's name is extracted. The procedure then proceeds to step ST34. If at step ST32, the separated information is not the information on performer's name, the procedure immediately proceeds to step ST34.

At step ST34, respective frequency distributions of titles, names of people, and genres are formed. In this case, the record reproduction unit 623 corrects each of the pieces of frequency distribution information read out of the circuit board bay memory 541 in such a way that the frequencies of the title, performer's name, and genre that correspond to the information on the title, performer's name, and genre separated by the separation unit 621 are increased.

At step ST35, the corrected information on respective frequency distributions is written in the circuit board bay memory 541 using the record reproduction unit 623. Thus, the information on the respective frequency distributions stored in the circuit board bay memory 541 is updated in accord with the respectively corrected frequency distributions.

It should be noted that in the embodiment shown herein, corrections of the respective frequency distributions of titles, names of people, and genres are not made by simply incrementing the respective frequencies of the title, performer's name, and genre separated by the separation unit 621 by 1, but instead, the frequencies are weighted by certain weights. Information on this weighting is also supplied from the control unit 501 to the log record control unit 542 via an information supply line (not shown).

A procedure of weighting incremental frequencies in title, performer's name, and genre will now be described in connection with the correction of the additional information supplied to the log record control unit 542 during viewing a program.

Figure 35:
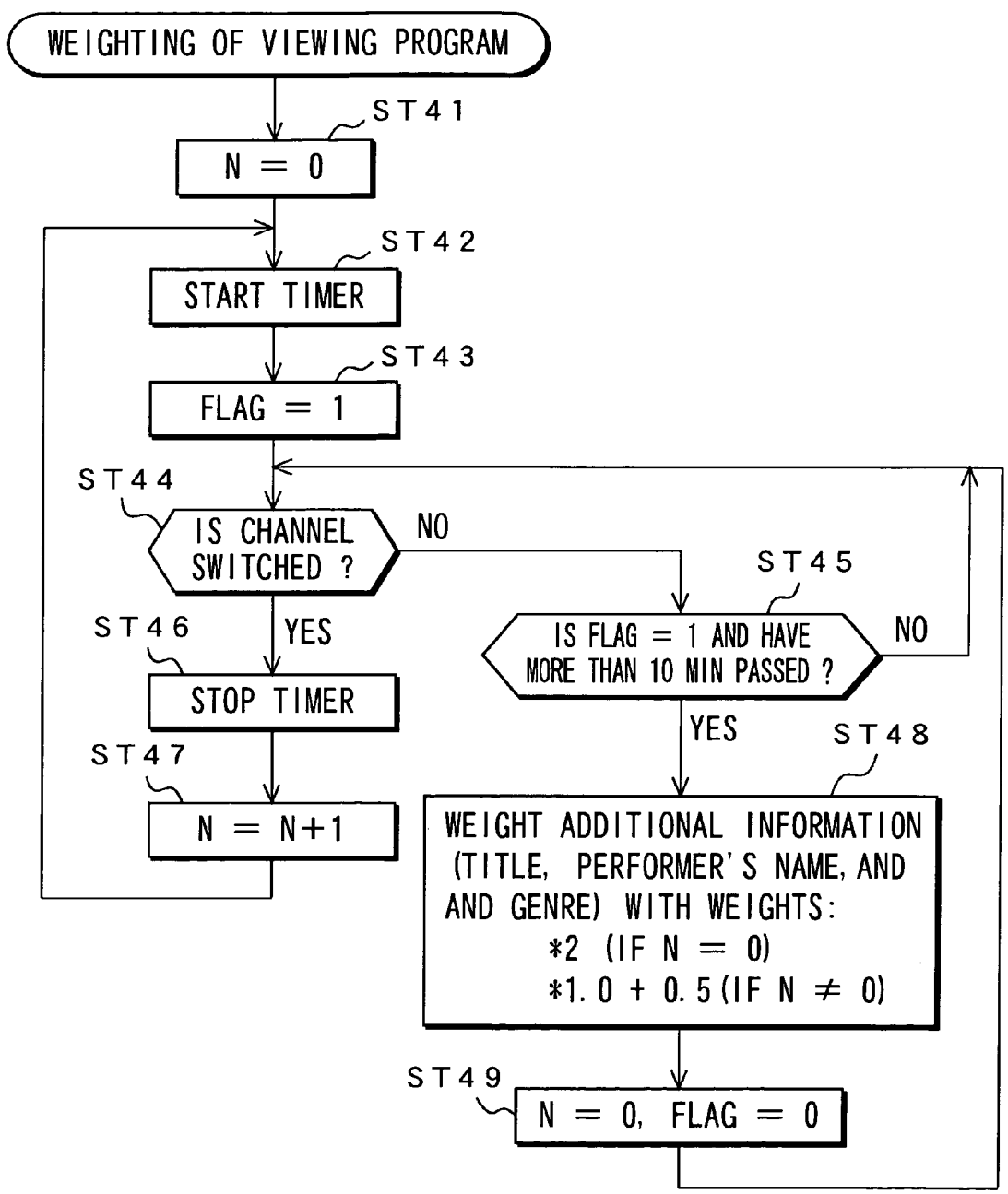
FIG. 35 is a flowchart illustrating processing for weighting during receiving a program.

FIG. 35 is a flowchart showing a procedure of weighting performed by the control unit 501, during viewing a program.

First, count N is initialized to 0 at step ST41. Then, at step ST42, a timer is started. At the next step ST43, a flag is set to 1.

Next, a decision is made whether the channel has been switched or not at step ST44. If the channel has not been switched, then at step ST45, a query is made whether more than 10 minutes have passed with the flag being 1. If, at step ST44, the channel has been switched, then timer is stopped at step ST46. At the next step ST47, the count N is incremented before the procedure returns to step ST42.

If a condition is satisfied at step ST45, the procedure proceeds to step ST48, where the title, performer's name, and genre constituting the additional information of the running program are weighted as follow. When N=0, weight is set to 2.0. On the other hand, if N≠0, weight is set to (1.0+0.5/N).

Next, N is initialized to 0, and flag is set to 0 at step ST49, and the procedure returns to step ST44 to repeat the same processing as described above.

In this way, in the weighting depicted in the flowchart shown in FIG. 35, if the channel has not been changed for 10 minutes, incremental frequencies in title, performer's name, and genre of the currently viewing program based on the additional information are weighted by a weight that depends on the total times (count N) of channel switching prior to the current subscription of the program. In this case, a program switched less frequently is weighted with a larger weight. This is because a program less frequently switched is supposed to be more important to the user. It should be understood, however, that the weight is not limited to the value as described above, but it may be determined based on another formula.

Weighting of incremented frequencies of titles, performers' names, and genres using when correcting the frequency distribution in title, performer's name, and genre made in association with the additional information to be supplied to the log record control unit 542 at the time of scheduling recording, will now be described.

Figure 36:
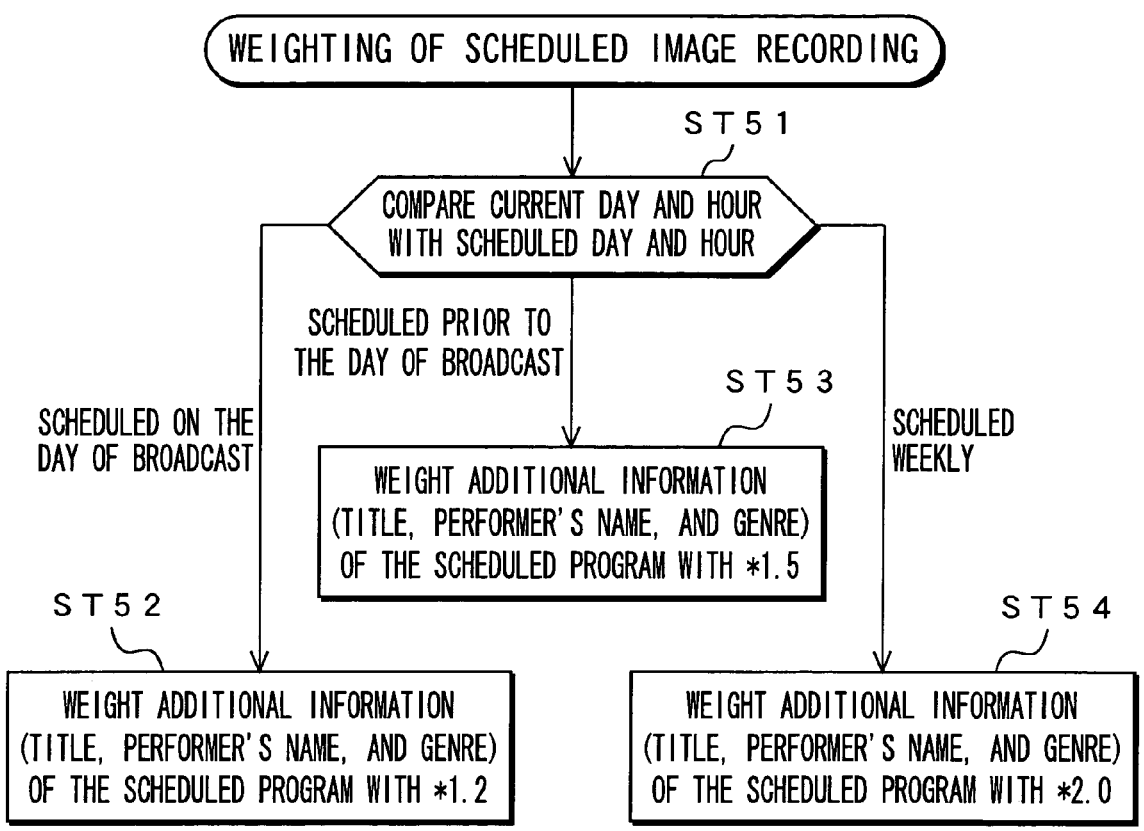
FIG. 36 is a flowchart illustrating processing for weighting of a scheduled recording.

FIG. 36 is a flowchart showing a procedure of weighting performed by the control unit 501 at the time of scheduling recording.

First, current date and time are compared with the date and time of scheduled recording at step ST51. If the recording is scheduled on the same day, weight of incremented frequencies of the title, performer's name, and genre relevant to the additional information associate with the scheduled program is set to 1.2 at step ST52. If the schedule is made prior to the day of broadcast (excluding a case of weekly scheduling), weight is set to 1.5 at step ST53. If the programming of a schedule is a part of weekly scheduling, weight is set to 2.0 at step ST54.

In this way, in the weighting scheme of the flowchart shown in FIG. 36, weight is set based on the relationship between the current date and scheduled date. In the example shown herein, a larger weight is imposed on a schedule before the day of broadcast and on a weekly schedule, as compared with a schedule on the day of broadcast. This is based on the assumption that the programs that have been put in the scheduled recording ahead of the day of broadcast and put in a weekly recording schedule would be more importance for the user, as compared with programs put in the schedule on the day. Incidentally, values of the weight are not limited to the above values, any other value may be available.

Figure 37:
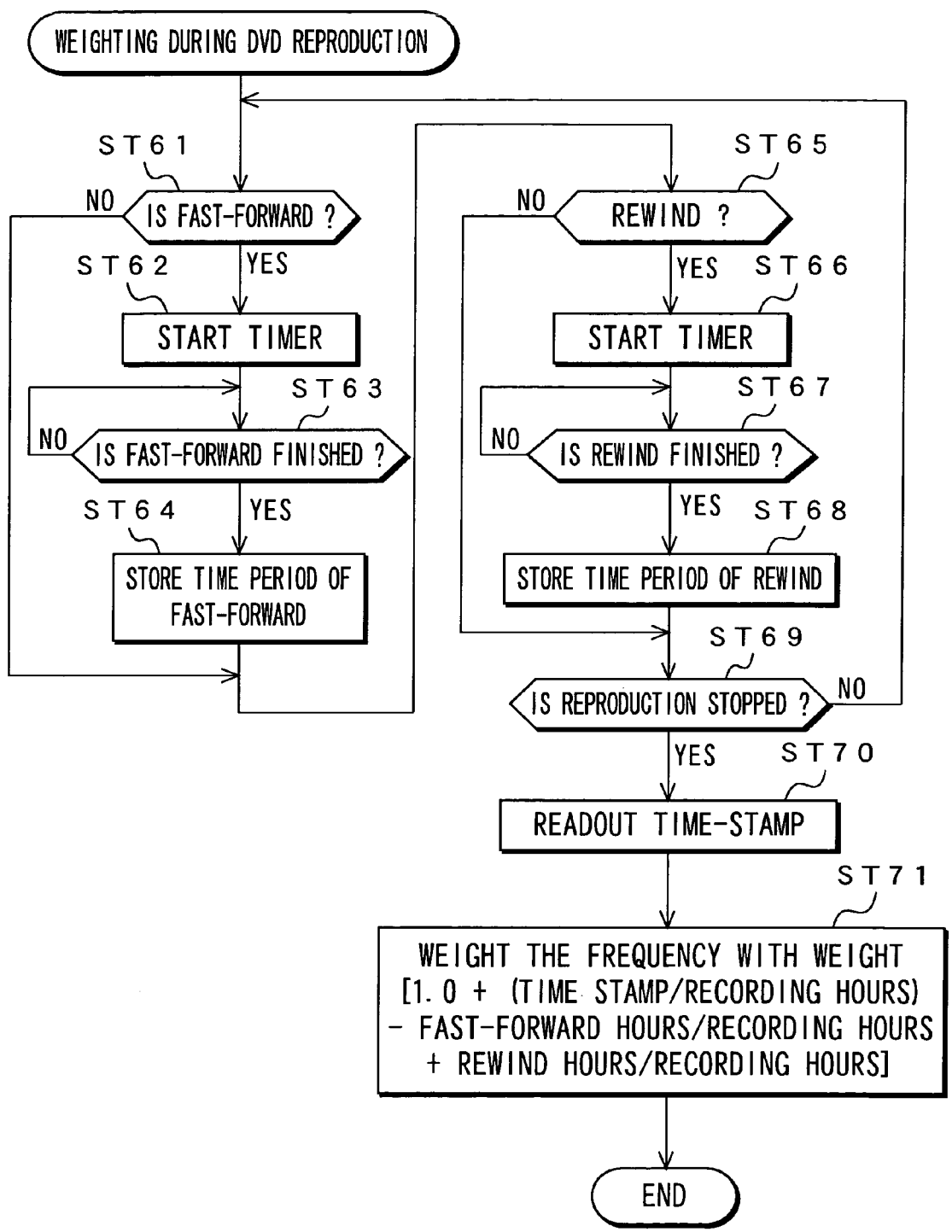
FIG. 37 is a flowchart illustrating processing for weighting of a reproducing a DVD.

A procedure of weighting incremental frequencies of title, performer's name, and genre when correcting the frequency distribution of title, performer's name, and genre in correspondence with the additional information supplied to the log record control unit 542 during reproduction of a DVD program will now be described FIG. 37 is a flowchart showing the procedure of weighting performed by control unit 501 during reproduction of predetermined contents (DVD reproduction) by the DVD reproduction unit 531.

First, it is determined at step ST61 whether the DVD reproduction unit 531 is in fast-forward status. If it is, the timer is started at step ST62 to count the period of fast-forward. At step ST63, it is determined whether DVD reproduction unit 531 has finished fast-forward and returned to the normal reproducing status. If it has, then at step ST64, the measured period of the fast-forward is stored in a built-in memory (not shown), and the procedure proceeds to step ST65. At step ST61 described above, if DVD reproduction unit 531 is not in fast-forward status, but still in reproduction status, then the procedure immediately proceeds to step ST65.

At step ST65, it is determined whether the DVD reproduction unit 531 is in rewind status. If it is, then the timer is started at step ST66 to measure the period of rewind. At step ST67, it is determined whether DVD reproduction unit 531 has finished the rewind and returned to a normal reproduction status. If it has returned to the reproduction status at step ST68, the period of rewind measured by the timer is stored in the built-in memory (not shown), and the procedure proceeds to the next step ST69. If it is found at step ST65 described above that the DVD reproduction unit 531 is not in rewind status, but in the reproduction status, the procedure proceeds to step ST69.

At step ST69, a determination is made as to whether reproduction has been stopped. If it has not, the procedure returns to step ST61 to repeat the same processing as described above. On the other hand, if the reproduction has been stopped, then at step ST70, the time-stamp (or a position in time at which the reproduction of a desired contents has been stopped) is read out, which is weighted with a weight below at step ST71.

In terms of recording hours of the contents under reproduction, time stamp, total hours of fast-forward, and total hours of rewind, the weight is set to:

[1.0+(time stamp/recording hours)−fast-forward
        hours/recording hours+rewind hours/recording
        hours].

In this way, in the weighting as depicted in the flowchart shown in FIG. 37, weighting is based on the time for fast-forward and the time for rewind executed during reproduction thereof. In this case, a program associated with a shorter fast-forward and a longer rewind has a larger weight. This is based on the assumption that portions of a program fast-forwarded for a shorter period and portions rewound for a longer period have a greater importance to the user. It will be apparent that the weights in the weighting are not limited to the examples above. Weights can be determined based on other formulas.

The signal receiving device 500 shown in FIG. 27 has an automated recording function for recording a programs in an on frequency distribution of title, performer's names, and genre stored in the circuit board bay memory 541 as described above. This automated image recording function consists of automated image recording setting function and automated image recording executing function.

Figure 38:
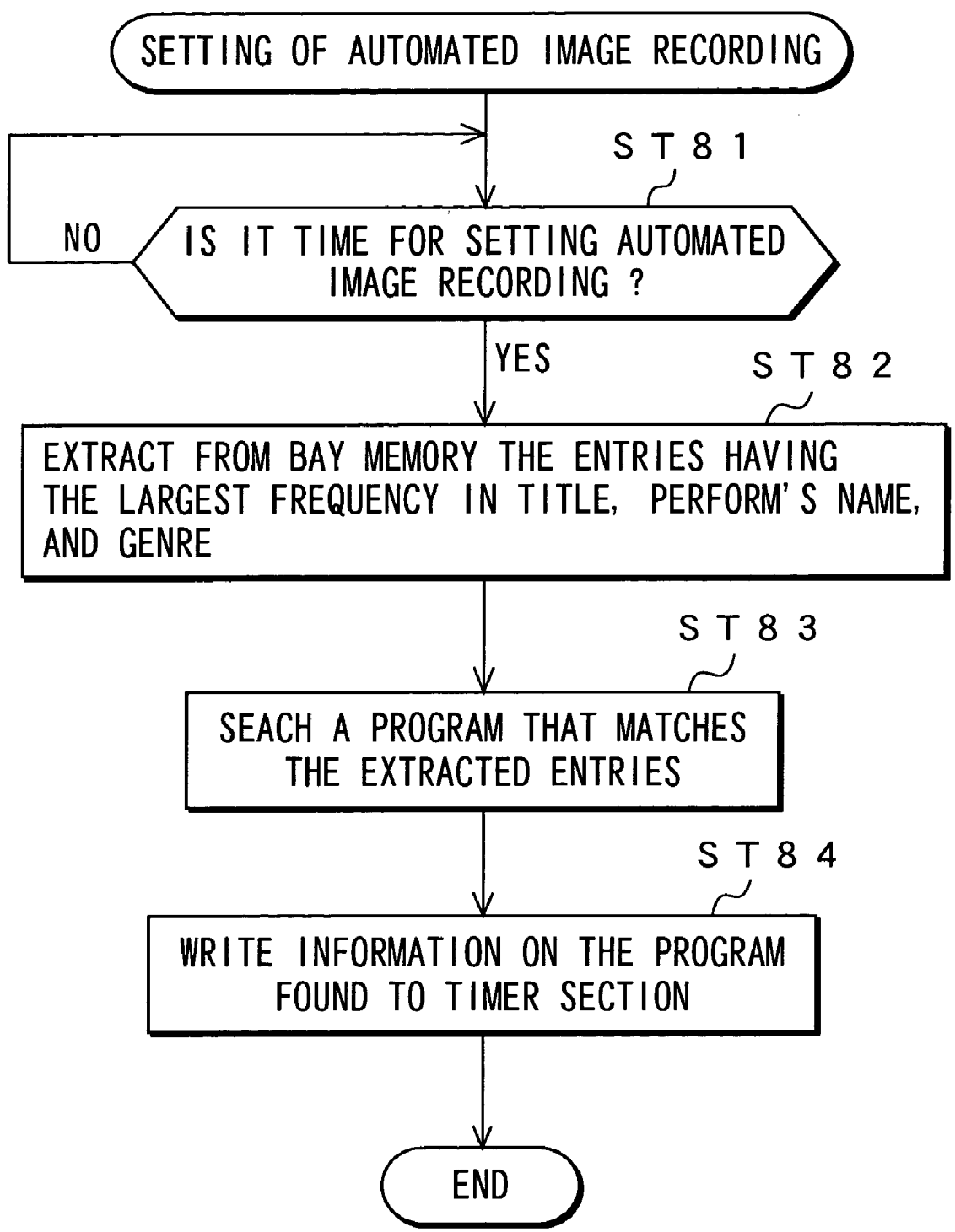
FIG. 38 is a flowchart illustrating the operations of an automatic picture recording setting.

FIG. 38 is a flowchart showing a procedure of automated recording setting in the control unit 501. The user may manually start and end the automated recording setting operation by operating console 503.

At step ST81, a determination is made as to whether it is the time to start the automated image recording setting. For example, the user can set the time of the automated image recording beforehand at a particular time of a day. Then at step ST82, at the time to start the automated image recording setting, the most frequent entries in title, performer's name, and genre are extracted, via the reproduction control unit 526, from the information on frequency distribution of title, performer's name, and genre stored in the circuit board bay memory 541.

In the next step ST83, from the information on program table stored in the HDD 524 is searched, via the reproduction control unit 526, a program matching the extracted entries in title, performer's name, and genre. It is noted here that "matching program" includes not only the program that perfectly matches the extracted entries but also the program that matches the extracted entries in part. At step ST84, the information on the searched program is stored in a memory of the timer unit 502.

If, at step ST83, no program matching the extracted entries in title, performer's name, and genre is found, then no information on the program is written to the memory of timer unit 502 at step ST84.

FIG. 39 illustrates exemplary the information on frequency distribution of titles, performers' names, and genres stored in the circuit board bay memory 541. In this example, the most frequent genre of the listed items is "music", the most frequent performer's name of the similar entries is "Utada zz", and the most frequent title of the similar entries is "B music".

Hence, the title, performer's name, and genre extracted at step ST82 indicate to {B music, Utada zz, music}. Thus, at step ST83, a program is looked for that matches these extracted items. The information on the program thus searched is written to the timer unit, at step ST84. FIG. 40 is a list showing the information on the program searched. Of the entries of this information, only the date and hour and the channel of broadcast are written to the timer unit 502.

Although only the most frequent entries are extracted at step ST82 above, entries having the largest frequency through n-th largest frequencies can be included in the extraction, with n being an integer. In this case, programs that match the entries of the first through n-th ranked frequencies are looked for at step ST83. For example, regarding each of the extracted entries in title, performer's name, and genre, the matching program can be defined as program that contains any one of the entries of the first through the n-th ranked frequencies.

Figure 41:
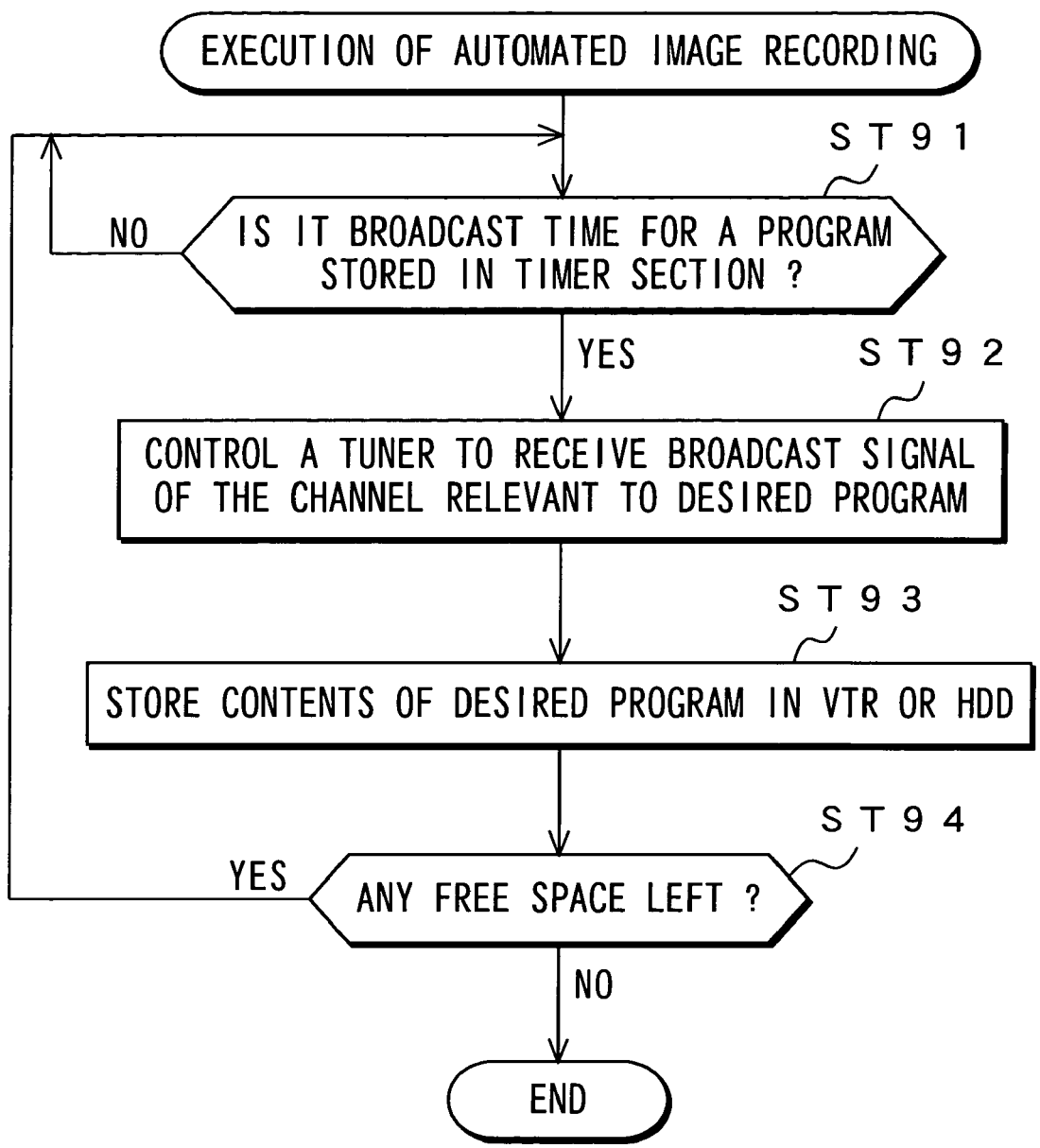
FIG. 41 is a flowchart illustrating operations involved in automated picture recording.

FIG. 41 is a flowchart showing a procedure of automated image recording executing in the control unit 501. The user may manually start and end the automated image recording executing by operating the console 503.

At step ST91, a determination is made as to whether it is the broadcast time for the program associated with the program information (i.e. information on date, hour of broadcast, and channel) stored in the timer unit 502. If it is, then at step ST92, either the analog tuning unit 506 or the digital tuning unit 521 is activated to receive a broadcast signal of the designated channel relevant to a desired program. At the next step ST93, the record control unit 510 or the record control unit 525 is controlled to record the image signal or MPEG data of the desired program in the VTR 509 or the HDD 524

Next, at step ST94, a determination is made as to whether a sufficient memory space is left free in the VTR 509 or the HDD 524 for storing the contents of another programs (i.e. image signal or MPEG data) associated with the information on another program stored in the timer unit 502. If a sufficient memory space is left, the procedure returns to step STS91, and proceeds to a further processing of information of another program stored in the timer unit 502. On the other hand, if a sufficient memory space is not left, the automated image recording executing program is terminated.

The signal receiving device 500 shown in FIG. 27 has a further function that it can recommend programs to the user in accordance with the user's taste, using information on frequency distribution of title, genre, performer's name, and genre stored in the circuit board bay memory 541 as described above.

Figure 42:
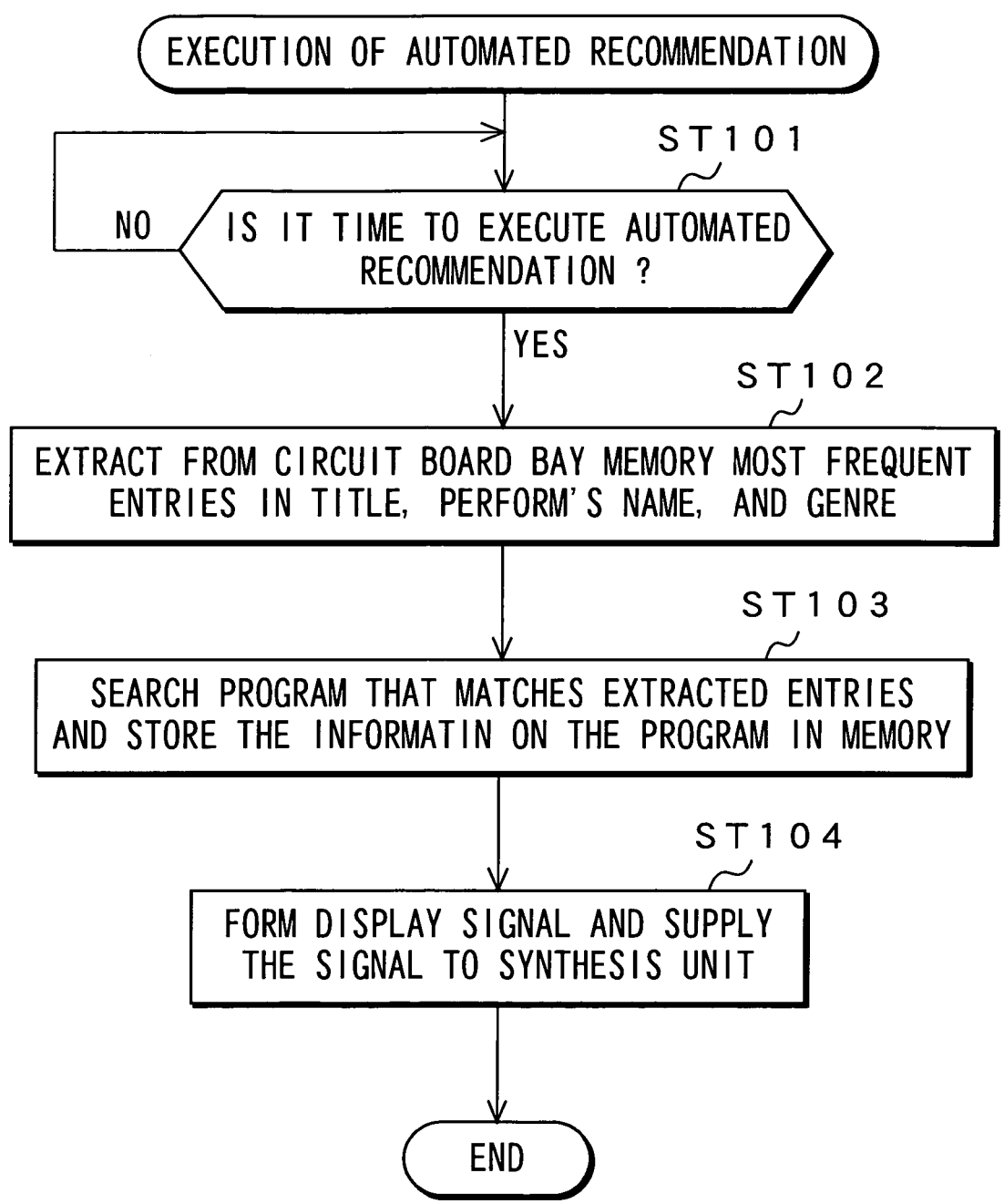
FIG. 42 is a flowchart illustrating operations for executing automatic program recommendation.

FIG. 42 is a flowchart showing an automated recommendation executing procedure performed in the control unit 501. The user can also manually start and end this automated recommendation executing procedure by operating the console 50.

At step ST101, a determination is made whether it is the time to start the automated recommendation executing procedure. For example, the user can set the time of executing this automated recommendation executing procedure beforehand at a predetermined time of a day. At step ST102, at the time of executing this automated recommendation executing procedure, the contents associated with the most frequent title, performer's name, and genre is extracted out of the information on frequency distribution of titles, performers' names, and genres stored in the circuit board bay memory 541, via the reproduction control unit 526.

Next, at step ST103, a matching program matching the above-mentioned extracted title, performer's name, and genre is searched in the program table data stored in the HDD 524 via the reproduction control unit 526, and then, information on the searched program is temporarily stored in built-in memory (not shown) (see FIG. 40). It is noted that "matching program" includes not only program that matches all the entries in title, performer's name, and genre items, but also program that partly match them.

Next, at step ST104, a display signal SCH is formed to display the information on the searched program, and then, the signal SCH is supplied to the synthesis units 513 and 533 via the reproduction control unit 526. Thus, the information on the recommended program is displayed on a display element (not shown) such as CRT and LCD to which the output of the synthesis units 513 and 533 is supplied.

If, at step ST103, no program is found that matches the extracted entries in title, performer's name, and genre, then a display signal SCH indicative of the information on the recommended program is not formed and synthesized signal is not supplied to the synthesis units 513 and 533 at step ST144, so that no information on the recommended program is displayed on a display element such as CRT and LCD.

Alternatively, a display signal SCH indicating that no recommended program exists can be formed and supplied to the synthesis units 513 and 533, to thereby display a sign on a display element such as CRT indicating that there exists no recommended program.

Although only the most frequent entries are extracted at step ST102 above, the entries of the first through n-th ranked frequencies can be included in the extraction. In this case, programs that match the entries of the first through n-th ranked frequencies are looked for at step ST103. For example, regarding each of the entries in title, performer's name, and genre items, the matching program can be defined as program that contains any one of the entries of the first through the n-th ranked frequencies.

Incidentally, the circuit board bay memory 541 of the signal receiving device 500 shown in FIG. 27 may store other information on frequency distribution written to a circuit board bay memory of another similar receiver (the bay memory referred to as other circuit board bay memory), in addition to the information on frequency distribution written in the log record control unit 542.

Figure 43:
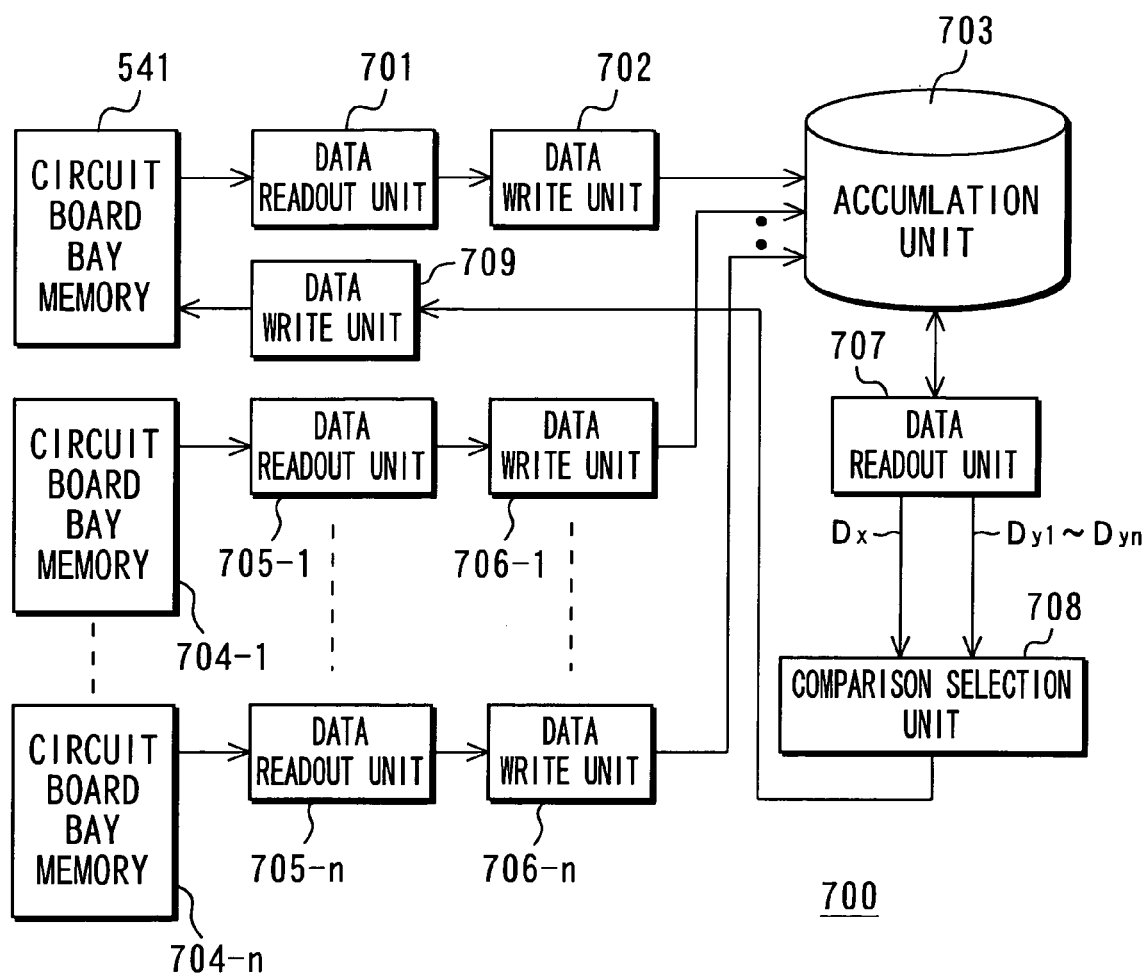
FIG. 43 is a block diagram showing a configuration of a data-collecting device within the bay memory in the substrate.

FIG. 43 shows a data collection unit 700 for the circuit board bay memory 541 in use for storing such other information on frequency distribution, as described above, in the circuit board bay memory.

This data collection unit 700 has data readout unit 701 for reading out of the circuit board bay memory 541 the information on frequency distribution of titles, performers' names, and genres, and data write unit 702 for writing in accumulation unit 703 the information on frequency distribution read out of the data readout unit 701. The information on frequency distribution stored in the circuit board bay memory 541 is managed in accordance with production number x of the circuit board of the circuit board bay memory 541.

The data collection unit 700 also has data readout units $705_{-1}$-$705_{-n}$ for reading out information on frequency distribution of titles, performers' names, and genres from other circuit board bay memories $704_{-1}$-$704_{-n}$, and data write units $706_{-1}$-$706_{-n}$ for writing in the accumulation unit 703 the information on frequency distribution read out of the respective data read units $705_{-1}$-$705_{-n}$. The information on frequency distribution received from other circuit board bay memories $704_{-1}$-$704_{-n}$ is managed in accordance with the production number $y_1$-$y_n$ of the circuit board of said other circuit board bay memories $704_{-1}$-$704_{-n}$.

The data collection unit 700 also has data readout unit 707 for repeatedly reading out the information Dx on frequency distribution of the production number x written in the accumulation unit 703 and supplying it to the comparison selection unit 708 described later, sequentially reading out the information $Dy_1$-$Dy_n$ on frequency distribution of the production numbers $y_1$-$y_n$ written in the accumulation unit 703, in response to the respective readout of the information Dx on frequency distribution of the production number x every time, and supplying the information $Dy_1$-$Dy_n$ to the comparison selection unit 708.

Data collection unit 700 also has the comparison selection unit 708 for calculating the matching degrees of the respective information $Dy_1$-$Dy_n$ on frequency distribution of the production numbers y1-yn supplied from the data readout unit 707 with information Dx on frequency distribution of the production number x supplied from data readout unit 707, and for obtaining the information on the frequency distribution having the largest degree of matching from the information $Dy_1$-$Dy_n$ on frequency distribution of the production numbers y1-yn, and data write unit 709 for writing the information on the frequency distribution obtained in the comparison selection unit 708 to the circuit board bay memory 541 as the information on another frequency distribution.

Figure 44:
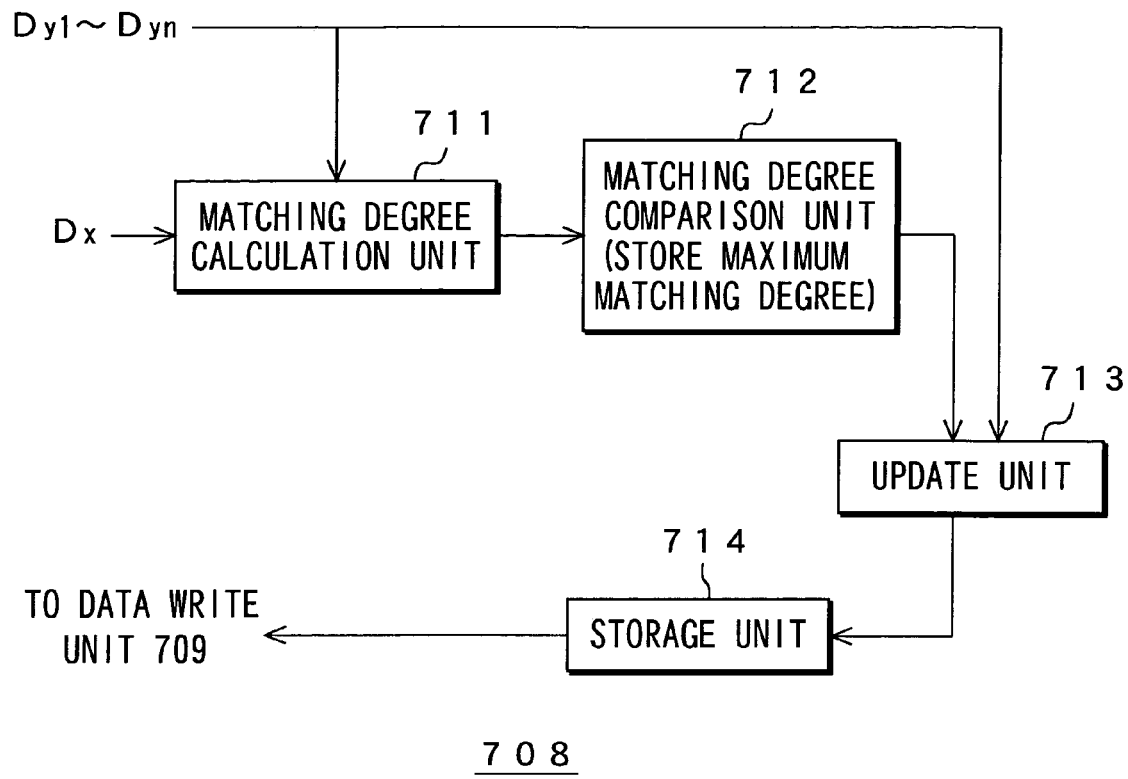
FIG. 44 is a block diagram showing a configuration of a comparison-selection device.

FIG. 44 shows a configuration of the comparison selection unit 708. This comparison selection unit 708 has matching degree calculation unit 711 for calculating the matching degrees of the respective information $Dy_1$-$Dy_n$ on frequency distribution of the production numbers $y_1$-$y_n$ with information Dx on frequency distribution of the respective production number x.

In the matching degree calculation unit 711, matching degrees of title, performer's name, and genre with the information on the respective frequency distributions are individually calculated, which are then merged together to obtain a final matching degree.

Here, a matching degree is obtained by first normalizing the respective information on frequency distribution to be calculated by the maximum and minimum frequencies thereof and then calculating correlation therebetween.

For example, to obtain the matching degree of a given genre, suppose that post-normalization frequencies of entries K1, K2, K3, K4, and K5 are respectively $a_1$, $a_2$, $a_3$, $a_4$, and $a_5$ in one frequency distribution, and $b_1$, $b_2$, $b_3$, $b_4$, and $b_5$ in the other frequency distribution. Matching degree MCH is obtained as $$MCH = a_1 \cdot b_1 + a_2 \cdot b_2 + a_3 \cdot b_3 + a_4 \cdot b_4 + a_5 \cdot b_5.$$

Matching degrees of the frequency distributions of title and performer's name can be obtained in similar manners.

The comparison selection unit 708 has matching degree comparison unit 712 adapted to receive calculated matching degrees from the matching degree calculation unit 711 in sequence and stores the maximum matching degree thereof. In this case, the matching degree comparison unit 712 is sequentially supplied with the matching degree calculated in connection with the respective information $Dy_1$-$Dy_n$ on frequency distribution of the production numbers $y_1$-$y_n$. The matching degree comparison unit 712 stores the first supplied matching degree as it is as maximum matching degree. It, however, compare matching degree that is supplied thereafter with the maximum matching degree stored. When the supplied matching degree is more than the stored maximum matching degree, it stores the supplied matching degree as the maximum matching degree.

Thus, of the matching degrees calculated for the respective information $Dy_1$-$Dy_n$ on frequency distribution of the production numbers $y_1$-$y_n$, the matching degree comparison unit 712 finally stores the maximum matching degree.

The comparison selection unit 708 also has update unit 713 for overwriting to storage unit 714 the information on frequency distribution associated with the maximum matching degree every time the matching degree comparison unit 712 stores the supplied matching degree as the maximum matching degree. Thus, of the information $Dy_1$-$Dy_n$ on frequency distribution of the production numbers $y_1$-$y_n$, the information on frequency distribution that provides the maximum matching degree is finally stored in the storage unit 714. The final information on frequency distribution stored in the storage unit 714 is written to the circuit board bay memory 541 by the data write unit 709 (see FIG. 43) as other information on frequency distribution.

Referring to FIG. 43, operations of the data collection unit 700 will now be described.

Information Dx on frequency distribution of the production number x is read out of the circuit board bay memory 541 by the data readout unit 701, and the information Dx is written in the accumulation unit 703 by the data write unit 702. Further, the information $Dy_1$-$Dy_n$ on frequency distribution of the production numbers $y_1$-$y_n$ is read out of other bay memories $704_{-1}$-$704_{-n}$ by the data readout units $705_{-1}$-$705_{-n}$, and the information $Dy_1$-$Dy_n$ is written in the accumulation unit 703 by the data write units $706_{-1}$-$706_{-n}$.

The information Dx on frequency distribution of the production number x written in the accumulation unit 703 is read out thereof by the data readout unit 707 and supplied to the comparison selection unit 708. The information Dy1-Dyn on frequency distribution of the production numbers y1-yn written in the accumulation unit 703 is sequentially read out by the data readout unit 707, in correspondence with a respective readout of information Dx on the production number x, and supplied to the comparison selection unit 708.

In the comparison selection unit 708, matching degrees of the respective information Dy1-Dyn on frequency distribution of the production numbers y1-yn supplied from the data readout unit 707 with information Dx on frequency distribution of the production number x supplied from the data readout unit 707 are calculated to obtain, from the information Dy1-Dyn on frequency distribution of the production numbers y1-yn, the information (hereinafter referred to as information Dy on frequency distribution of the production number y) on frequency distribution that leads to the maximum matching degree.

Then, the information Dy on frequency distribution of the production number y obtained in the comparison selection unit 708 is written to the circuit board bay memory 541 by the data write unit 709. Therefore, the circuit board bay memory 541 stores the information Dy on frequency distribution of the production number y along with the information Dx on frequency distribution of the production number x.

In the example shown above, the data collection unit 700 has been described as writing the information Dy on frequency distribution of the production number y to the circuit board bay memory 541 to which the information Dx on frequency distribution of the production number x has been written. It will be apparent, however, that the information Dx and Dy on frequency distribution of the production numbers x and y, respectively, can be written in separate circuit board bay memories, which bay memories may be collectively referred to as the circuit board bay memory 541.

When the information Dy on frequency distribution of the production number y is stored in the circuit board bay memory 541 in addition to the information Dx on frequency distribution of the production number x, as described above, operations of automated image recording setting procedure and automated image recording executing procedure associated with foregoing automated image recording function in the signal receiving device 500 shown in FIG. 27, will be carried out as follows.

FIG. 45 is a flowchart showing the operations of automated image recording setting procedure performed in the control unit 501. The user may manually start and end the automated image recording setting procedure by operating the console 503.

At step ST111, a determination is made as to whether it is the time to set the automated image recording. For example, the user can set the automated image recording beforehand to start at a particular time of a day. Then at step ST112, at the automated image recording setting time, most frequent entries Tx in title, performer's name, and genre are extracted, by the reproduction control unit 526, from the information Dx, stored in the circuit board bay memory 541, on the respective frequency distributions of title, performer's name, and genre associated with the production number x.

Further, at step ST112, the most frequent entries Ty in title, performer's name, and genre are extracted from the information Dy on the frequency distributions of the title, performer's name, and genre associated with the above-mentioned production number y, excluding those entries which are not included in the information Dx on the frequency distributions of the title, performer's name, and genre associated with the production number x.

Figure 46:
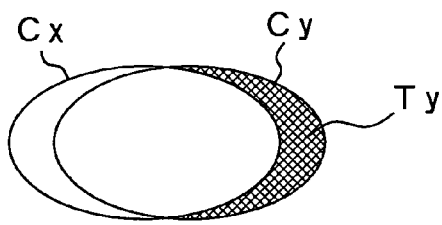
FIG. 46 is an illustration for illustrating a selectable domain for item Ty.

FIG. 46 is a pictorial illustration of a selectable range of an entry Ty. In the example shown herein, an ellipse Cx is the range of entries included in information Dx on frequency distributions, and an ellipse Cy is the range of entries included in information Dy on frequency distributions. Above described entries Ty are extracted from the range (cross-hatched section) of entries that are included only in the information Dy on frequency distributions.

In the next step ST113, the program table stored in the HDD 524 is sought via the reproduction control unit 526 for a program that matches the respective extracted entries Tx, Ty in title, performer's name, and genre. It is noted here that "matching program" includes not only the program that perfectly matches the extracted entries but also those that match the extracted entries in part. At step ST114, the information on the program found (information on date and hour of broadcast, and channel) is stored in a memory of the timer unit 502.

If, at step ST113, no program that matches the extracted entries in title, performer's name, and genre is found, then no information is written to the memory of the timer unit 502 at step ST114. Although only the most frequent entries Tx and Ty are extracted at step ST112 above, entries of the first through n-th ranked frequencies can be included in the extraction.

In this case, programs that match the entries of the first through n-th ranked frequencies are looked for at step ST113. For example, matching program can be defined as program that contains any one of the entries of the first through the n-th ranked frequencies.

Figure 47:
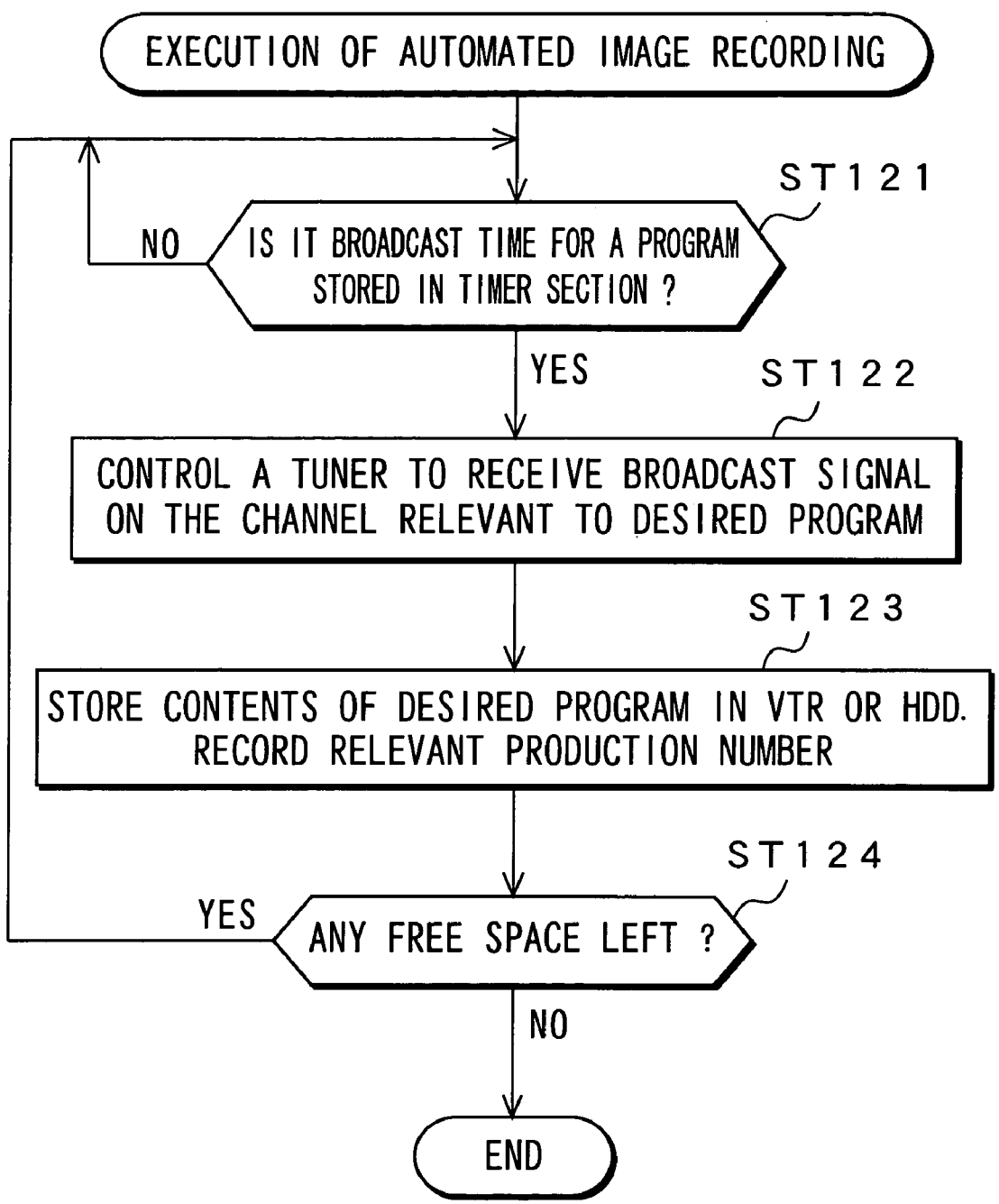
FIG. 47 is a flowchart illustrating operations for executing automatic picture recording.

FIG. 47 is a flowchart showing operations of automated image recording executing procedure in the control unit 501. The user may manually start and end the operation of automated image recording executing procedure by operating the console 503.

At step ST121, a determination is made as to whether it is the broadcast time for the program associated with the program information (information on date and hour of broadcast, and channel) stored in the timer unit 502. If it is, then at step ST122, either the analog tuning unit 506 or the digital tuning unit 521 are activated to receive a broadcast signal of the designated channel relative to the desired program. In the next step ST123, the record control unit 510 or the record control unit 525 is activated to record the image signal or MPEG data of the desired program in the VTR 509 or the HDD 524.

In recording the image signal or MPEG data in the VTR 509 or the HDD 524 as described above, a relevant production number is also recorded at the same time in association with the image signal or the MPEG data. That is, if the desired program is the one that matches the entries Tx described above, then the production number x is recorded, while if the desired program is the one that matches the entries Ty, then the production number y is recorded. In this case, if the image signal of the designated program is recorded in the VTR 509, the production number may be recorded in the memory installed in the VTR 509 or in the memory provided in a tape cassette in association with recording of the program. On the other hand, if MPEG data of the desired program is recorded on the HDD 524, the information on the production number appended to the MPEG data may be stored.

Next, at step ST124, a determination is made as to whether a sufficient memory space is left in the VTR 509 or the HDD 524 for storing the contents of the programs (i.e. image signal or MPEG data) associated with the information on another program and stored in the timer unit 502. If a sufficient memory space is left, the procedure returns to step ST121, and proceeds to a further processing of information of another program stored in the timer unit 502. On the other hand, if a sufficient memory space is not left, the operations of automated image recording executing procedure is forced to be terminated.

It will be recalled that in the signal receiving device 500 shown in FIG. 27, when a program having appended production number y as described above is reproduced from the VTR 509 or the HDD 524, the information Dy on the frequency distribution associated with the production number y is merged to the information Dx on frequency distribution of the production number x, which are stored in the circuit board bay memory 541.

Figure 48:
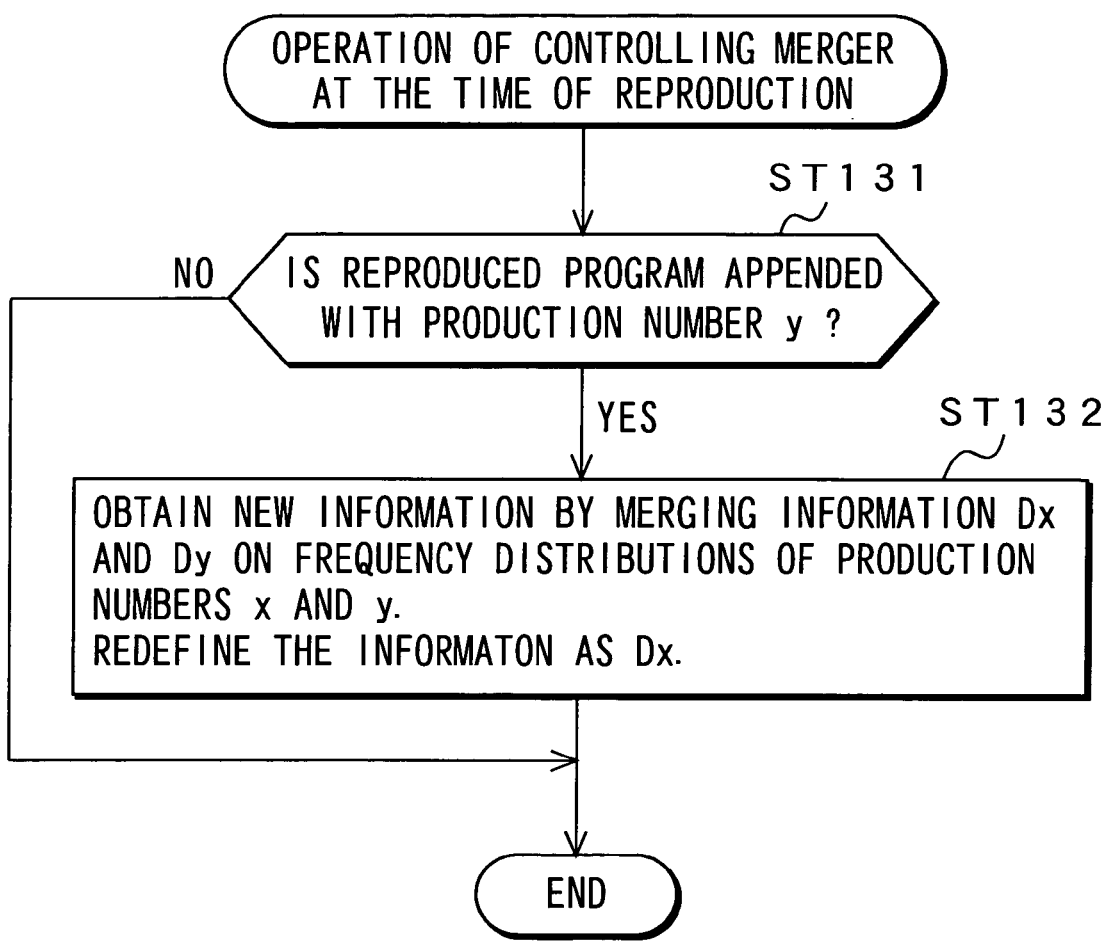
FIG. 48 is a flowchart illustrating operations for merger control in a playback.

FIG. 48 is a flowchart showing operations of controlling merger performed in the control unit 501 at the time of reproduction.

At step ST131, a determination is made as to whether the reproduced program is appended with the production number y. the control unit 501 may obtain information on the production numbers associated with a reproduced program via the reproduction control units 511 and 526. If the reproduced program is not appended with a production number y, then no merger is carried out, the operations of controlling merger is terminated.

On the other hand, if the reproduced program is appended with the production number y, then at step ST132, the circuit board bay memory 541 is controlled via the record control unit 525, so as to add up (or merge) the frequencies of the entries in the information Dx on frequency distribution of the production number x and the information Dy on frequency distribution of the production number y, and the information on the newly obtained frequency distribution is written in the circuit board bay memory 541 as the information Dx on frequency distribution of the product number x. Because of this merger, the circuit board bay memory 541 stores as the information on frequency distribution, only the information Dx on frequency distribution of the production number x alone.

The reason for merging the information Dx on frequency distribution of the product number x and information Dy on frequency distribution of the product number y in this way if a program appended with the product number y is reproduced, is that the program appended with the production number y is a program that matches entries Ty extracted from those entries that do exist in the information Dy on frequency distribution of the product number y but do not exist in the information Dx on frequency distribution of the product number x. Hence it is considered that the information Dy on frequency distribution of the product number y formed by other receivers is considered available.

With this merger of reproduction, information on frequency distribution suitable for user's taste can be quickly stored in the circuit board bay memory 541, thereby allowing the user to efficiently utilize the foregoing automated image recording function and automated recommendation function.

When the information Dy on frequency distribution of the production number y is stored in the circuit board bay memory 541 in addition to information Dx on frequency distribution of the production number x, operations of executing the automated recommendation in the signal receiving device 500 of FIG. 27 will be described as follows.

Figure 49:
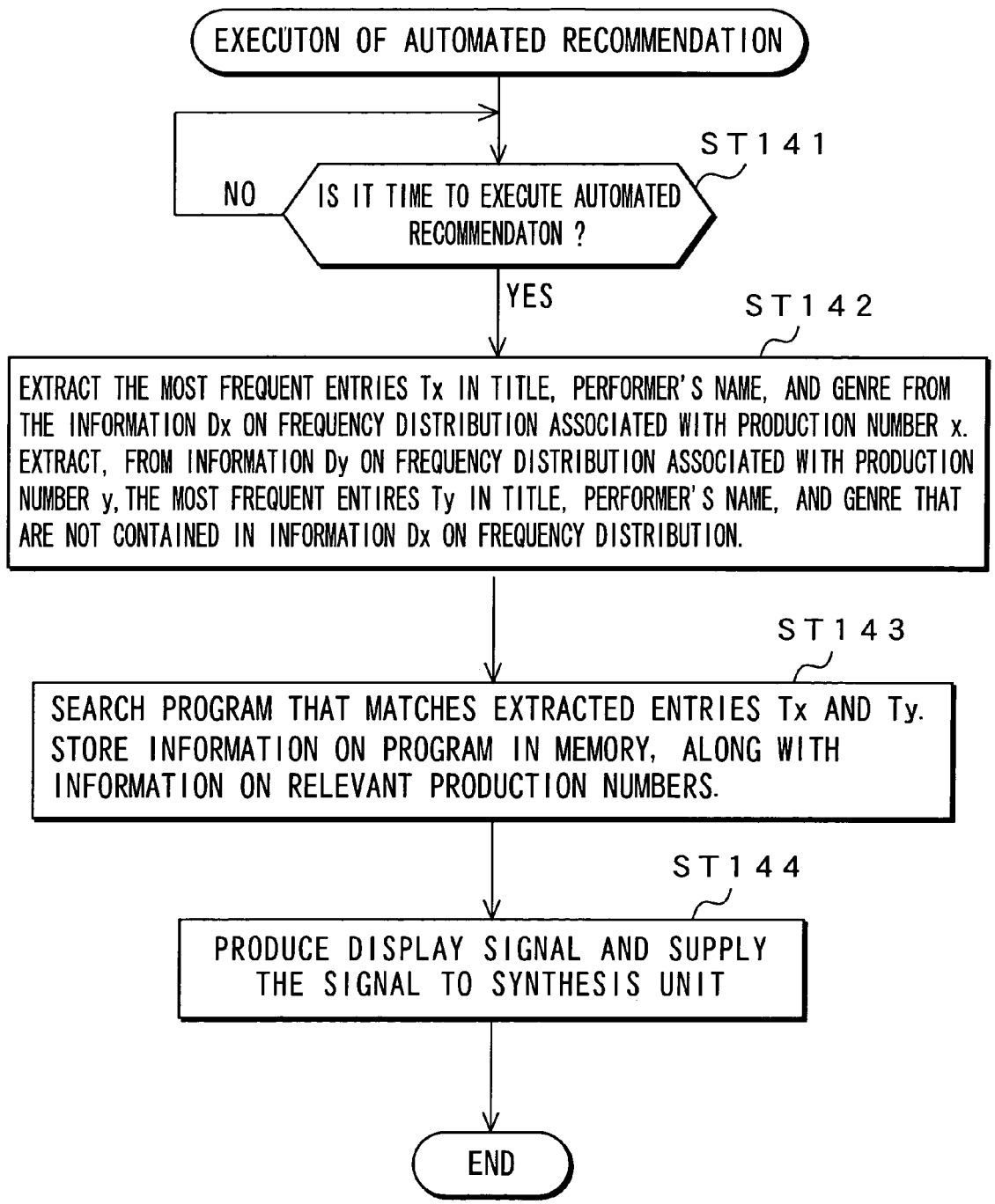
FIG. 49 is a flowchart illustrating operations for executing automatic program recommendation.

FIG. 49 is a flowchart showing operations of executing automated recommendation procedure performed in the control unit 501. The user may manually start and end the operations of executing automated recommendation procedure by operating the console 503.

At step ST141, a determination is made as to whether it is the time to execute the automated recommendation. For example, the user can set the time of execution of automated recommendation beforehand at a particular time of a day. Then at step ST142, as the time of execution comes, the most frequent entries Tx in title, performer's name, and genre are extracted, via the reproduction control unit 526, from the information Dx, stored in the circuit board bay memory 541, on the respective frequency distributions of title, performer's name, and genre associated with the product number x.

Further, at step ST112, the most frequent entries Ty in title, performer's name, and genre are extracted from the information Dy on the frequency distributions of title, performer's name, and genre associated with the above-mentioned production number y, excluding those entries which are not included in the information Dx on frequency distributions of title, performer's name, and genre associated with the production number x.

In the next step ST143, the program table stored in the HDD 524 is sought via the reproduction control unit 526 for a matching program that matches the respective extracted entries Tx, Ty in title, performer's name, and genre, and the information on the program found is temporarily stored in a memory (not shown) (see FIG. 40). It is noted here that "matching program" includes not only the program that perfectly matches the extracted entries but also those that match the extracted entries in part.

In recording the information on the program in the built-in memory, a relevant production number is also recorded at the same time in association with the information on the program. That is, if the program is the one that matches the entries Tx described above, then production number x is recorded, while if the program is the one that matches the entries Ty, then production number y is recorded.

Next, at step ST144, a display signal SCH for displaying the information on the program found is formed and then, the signal SCH is supplied to the synthesis units 513 and 533 via the reproduction control unit 526. Thus, the information on the program to be recommended is displayed on display elements (not shown) such as CRT and LCD.

If, at step ST143, no program is found that matches the extracted entries in title, performer's name, and genre, then a display signal SCH indicative of the information on the recommended program is not formed and synthesized signal is not supplied to the synthesis units 513 and 533 at step ST144, thereby displaying no information on recommended programs on a display element such as CRT and LCD.

Alternatively, a display signal SCH indicating that no recommended program exists can be formed and supplied to the synthesis units 513 and 533, to thereby display a sign on a display element such as CRT indicating that there exists no recommended program.

Although only the most frequent entries are extracted at step ST142 above, entries having the largest through n-th largest frequencies can be included in the extraction, with n being a predetermined rank. In this case, programs that match the entries of the largest through n-th ranked frequencies are looked for at step ST143. For example, matching program can be defined as program that contains any one of the entries of the largest through n-th ranked frequencies.

It will be recalled that in the signal receiving device 500 shown in FIG. 27, when a recommended program displayed on a display element such as CRT and LCD and having the appended production number y is placed on a recording schedule, the information Dy on frequency distribution of the production number y is merged to the information Dx on frequency distribution of the production number x, which are stored in the circuit board bay memory 541.

Figure 50:
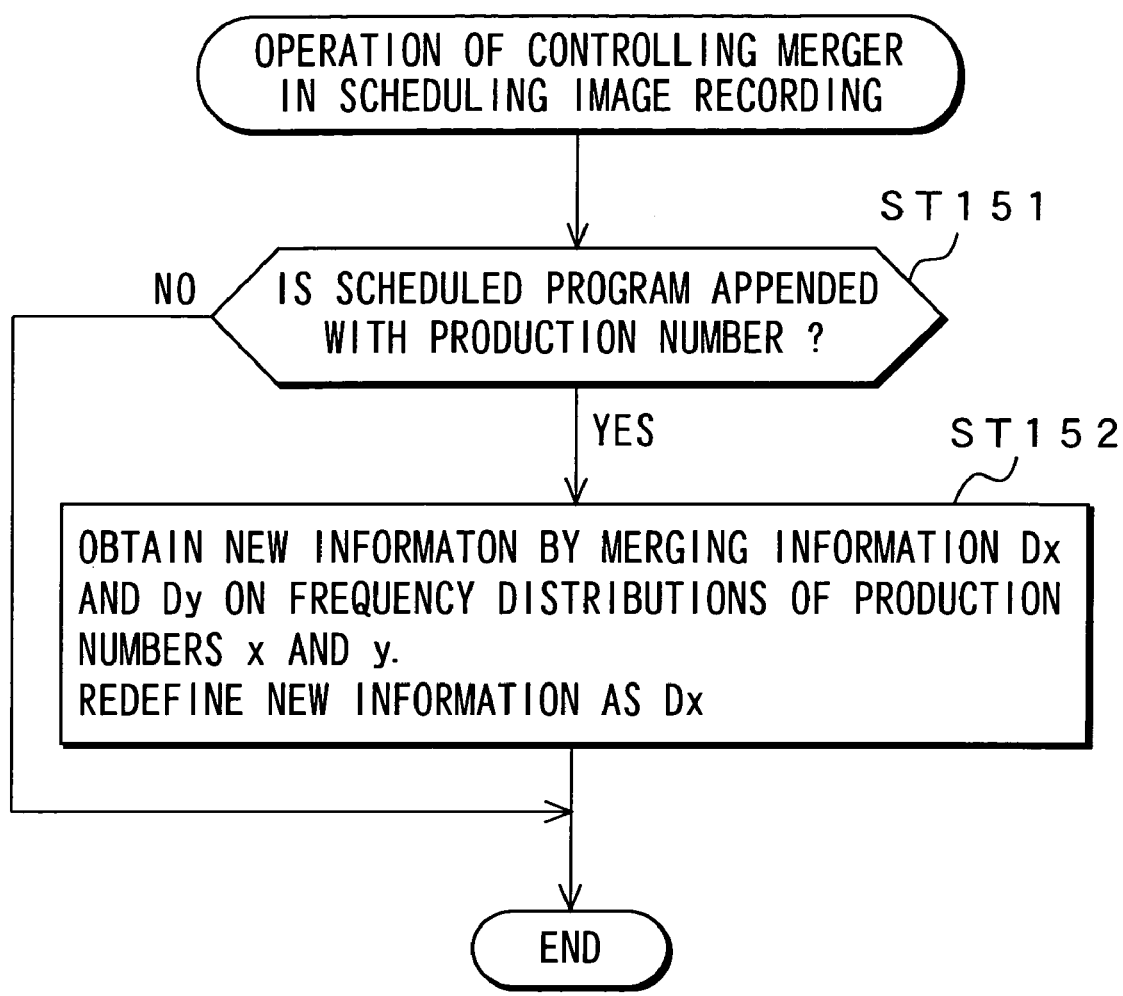
FIG. 50 is a flowchart illustrating operations for merger control in scheduled recording.

FIG. 50 is a flowchart showing operations of controlling merger procedure in the control unit 501 at the time of scheduling recording.

At step ST151, a query is made as to whether the program booked on the recording schedule is appended with the production number y. the control unit 501 makes a decision based on the information regarding production numbers stored in the built-in memory in association with the recommended programs at step ST143 of the flowchart shown in FIG. 49. If the program booked on the recording schedule is not appended with a production number y, then no merger is carried out and the operations of controlling merger procedure are terminated.

On the other hand, if the reproduced program is appended with the production number y, then at step ST152, the circuit board bay memory 541 is controlled via the record control unit 525, so as to add up (or merge) the frequencies of the entries in the information Dx on frequency distribution of the production number x and information Dy on frequency distribution of the production number y, and the information on the newly obtained frequency distribution is written in the circuit board bay memory 541 as the information Dx on frequency distribution of the product number x. Because of this merger, the circuit board bay memory 541 stores only the information Dx on frequency distribution of the production number x alone.

The reason for merging the information Dx on frequency distribution of the product number x and information Dy on frequency distribution of the product number y in this way if a program appended with the product number y is booked on a recording schedule, is that the program appended with the production number y is a program that matches entries Ty extracted from those entries that do exist in the information Dy on frequency distribution of the product number y but do not exist in the information Dx on frequency distribution of the product number x. That is, the information Dy on frequency distribution of the product number y associated with other receivers are considered available.

With this merger of information at the time of making a recording schedule, information on frequency distribution that suits the taste of the user can be quickly attained in the circuit board bay memory 541, as in merger of information at the time of reproducing a program, thereby allowing efficient utilization of the foregoing automated image recording and automated recommendation function by the user.

It should be understood that although operations of merger control has been described in connection with scheduled recording of a program displayed on a display element such as CRT and LCD, similar merger control can be attained in connection with a recommended program displayed on a display element such as CRT and LCD.

It has been shown that, in the data correction unit 700, information Dy on frequency distribution having the largest degree of matching with the information Dx on frequency distribution stored in the circuit board bay memory 541 is obtained from the information $Dy_1$-$Dy_n$ on frequency distributions stored in other circuit board bay memories $604_{-1}$-$604_{-n}$, and this information Dy on frequency distribution is stored in the circuit board bay memory 541 together with the information Dx on frequency distribution.

Alternatively, in the data collection unit 700, the information Dy on frequency distribution having the smallest matching degree with the information Dx of frequency distribution stored in the circuit board bay memory 541 may be obtained from the information Dy1-Dyn of frequency distributions, and this information Dy on frequency distribution may be stored in the circuit board bay memory 541 together with information Dy on frequency distribution.

In this case, if the program to be reproduced is not appended with the production number y in the event that the program has been recorded by the automated image recording function (see the flowcharts of FIGS. 45 and 47), or if a program selected from the programs displayed on an CRT or an LCD in accordance with the automated recommendation function (see flowchart of FIG. 49) and booked on scheduled reception or scheduled recording is not appended with the production number y, then new information on frequency distribution may be obtained by deleting entries contained in the information Dy on frequency distribution of the production number y from entries of information Dx on frequency distribution of the product number x stored in the circuit board bay memory 541, and only this new information of frequency distribution can be written to the circuit board bay memory 541 as the information Dx on frequency distribution on product number x.

In this way, when reproducing a program not appended with the product number y or when booking on a recording schedule of a reception schedule a program not appended with the product number y, one may obtain new information on frequency distribution by deleting the entries of the information Dy on frequency distribution of the product number y from the entries of information Dx on frequency distribution of the product number x stored in the circuit board bay memory 541.

In this case, the program appended with the production number y is a program that matches entries Ty extracted from those entries that do exist in the information Dy on frequency distribution of the product number y but do not exist in the information Dx on frequency distribution of the product number x. Hence it is considered that the information Dy on frequency distribution of the product number y formed by other signal receiving device is considered unavailable.

In the data collection unit 700, new frequency information may be obtained by averaging or summing the information Dx on frequency distribution stored in the circuit board bay memory 541 and the information Dy1-Dyn on frequency distributions stored in other bay memories 704-1-704-n, and information on this new frequency distribution may be stored in the circuit board bay memory 541 as information Dy on frequency distribution of the product number y together with the information Dx on frequency distribution of the product number x.

In this case, if the program to be reproduced is appended with production number y in the event that the program has been recorded by the automated image recording function (see the flowcharts of FIGS. 45 and 47), or if a program selected from the programs displayed on an CRT or an LCD in accordance with the automated recommendation function (see flowchart of FIG. 49) and booked on a reception schedule or a recording schedule is appended with production number y, only the information Dy on frequency distribution on the product number y stored in the circuit board bay memory 541 may be written in the circuit board bay memory 541 as the information Dx on frequency distribution of the product number x.

In this way, the reasons why the information Dy on frequency distribution of the product number y stored in the circuit board bay memory 541 is entered as the information Dx on frequency distribution of a new product number x when a program appended with the product number y is reproduced, booked on a recording schedule or reception schedule, is that the information Dy on frequency distribution of the product number y formed by averaging or summing the information Dx on frequency distribution and the information Dy1-Dyn on frequency distribution is considered available as described above.

It will be understood that in the data collection unit 700 described above, when the information Dy on frequency distribution is formed by averaging or summing the information Dx on frequency distribution and the information Dy1-Dyn on frequency distribution stored in other circuit board bay memories 704-1-704-n, matching degree of each of the pieces of information Dx, Dy1-Dyn is calculated with the information Dx, Dy1-Dy so that information Dx and Dy1-Dyn may be weighted with appropriate weights based on the matching degree thus calculated.

As described above, in the signal receiving device 500 shown in FIG. 27, the additional data AI1 associated with the program received by the analog tuner 506 or reproduced by the VTR 509 in operation of the console 503 by the user, is supplied from the YC separation control unit 512 to the log record control unit 542.

In addition, the additional data AI2 associated with the program received by the digital tuner 521 is supplied from the record control unit 525 to the log record control unit 542. The additional data AI2 associate with program booked on a recording schedule in operation of the console 503 by the user is supplied from the record control unit 525 to the log record control unit 542. In addition, the addition data AI3 associated with the contents reproduced by DVD reproduction unit 531 in operation of the console 503 by the user is supplied from the reproduction control unit 532 to the log record control unit 542.

Then, the information on frequency distributions of title, performer's name, and genre is corrected in the log record control unit 542 every time the additional information AI1-AI3 are supplied thereto, and the corrected information on frequency distribution is stored in the circuit board bay memory 541. Accordingly, the information on frequency distributions of title, performer's name, and genre stored in the circuit board bay memory 541 is trained to better reflect the user's taste.

In this case, less frequently switched program before selecting the program is weighted with a larger weight, based on an assumption that a program important to the user would be switched less frequently when the user operates the console 503 to select a program.

In making recording schedule, a program booked for recording on the weekly basis or booked ahead of the day of broadcast is weighted with a larger weight, based on an assumption that the program booked for recording on the weekly basis or booked ahead of the day of broadcast would be more important to the user than a program booked for recording on the day of broadcast.

Further, a larger weight is given to a program associated with a shorter fast-forward and a longer rewind based on the assumption that the shorter fast-forward and longer rewind operation would be more importance to the user.

Applying such weighting, the information on frequency distributions of title, performer's name, and genre stored in the circuit board bay memory 541 can be trained to better reflect the user's taste.

Further, the signal receiving device 500 has an automated image recording function. If the user is available for operation of the automated image recording function (setting up of automated image recording and executing of automated image recording), by using the console 503, a desired program to be booked on the recording schedule is searched from a program table stored in the HDD 524, at every setting time for automated image recording, based on the information on frequency distributions of title, performer's name, and genre stored in the circuit board bay memory 541 and then the desired program is booked on the recording schedule, thereby automatically recording the desired program on the date and hour of broadcast as scheduled.

In this case, the desired programs to be booked on the recording schedule suits the taste of the user since the programs are selected based on the information on frequency distributions of title, performer's name, and genre stored in the circuit board bay memory 541. Thus, if the user has forgotten inputting the date, hour, and channel of his desired program to be booked on a schedule, using the console 503, there is still a big chance that the desired program is automatically recorded on schedule, which is a great benefit to the user.

The signal receiving device 500 has an automated recommendation function. If the user is available for operation of the automated recommendation function (execution operation of the automated recommendation function) using the console 503, the HDD 524 is searched, every time for executing the automated recommendation, for a program to be recommended based on information on frequency distribution on titles, performers' names, and genres, from the program table stored in the circuit board bay memory 541. A display signal SCH for displaying information on the recommended desired program is synthesized with R, G, B chrominance signals in the synthesis units 513 and 533. Thus, the information on the desired program to be recommended is displayed on a display element such as CRT and LCD.

In this case, the programs to be recommended suit the taste of the user since the programs are selected based on the information on frequency distribution on title, performer's name, and genre stored in the circuit board bay memory 541. As a result, if the user has failed to check up a desired program for his taste from a program table on the newspaper or a program table displayed on a display such as CRT and LCD, there is still a big chance that his desired programs are recommended, which is available for the user.

In the signal receiving device 500, the circuit board bay memory 541 can store, in addition to the information on frequency distributions generated by the log record control unit 542 (information Dx on frequency distribution of the production number x), information on frequency distribution (information Dy on frequency distribution of the production number y) formed by the data collection unit 700 as shown in FIG. 43 using the information on frequency distributions stored in other bay memories of other signal receiving device.

In this way, based on the stored information Dx and Dy on frequency distributions of the production numbers x and y, scheduling of automated image recording and automated recommendation are executed. Based on the reproduced program among the automatically recorded programs and the program booked on a recording/reception schedule among the automatically recommended programs, information Dx and Dy are added up (perged) to generate a newer frequency distribution, or else a newer frequency distribution information is formed by deleting those entries contained in information Dy from the information Dx, or else information Dy is selected as new information on frequency distribution in place of the information Dx.

In this way, it is possible to implement the storage of the information on frequency distribution corresponding to the user's taste quickly in the circuit board bay memory 541, thereby allowing the user to efficiently utilize the foregoing automated image recording function and automated recommendation function.

It should be understood that, although the signal receiving device 500 has been described and shown in FIG. 27 in connection with recording of MPEG data outputted from the channel decoder 522 in the HDD 524, the invention is not limited to this example. For instance, the invention can be applied equally well to recording of image data in the form of RGB data, as the broadcast data, obtained by decoding MPEG data. In that case, the data reproduced from HDD 524 will be directly supplied to the synthesis unit 533 via the reproduction control unit 526.

In the example shown in FIG. 27, the signal receiving device 500 is adapted to store information on all the frequency distributions of titles, performers' names, and genres in the circuit board bay memory 541, and utilizes all of the information. Alternatively, the circuit board bay memory 541 may be adapted to store only a part of the information on the titles, performers' names, and genres for use in the signal receiving device 500.

It should be understood that information on frequency distribution to be stored in the circuit board bay memory 541 is not limited to title, performer's name, and genre, but it may include, for example, information on frequency distribution of date and hour of broadcast and channel other than the embodiments.

Frequency distributions have been used as information to judge user's taste. However, any approach and any type of information other than the embodiments may be used to judge user's taste. Any other processing can be also employed in his or her favor.

According to the invention, additional (adjustment) information to control processing means for processing the data is collected, and the processing means is controlled based on information related to the additional information (adjusting information). The invention allows for data processing that suits the taste of the user.

According to the invention, removable storage devices may be used to store the information related to the additional information, thereby facilitating on one hand further storage of information, related to the additional information, collected by other data collection means, and facilitating, on the other hand, use of the related information thus collected and stored in the storage means (devices) by other data processing means.

According to the invention, when a first informational signal is converted into a second informational signal, the second informational signal is produced in association with inputted parameters such that the quality of output obtained from the second informational signal can be arbitrarily changed by the user, wherein the history information related to the inputted parameters is stored. Thus, for example, adjustment of the output can be done to suit the user's taste by producing coefficient seed data that is coefficient data for use in a production equation for producing coefficient data used in an estimation equation.

INDUSTRIAL UTILITY OF THE INVENTION

As described above, a data processing apparatus, a data processing method, an image display apparatus, a coefficient seed data production device and a method for producing the coefficient seed data, a coefficient data production device and a method for producing the coefficient data, each being used for the image display apparatus, a program for carrying out the methods, and a computer-readable medium for storing the program, in accordance with the invention are suitable for use with, for example, a programmable recorder for recording broadcast programs utilizing a receiver and a recorder capable of converting NTSC scheme video signal into a high-definition video signal.

The invention claimed is:

1. A contents-data-processing apparatus, comprising:
processing means for processing inputted contents-data;
collecting means for collecting additional information for controlling said processing means;
history storage means for storing the history of said additional information collected by said collecting means; and
control means for controlling said processing means based on control information generated or updated on the basis of the history of said additional information,
wherein said contents-data includes multiple items of informational data;
wherein said processing means converts a first informational signal constituting said contents-data into a second informational signal including multiple items of informational data; and wherein said processing means includes:

data selection means for selecting multiple items of informational data located on a periphery of an objective position in said second informational signal based on said first informational signal;

class detection means for detecting a class including said informational data of said objective position based on said multiple items of informational data selected by said data selection means;

coefficient inputting means for inputting a coefficient for use in said processing means; and informational data production means for generating the informational data of said objective position using said coefficients associated with said class detected by said class detection means.

2. A contents-data-processing apparatus comprising:
processing means for processing inputted contents-data;
collecting means for collecting history of additional information for controlling said processing means;
history storage means for storing the history information of said additional information collected by said collecting means; and
control means for controlling said processing means based on control information generated or updated on the basis of the history of said additional information,
wherein said additional information includes a parameter settable over a range for adjusting quality of said contents-data, and
wherein said control information is generated on the basis of history of said parameter and is indicative of the setting range of said parameter.

3. The contents-data-processing apparatus according to claim 2,
wherein said contents-data includes multiple items of informational data;
wherein said processing means converts a first informational signal constituting said contents-data into a second informational signal including multiple items of informational data; and
wherein said processing means including:
parameter inputting means for allowing a value of the parameter for determining quality of output obtained by said second informational signal to be inputted within said setting range; and
informational data production means for generating informational data of said objective position in accordance with at least the value of the parameter inputted by said parameter inputting means.

4. The contents-data-processing apparatus according to claim 3 wherein said processing means further includes:
data selection means for selecting multiple items of informational data located on a periphery of an objective position in said second informational signal based on said first informational signal;
class detection means for detecting a class including said informational data of said objective position based on said multiple items of informational data selected by said data selection means, and
wherein said informational data production means generates informational data of said objective position in association with said class detected by said class detection means and the value of the parameter inputted by said parameter input mean.

5. A contents-data-processing apparatus, comprising:
processing means for processing inputted contents-data;
collecting means for collecting history of additional information for controlling said processing means;
history storage means for storing history information indicating a history of said additional information collected by said collecting means; and
control means for controlling said processing means based on control information generated or updated on the basis of the history information indicating a history of said additional information,
wherein said history storage means includes:
analyzing means for analyzing the history of the additional information collected by said collection means; and
a memory, said memory storing as history information of said additional information the result of an analysis made by said analyzing means.

6. The contents-data-processing apparatus according to claim 5, wherein said analyzing means obtains a frequency distribution regarding said additional information as the result of its analysis.

7. The contents-data-processing apparatus according to claim 6,
wherein said history storage means includes:
a counter for counting the number of times that said additional information appears every contents of said additional information;
averaging unit for averaging the frequencies of the respective contents of said additional information based on a count value of said counter; and
a frequency-distribution storage unit for storing frequency-distribution indicating the frequencies of the respective contents of said additional information averaged in said averaging unit.

8. The contents-data-processing apparatus according to claim 6,
wherein said additional information includes a parameter for adjusting quality of said contents-data, and wherein said frequency distribution relates to a frequency in terms of the number of times that said parameter appears every value of said parameter.

9. The contents-data-processing apparatus according to claim 5,
wherein said analyzing means obtains, as the result of its analysis, newest values of a predetermined number in said additional information.

10. The contents-data-processing apparatus according to claim 5, wherein said analyzing means obtains, as the result of its analysis, the frequency distribution of said additional information and a predetermined number of newest values of said additional information.

11. The contents-data-processing apparatus according to claim 5, wherein said control means controls said processing means according to the result of said analysis stored in said history storage means.

12. The contents-data-processing apparatus according to claim 11, wherein said control means uses said generated or updated control information to control said processing means in accordance with the result of said analysis stored in said history storage means.

13. A contents-data-processing apparatus, comprising:
processing means for processing inputted contents-data;
collecting means for collecting history of additional information for controlling said processing means;
wherein said collection means collects additional information associated with the contents-data processed by said processing means,
history storage means for storing history information indicating a history of said additional information collected by said collecting means; and control means for controlling said processing means based on control information generated or updated on the basis of the history information indicating a history of said additional information,
wherein said processing means has a display unit for displaying a picture formed by said contents-data, and
wherein said control means determines particular contents-data to be recommended on the basis of the history information of said additional information stored in said history storage means, generates a display signal for displaying information on said particular contents-data, and synthesizes said display signal with said contents-data.

14. A contents-data-processing apparatus comprising:
processing means for processing inputted contents-data;
collecting means for collecting history of additional information for controlling said processing means;
history storage means for storing the history information of said additional information collected by said collecting means; and
control means for controlling said processing means based on control information generated on the basis of the history of said additional information
wherein said contents-data includes multiple items of informational data;
wherein said processing means converts a first informational signal constituting said contents-data into a second informational signal including multiple items of informational data;
wherein said processing means includes:
    first data selection means for selecting multiple items of first informational data located on a periphery of an objective position in said second informational signal based on said first informational signal;
    class detection means for detecting a class including said informational data of said objective position based on said multiple items of the first informational data selected by said first data selection means; parameter inputting means for allowing a value of parameter for determining quality of output obtained by said second informational signal to be inputted; and
    informational data production means for generating informational data of said objective position in accordance with the class detected by said class detection means and the value of the parameter inputted by said parameter inputting means.

15. The contents-data-processing apparatus according to claim 14,
wherein said informational data production means includes:
    storage means for storing coefficient seed data obtained for each class detected by said class detection means, said coefficient seed data being coefficient data in a production equation for producing coefficient data used in an estimation equation,
    said production equation containing said parameter;
    coefficient data production means for generating said coefficient data used in said estimation equation corresponding to the class detected by the class detection means and the value of parameter inputted by the parameter inputting means,
    said coefficient data set used in the estimation equation being produced according to the production equation using the coefficient seed data stored in the storage means and the input value of the parameter;
    second data selection means for selecting multiple items of second informational data located on a periphery of an objective position in said second informational signal based on said first informational signal; and
    calculation means for calculating and obtaining the informational data of said objective position according to said estimation equation using said coefficient data generated by said coefficient data production means and the multiple items of said second informational data selected by said second data selection means.

16. The contents-data-processing apparatus according to claim 15, further comprising:
addition means for obtaining a total sum of said coefficient data used in the estimation equation generated by said coefficient data production means; and
normalization means for normalizing by dividing the informational data of said objective pixel obtained by said calculation means by said total sum.

17. The contents-data-processing apparatus according to claim 15
wherein said informational signal is an image signal;
wherein said parameter inputting means allows to be inputted values of multiple parameters each being indicative of resolutions in multiple directions;
wherein positions of the multiple items of second informational data selected by said second data selection means are distributed over the multiple directions; and
wherein further provided is data position switching means for switching positions of the multiple items of said second informational data distributed over the multiple directions.

18. The contents-data-processing apparatus according to claim 17 wherein said multiple directions include time direction and spatial direction.

19. The contents-data-processing apparatus according to claim 17 wherein said multiple directions are horizontal and vertical directions.

20. The contents-data-processing apparatus according to claim 17 wherein said multiple directions are horizontal direction, vertical direction, and time direction.

21. The contents-data-processing apparatus according to claim 17 wherein said storage means stores switching information on the data positions in said data position switching means along with said coefficient seed data.

22. The contents-data-processing apparatus according to claim 14 wherein said informational data production means includes:
    coefficient data production means for generating said coefficient data used in said estimation equation corresponding to the class detected by the class detection means and the value of parameter inputted by the parameter inputting means,
    said coefficient data production means having storage means for storing previously produced coefficient data of estimation equation for each of the combinations of the class detected by said class detection means and the value of a parameter inputted to said parameter inputting means;
    second coefficient data production means for generating the coefficient data of said estimation equation associated with the class detected by said class detection means and the values of the parameters inputted to said parameter inputting means;
    second data selection means for selecting multiple items of second informational data located on a periphery of an objective position in said second informational signal based on said first informational signal; and calculation means for calculating and obtaining the informational data of said objective position according to said estimation equation using said coefficient data generated by said coefficient data production means and the multiple items of said second informational data selected by said second data selection means.

23. The contents-data-processing apparatus according to claim 22
wherein said informational signal is an image signal;
wherein said parameter inputting means allows to be inputted values of multiple parameters each being indicative of resolutions in multiple directions;
wherein positions of the multiple items of second informational data selected by said second data selection means are distributed over the multiple directions; and
wherein further provided is data position switching means for switching positions of the multiple items of said second informational data distributed over the multiple directions.

24. The contents-data-processing apparatus according to claim 23 wherein said multiple directions include time direction and spatial direction.

25. The contents-data-processing apparatus according to claim 23 wherein said multiple directions are horizontal direction and vertical direction.

26. The contents-data-processing apparatus according to claim 23 wherein said multiple directions are horizontal direction, vertical direction, and time direction.

27. The contents-data-processing apparatus according to claim 23 wherein said storage means stores switching information on the data positions in said data position switching means along with said coefficient data.

28. The contents-data-processing apparatus according to claim 14 wherein said informational signal is an image signal or an audio signal.

29. An informational signal processing method for converting a first informational signal containing multiple items of informational data into a second informational signal containing multiple items of informational data, said method comprising:
a first step of selecting multiple items of first informational data located on a periphery of an objective position in said second informational signal based on said first informational signal;
a second step of detecting a class including said informational data of said objective position based on the multiple items of said first informational data selected in said first step;
a third step of obtaining a value of parameter for determining quality of output obtained in said second informational signal;
a fourth step of generating informational data of said objective position in accordance with the class detected in said second step and the value of the parameter obtained in said third step; and
a fifth step of storing, in storage device, information relevant to the value of the parameter obtained in said third step.

30. The informational signal processing method according to claim 29, wherein said informational signal is an image signal or an audio signal.

31. A computer-readable medium for storing a program for allowing a computer to execute an informational signal processing method for converting a first informational signal containing multiple items of informational data into a second informational signal containing multiple items of informational data, said method comprising:
a first step of selecting multiple items of first informational data located on a periphery of an objective position in said second informational signal based on said first informational signal;
a second step of detecting a class including said informational data of said objective position based on the multiple items of said first informational data selected in said first step;
a third step of obtaining a value of parameter for determining quality of output obtained in said second informational signal;
a fourth step of generating informational data of said objective position in accordance with the class detected in said second step and the value of the parameter obtained in said third step; and
a fifth step of storing, in storage device, information relevant to the value of the parameter obtained in said third step.

* * * * *